US012047986B2

(12) United States Patent
Sabella et al.

(10) Patent No.: US 12,047,986 B2
(45) Date of Patent: Jul. 23, 2024

(54) MULTI-SLICE SUPPORT FOR MEC-ENABLED 5G DEPLOYMENTS

(71) Applicant: Intel Corporation, Santa Clara, CA (US)

(72) Inventors: Dario Sabella, Gassino (IT); Miltiadis Filippou, Munich (DE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/201,321

(22) Filed: May 24, 2023

(65) Prior Publication Data

US 2023/0403731 A1  Dec. 14, 2023

Related U.S. Application Data

(63) Continuation of application No. 17/430,282, filed as application No. PCT/US2020/021914 on Mar. 10, 2020, now Pat. No. 11,700,628.

(Continued)

(51) Int. Cl.
*H04W 72/50* (2023.01)
*H04W 28/06* (2009.01)
*H04W 36/00* (2009.01)

(52) U.S. Cl.
CPC ......... *H04W 72/535* (2023.01); *H04W 28/06* (2013.01); *H04W 36/0072* (2013.01)

(58) Field of Classification Search
None
See application file for complete search history.

(56) References Cited

U.S. PATENT DOCUMENTS 10,411,964 B2  9/2019  Zhang
11,064,057 B2  7/2021  Sabella et al.
(Continued)

FOREIGN PATENT DOCUMENTS

DE     112020001183    3/2022
EP     3609161         8/2021
(Continued)

OTHER PUBLICATIONS

"International Application Serial No. PCT US2020 021914, International Search Report mailed Jul. 1, 2020", 3 pgs.
(Continued)

*Primary Examiner* — Kenny S Lin
(74) *Attorney, Agent, or Firm* — Schwegman Lundberg & Woessner, P.A.

(57) ABSTRACT

A system configured to track network slicing operations within a 5G communication network includes processing circuitry configured to determine a network slice instance (NSI) associated with a QoS flow of a UE. The NSI communicates data for a network function virtualization (NFV) instance of a Multi-Access Edge Computing (MEC) system within the 5G communication network. Latency information for a plurality of communication links used by the NSI is retrieved. The plurality of communication links includes a first set of non-MEC communication links associated with a radio access network (RAN) of the 5G communication network and a second set of MEC communication links associated with the MEC system. A slice configuration policy is generated based on the retrieved latency information and slice-specific attributes of the NSI. Network resources of the 5G communication network used by the NSI are reconfigured based on the generated slice configuration policy.

20 Claims, 33 Drawing Sheets

Related U.S. Application Data

(60) Provisional application No. 62/816,616, filed on Mar. 11, 2019.

(56) References Cited

U.S. PATENT DOCUMENTS

| | | | |
|---|---|---|---|
| 11,140,529 B2* | 10/2021 | Sabella | H04W 12/06 |
| 11,700,628 B2 | 7/2023 | Sabella et al. | |
| 2018/0123961 A1 | 5/2018 | Farmanbar et al. | |
| 2018/0317134 A1 | 11/2018 | Leroux et al. | |
| 2019/0140933 A1* | 5/2019 | Guim Bernat | H04L 47/2425 |
| 2019/0223055 A1 | 7/2019 | Bor Yaliniz et al. | |
| 2020/0052991 A1 | 2/2020 | Kodaypak et al. | |
| 2022/0086864 A1 | 3/2022 | Sabella et al. | |
| 2023/0074288 A1* | 3/2023 | Filippou | H04W 28/0236 |
| 2023/0164241 A1* | 5/2023 | Filippou | H04L 63/08 |
| | | | 709/201 |

FOREIGN PATENT DOCUMENTS

| | | |
|---|---|---|
| WO | 2018045990 | 3/2018 |
| WO | 2020185794 | 9/2020 |

OTHER PUBLICATIONS

"International Application Serial No. PCT US2020 021914, Written Opinion mailed Jul. 1, 2020", 4 pgs.

"3GPP; TSG CT; 5G System; Network Slice Selection Services; Stage 3 (Release 15)", 3GPP TS 29.531 V15.2.0, section 6.1.3.2, (Dec. 19, 2018).

"U.S. Appl. No. 17 430,282 Preliminary Amendment filed Aug. 11, 2021", 10 pgs.

"International Application Serial No. PCT US2020 021914, International Preliminary Report on Patentability mailed Sep. 23, 2021", 6 pgs.

"U.S. Appl. No. 17 430,282, Notice of Allowance mailed Mar. 1, 2023", 9 pgs.

Huawei, "Solution 8 Updates for QoS monitoring solution based on time synchronization", S2-1901195, 3GPP TSG-SA WG2 Meeting #130, (Mar. 4, 2019).

Intel, "pCR 28.861 add use case for automatic NSI creation", S5~192426, 3GPP TSG SA WG5 (Telecom Management) Meeting #124, section 5, (Mar. 1, 2019).

Nokia, "Add availability in service profile of network slice resource model", S5-192222, 3GPP TSG-SA5 Meeting #124, section 6.3.3, (Feb. 15, 2019).

* cited by examiner

MULTI-SLICE SUPPORT FOR MEC-ENABLED 5G DEPLOYMENTS

PRIORITY CLAIM

This application is a continuation of U.S. patent application Ser. No. 17/430,282, filed Aug. 11, 2021, which is a U.S. National Stage Filing under 35 U.S.C. 371 from International Application No. PCT/US2020/021914, filed Mar. 10, 2020 and published in English as WO 2020/185794 on Sep. 17, 2020, which claims the benefit of priority to the U.S. Provisional Patent Application Ser. No. 62/816,616, filed Mar. 11, 2019, and titled "E2E MULTI-SLICE SUPPORT FOR MEC-ENABLED 5G DEPLOYMENTS," each of which application is incorporated herein by reference in its entirety.

TECHNICAL FIELD

Embodiments described herein generally relate to data processing, network communication, and communication system implementations, and in particular, to techniques for implementing end-to-end (E2E) support for multi-access edge computing (MEC)-enabled 5G deployments.

BACKGROUND

Internet-of-Things (IoT) devices are physical or virtualized objects that may communicate on a network and may include sensors, actuators, and other input/output components, such as to collect data or perform actions from the real-world environment. For example, IoT devices may include low-powered endpoint devices that are embedded or attached to everyday things, such as buildings, vehicles, packages, etc., to provide an additional level of artificial sensory perception of those things. Recently, IoT devices have become more popular and thus applications using these devices have proliferated.

Edge computing, at a more general level, refers to the movement of compute and storage resources closer to, or into, smart endpoint devices to optimize total cost of ownership, reduce application latency, improve service capabilities, and improve compliance with security or data privacy requirements. Edge computing may in some scenarios provide a cloud-like distributed service, which offers orchestration and management for applications among many types of storage and compute resources. Edge computing may be further integrated with use cases and technology developed for the IoT and Fog networking, as endpoint devices and gateways attempt to access network resources and applications at locations moved closer to the "edge" of the network.

MEC encompasses architectures that enable cloud computing functionality or information technology (IT) services at the network (e.g., cellular network) edges. MEC may reduce network congestion by moving applications, data, discovery, etc. closer to the user (e.g., mobile device, user equipment (UE), station (STA), etc.). Some MEC details dealing with security (e.g., both user security as well as application integrity), radio use, etc., have been promulgated by European Telecommunications Standards Institute (ETSI), such as described in the "Mobile Edge Computing Introductory Technical White Paper," published Sep. 1, 2014. A set of specifications and white papers providing further details and implementation use cases for MEC scenarios is being developed and published on an ongoing basis by ETSI as part of the ETSI MEC industry specification group (ISG).

The MEC environment is characterized by ultra-low latency and high bandwidth as well as real-time access to radio network information that may be leveraged by applications. MEC technology permits operators to flexibly and rapidly deploy innovative applications and services towards mobile subscribers, enterprises and vertical segments. MEC is intended to support developing mobile use cases of edge computing, to allow application developers and content providers to access computing capabilities and an IT service environment in dynamic settings at the edge of the network. In these and other settings, edge computing attempts to offer reduced latency, increased responsiveness, and more available computing power than offered in traditional cloud network services and wide area network connections. Despite the rapid activity occurring with the development of standards and architectures involving these technologies, many limitations and technical problems still exist in the design and use of IoT, MEC, and next-generation edge networks.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1A:
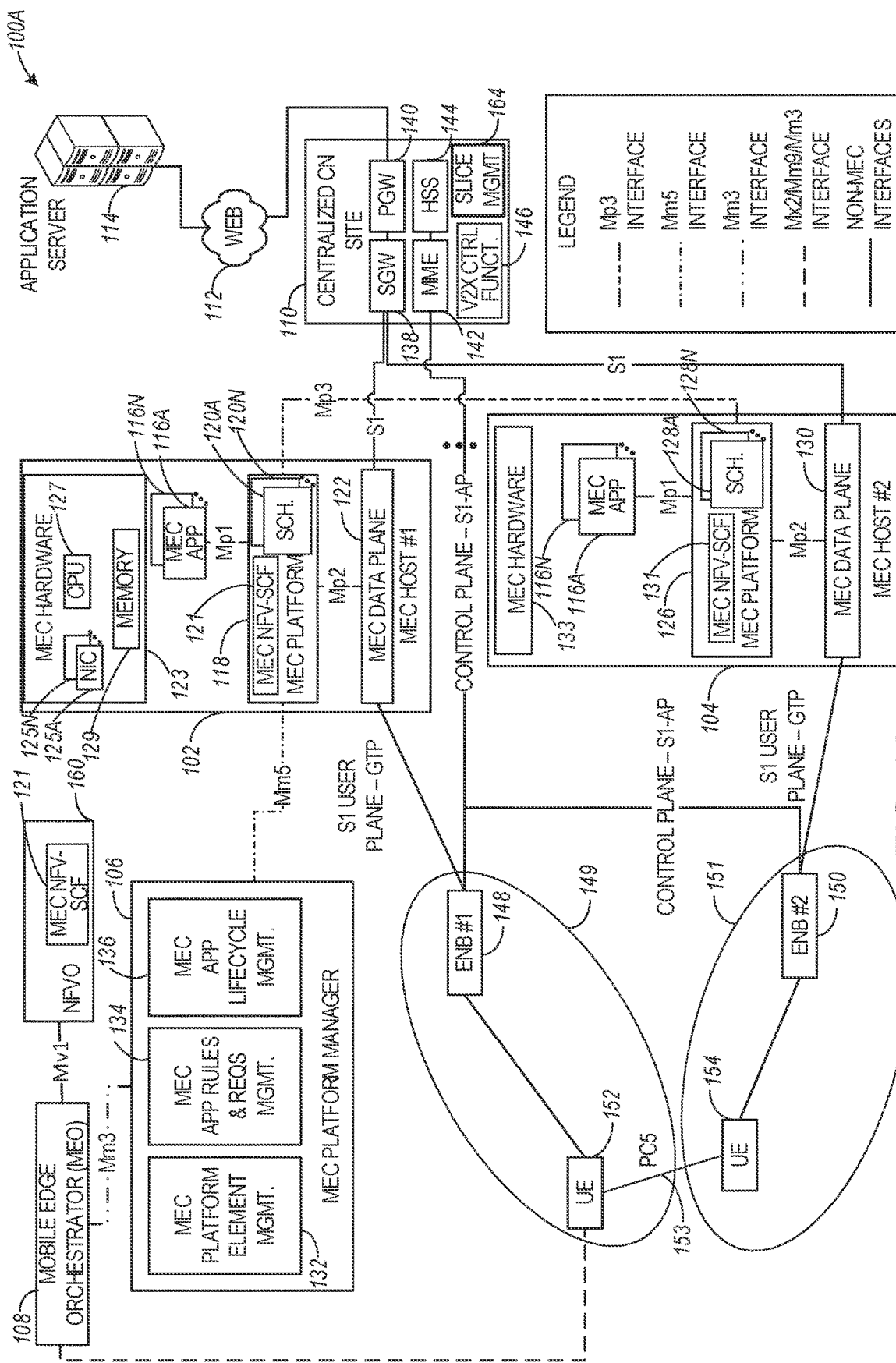
FIG. 1A illustrates a MEC communication infrastructure with a common core network, the MEC infrastructure including slice management, resource management, and traceability functions, according to an example.

In the following description, methods, configurations, and related apparatuses are disclosed for support for multi-slice support for MEC-enabled deployments. As an overview, the technological solutions disclosed herein integrate MEC with various types of implementations as well as dynamic network slicing and resource utilization management. These may benefit a variety of use cases, such as fifth-generation (5G) network communications among automotive devices, including those use cases termed as vehicle-to-vehicle (V2V), vehicle-to-infrastructure (V2I), and vehicle-to-everything (V2X). As with most MEC installations, the goal with the present configurations is to bring the application endpoints as close to the vehicular environment, or other endpoints, as possible and to dynamically adjust compute resources as well as resources used by one or more network (e.g., 5G) slices to enable low latency or high bandwidth services with optimal QoS. These systems and techniques may be implemented in, or augment, virtualized environments that may be implemented within various types of MEC, network function virtualization (NFV), or fully virtualized 5G network environments.

As is understood, MEC architectures offer application developers and content providers cloud-computing capabilities and an IT service environment at the edge of the network. This environment offers ultra-low latency and high bandwidth throughput as well as real-time access to radio network information that may be leveraged by applications. MEC technology permits flexible and rapid deployments of innovative applications and services towards mobile subscribers, enterprises, or vertical segments.

The present techniques and configurations may be utilized in connection with many aspects of current networking systems, but are provided with reference to IoT, MEC, and NFV deployments. The present techniques and configurations specifically may be (but are not required to be) relevant to the standards and approaches published in ETSI GS MEC-003 "Mobile Edge Computing (MEC); Framework and Reference Architecture" (e.g., V2.0.3); ETSI GR MEC-024 "Support for Network Slicing"; ETSI GS NFV-SEC 013 "Network Functions Virtualization (NFV) Release 3; Security; Security Management and Monitoring" (e.g., v. 3.1.1) and related MEC, NFV, or networked operational implementations. However, while the present techniques and configurations may provide significant benefits to MEC architectures and other IoT device network architectures, the applicability of the present techniques and configurations may be extended to any number of edge computing devices or fog computing platforms.

The following provides a detailed discussion of these techniques within specific systems and services, but which applies to the larger context of IoT, Fog network, and edge computing deployments. Further, the disclosed MEC architectures and service deployment examples provide one illustrative example of a Fog device or Fog system, but many other combinations and layouts of devices and systems located at the edge of a network may be provided. Further, the techniques disclosed herein may relate to other IoT and network communication standards and configurations, and other intermediate processing entities and architectures.

Techniques disclosed herein are focused on the role of Multi-access Edge Computing (MEC) in supporting 5G network slicing. In some aspects, techniques disclosed herein can be used to achieve and guarantee E2E latency requirements of a network slice when instantiated in a MEC-enabled 5G deployments using a slice control function (SCF) within a network function virtualization (NFV) domain (also referred to as NFV-SCF). The discussed communication systems incorporate a MEC system, the architecture of which (including the various MEC-related interfaces and reference points) is specified in ETSI GS MEC-003 and ETSI GR MEC-024, deployed in a 5G system (which may or may not be virtualized), the system architecture of which is specified in at least 3GPP TS 23.501. In some aspects, the 5G system may be fully virtualized, with all logical functions (i.e., network functions (NFs) and also application functions (AFs)) being virtualized. Various MEC-related interfaces and reference points discussed herein are further defined in the following ETSI-related technical specifications: ETSI GS MEC-003 and ETSI GR MEC-024 specifications.

More specifically, the NFV-SCF is configured to perform E2E latency function modeling and evaluation using latency information obtained from network management nodes of the 5G system as well as the MEC system, and identify delay bottlenecks associated with E2E communications within a network slice. The NFV-SCF further generates a slice configuration policy to optimize the instantiation of MEC application (apps) and the allocation of virtualized resources (e.g., virtual machines or VMs) across the edge cloud, according to a slice-aware strategy based on the E2E latency function modeling and evaluation. In this regard, the NFV-SCF may be used to dynamically monitor and reconfigure network resources used by network slice instances to meet E2E performance requirements of the slice (which may be part of a Service Level Agreement (SLA), between the network operator and a vertical industry).

FIG. 1A illustrates a MEC communication infrastructure 100A with a common core network, the MEC infrastructure including slice management, resource management, and traceability functions, according to an example. The connections represented by some form of a dashed line (as noted in the legend in FIG. 1A) may be defined according to a specification from an ETSI MEC standards family.

The MEC communication infrastructure 100A can include entities from a MEC-based architecture as well as entities from a third-generation partnership project (3GPP) based architecture. For example, the MEC communication infrastructure 100A can include a plurality of MEC hosts such as MEC hosts 102 and 104, a MEC platform manager 106, and a MEC orchestrator 108. The 3GPP based entities can include a centralized core network (CN) 110 coupled to an application server 114 via the network 112 (e.g., the Internet), as well as radio access networks (RANs) represented by base stations 148 and 150 coupled to corresponding user equipments (UEs) 152 and 154. The base stations 148 and 150 can include evolved Node-Bs (eNBs), Next Generation Node-Bs (gNBs), or other types of base stations operating in connection with a 3GPP wireless family of standards or another type of wireless standard.

In some aspects, the MEC communication infrastructure 100A can be implemented by different network operators in the same country and/or in different countries, using different network traffic types. For example, the radio access network associated with base station 148 (with a coverage area 149) can be within a first public land mobile network (PLMN) (i.e., associated with a first mobile services provider or operator and a first network traffic type), and base station 150 (with a coverage area 151) can be within a second public land mobile network (PLMN) (i.e., associated with a second mobile services provider or operator and a second network traffic type). As used herein, the terms "mobile services provider" and "mobile services operator" are interchangeable.

Figure 11:
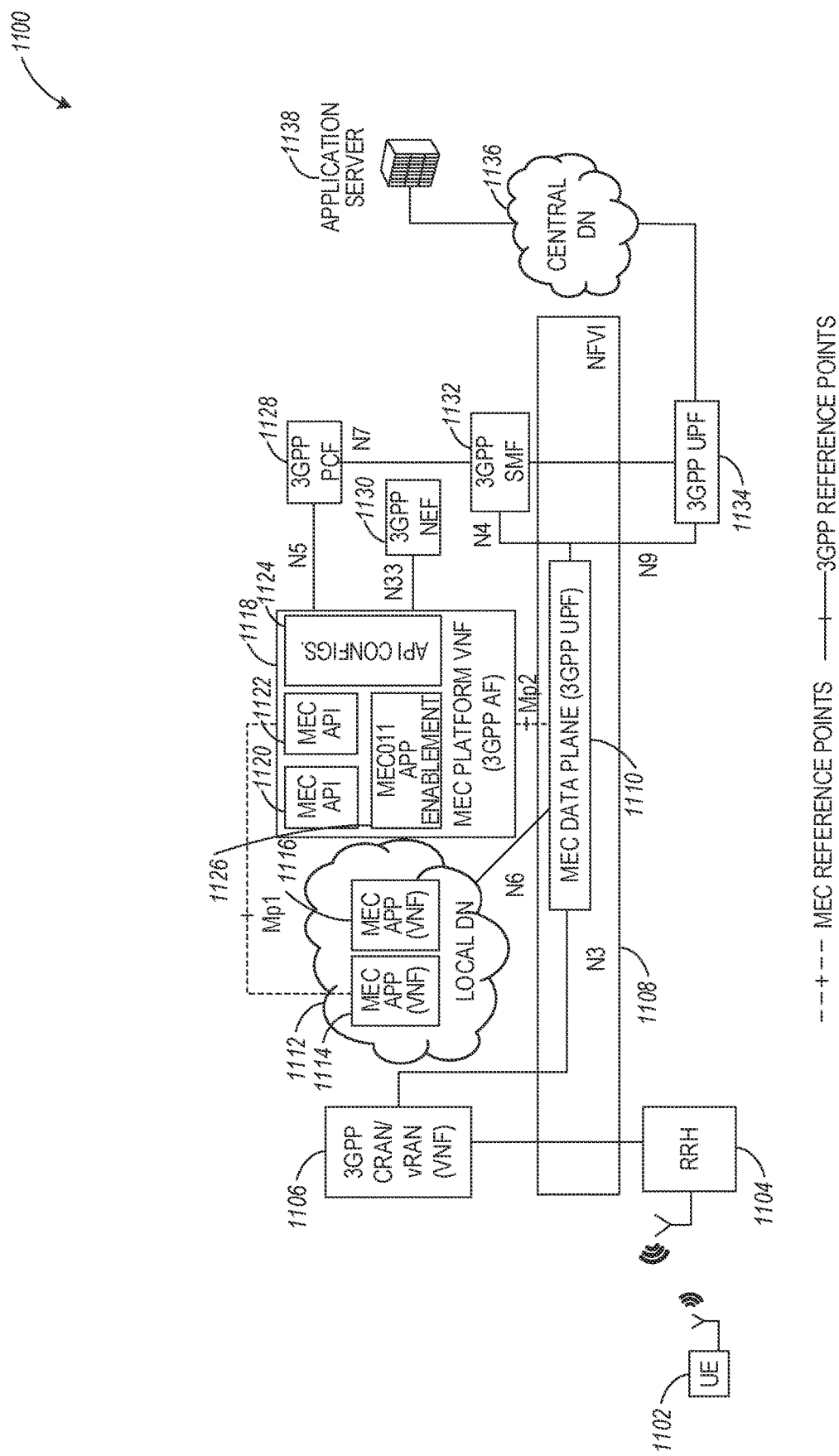
FIG. 11 illustrates a 3GPP-based 5G system architecture and example of the mapping of MEC entities to some of the 5G system's components (namely, AF and UPF), according to an example.
Figure 12:
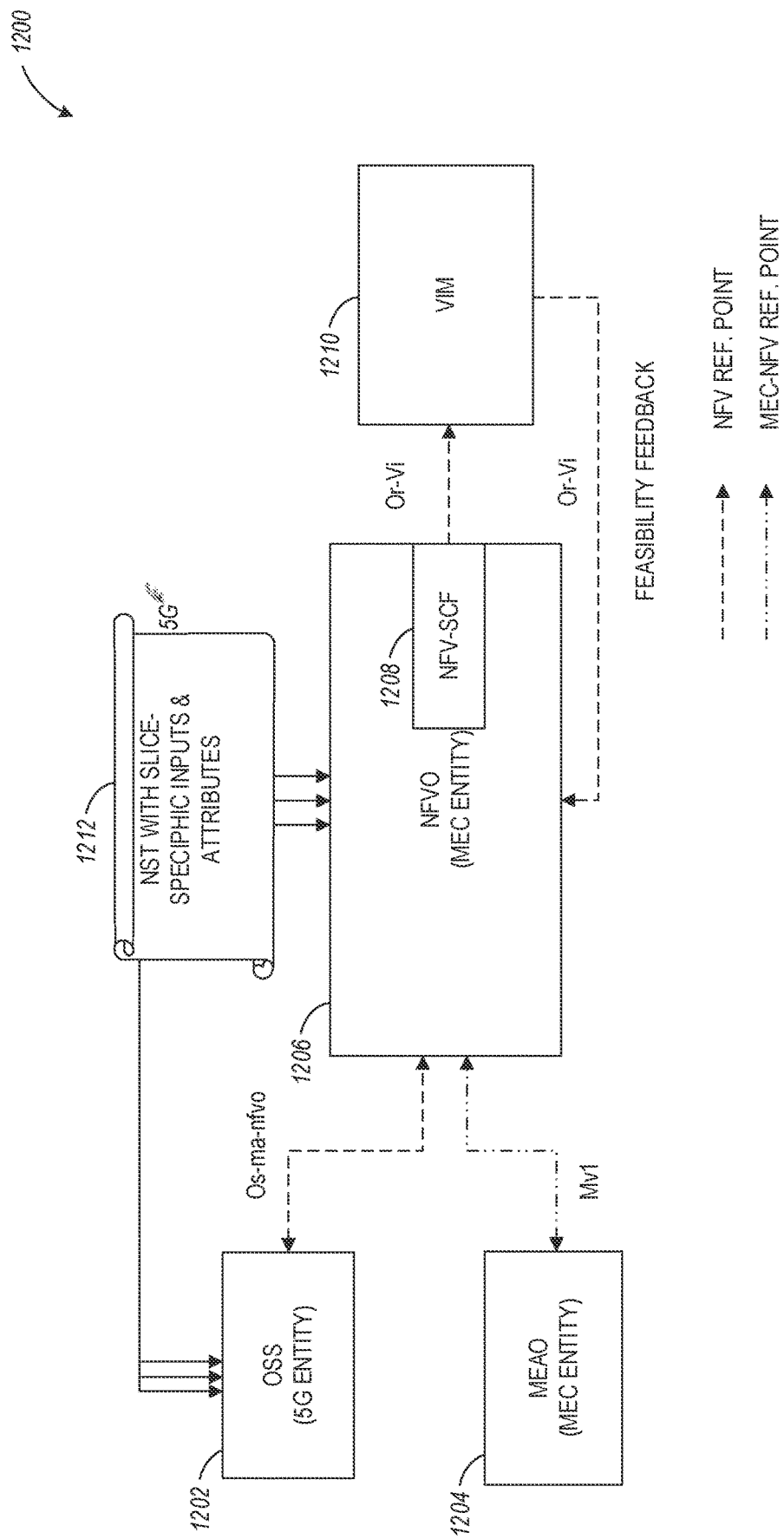
FIG. 12 illustrates aspects of the disclosed techniques for E2E multi-slice support for MEC-enabled 5G deployments, according to an example.

In this regard, the MEC communication infrastructure 100A can be associated with a multi-operator scenario composed of two coverage areas 149 and 151 where communication services (e.g., V2X services) can be provided, with each coverage area being operated by a mobile services operator. Additionally, each of the UEs 152 and 154 can be configured for network slice operation, where each UE can use one or more types of network slice instances configured by, e.g., the core network 110 using the slice management functionality 164 in coordination with one or more entities of the MEC communication infrastructure 100A, such as the MEC network function virtualization (NFV) slice control function (SCF) (MEC NFV-SCF) (e.g., 121 and 131). Techniques disclosed herein can be used to provide E2E multi-slice support for MEC-enabled 5G deployments using the MEC NFV-SCF. In some aspects, the MEC NFV-SCF 121 can be within an NFV orchestrator (NFVO) 160, which can be coupled to the MEC orchestrator 108, as well as to other MEC entities, as illustrated in FIG. 4B, FIG. 11, and FIG. 12.

The solid line connections in FIG. 1A represent non-MEC connections (or reference points), such as utilizing 3GPP cellular network connections S1, S1-AP, etc. Other connection techniques (e.g., protocols) and connections may also be used. Accordingly, in the scenario of FIG. 1A, the MEC system entities (e.g., the MEC orchestrator 108, the MEC platform manager 106, the MEC hosts 102, 104 are connected by MEC (or NFV) logical links (indicated with dashed lines), in addition to network infrastructure links (e.g., a 5G Long Term Evolution (LTE) network, such as provided among UEs 152, 154, eNBs 148, 150, a CN site 110, etc.) (indicated with solid lines). A further connection to cloud services (e.g., an application server 114 access via the network 112) may also be connected via backhaul network infrastructure links.

Techniques disclosed herein apply to 2G/3G/4G/LTE/LTE-A (LTE Advanced) and 5G networks, with the examples and aspects disclosed using 4G/LTE networks. In aspects, the CN 110 may be an evolved packet core (EPC) network, a NextGen Packet Core (NPC) network (e.g., a 5G network), or some other type of CN (e.g., as illustrated in reference to FIGS. 2A-3E). In an EPC (Evolved Packet Core), which is associated with 4G/LTE, the CN 110 can include a serving gateway (S-GW or SGW) 138, a packet data network (PDN) gateway (P-GW or PGW) 140, a mobility management entity (MME) 142, and a home subscriber server (HSS) 144 coupled to a V2X control function 146. In the Core Network is referred to as the NextGen Packet Network (NPC). In NPC (and as illustrated in FIGS. 3A-3D), the S/P-GW is replaced with a user plane function (UPF), and the MME is replaced with two individual functional components, the Access Management Function (AMF) and the Session Management Function (SMF). The 4G HSS is split into different entities in 5G: the Authentication Server Function (AUSF) and the Universal Data Management (UDM), with the subscription data being managed via the Universal Data Management (UDM) function. In EPC, the S1 interface can be split into two parts: the S1-U (user plane) interface which carries traffic data between the eNBs 148, 150 and the S-GW 138 via the MEC hosts 102, 104, and the S1-AP (control plane) interface which is a signaling interface between the eNBs 148, 150 and the MME 142.

The MME 142 may be similar in function to the control plane of legacy Serving General Packet Radio Service (GPRS) Support Nodes (SGSN). The MME 142 may manage mobility aspects in access such as gateway selection and tracking area list management. The HSS 144 may comprise a database for network users, including subscription-related information to support the network entities' handling of communication sessions, including subscription information associated with V2X communications. The CN 110 may comprise one or several HSSs 144, depending on the number of mobile subscribers, on the capacity of the equipment, on the organization of the network, etc. For example, the HSS 144 can provide support for routing/roaming, authentication, authorization (e.g., V2X communication authorization), naming/addressing resolution, location dependencies, etc.

The S-GW 138 may terminate the S1 interface 413 towards the RANs of eNBs 148, 150, and route data packets between the RANs and the CN 110. Also, the S-GW 138 may be a local mobility anchor point for inter-RAN node handovers and also may provide an anchor for inter-3GPP mobility. Other responsibilities may include charging and some policy enforcement.

The P-GW 140 may terminate an SGi interface toward a PDN. The P-GW 140 may route data packets between the RANs and external networks such as a network including the application server (AS) 114 (alternatively referred to as application function (AF)) via an Internet Protocol (IP) interface (e.g., an interface to the network 112 coupled to the AS 114. The P-GW 140 can also communicate data to other external networks, which can include the Internet, IP multimedia subsystem (IPS) network, and other networks. Generally, the application server 114 may be an element offering applications that use IP bearer resources with the core network (e.g., UMTS Packet Services (PS) domain, LTE PS data services, etc.). The application server 114 can also be configured to support one or more communication services (e.g., Voice-over-Internet Protocol (VoIP) sessions, PTT sessions, group communication sessions, social networking services, etc.) for the UEs 152, 154 via the CN 110 and one or more of the MEC hosts 102, 104.

The P-GW 140 may further include a node for policy enforcement and charging data collection. A Policy and Charging Enforcement Function (PCRF) (not illustrated in FIG. 1A) can be the policy and charging control element of the CN 110. In a non-roaming scenario, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF may be communicatively coupled to the application server 114 via the P-GW 140. The application server 114 may signal the PCRF to indicate a new service flow and select the appropriate Quality of Service (QoS) and charging parameters.

The V2X control function 146 is used in connection with authorizing UEs to use V2X services based on HSS information (e.g., subscription information managed by the HSS 144), assist one or more UEs in obtaining the network address of an application server (e.g., 114) or a V2X application server, as well as providing V2X configuration parameters for direct communication (i.e., device-to-device communications). The interface for direct device-to-device communication is referred to as PC5. The PC5 parameters may be provided by the V2X control function 146 to one or more UEs for purposes of configuring V2X communication between the UEs.

The slice management function 164 can be used for configuring one or more network slice instances (NSIs) (e.g., 5G slices or 5G NSIs) for use by UEs or other devices within the communication architecture 100A, where the slice configuration maybe with the assistance of the MEC NFV-SCF (e.g., 121 and 131) as discussed herein.

The MEC hosts 102, . . . , 104 can be configured per the ETSI GS MEC-003 and ETSI GR MEC-024 specifications. The MEC host 102 can include a MEC platform 118, which can be coupled to one or more MEC applications (apps) such as MEC apps 116A, . . . , 116N (collectively, MEC app 116) and to a MEC data plane 122. The MEC host 104 can include a MEC platform 126, which can be coupled to a MEC app 116 and a MEC data plane 130. The MEC platform manager 106 can include a MEC platform element management module 132, a MEC application rules and requirements management module 134, and a MEC application lifecycle management module 136. The MEC host 102 also includes MEC hardware 123, such as network interfaces (e.g. network interface cards or NICs) 125A, . . . , 125N, one or more CPUs 127, and memory 129. Additional description of the MEC related entities 102, 104, 106, and 108 are provided hereinbelow in connection with FIG. 4A and FIG. 4B.

In some aspects, the MEC apps 116A, . . . , 116N can each provide an NFV instance configured to process network connections associated with a specific network traffic type (e.g., 2G, 3G, 4G, 5G or another network traffic type) associated with a UE quality of service (QoS) flow for a network slice instance. In this regard, the terms "MEC app" and "NFV" (or "MEC NFV") are used interchangeably. Additionally, the term "NFV" and "NFV instance" are used interchangeably. The MEC platform 118 can further include one or more schedulers 120A, . . . , 120N (collectively, a scheduler 120). Each of the schedulers 120A, . . . , 120N may comprise suitable circuitry, logic, interfaces, and/or code and is configured to manage instantiation of NFVs (e.g., as MEC apps) 116A, . . . , 116N (collectively, an NFV 116). More specifically, a scheduler 120 can select a CPU (e.g., one of the CPUs 127) and/or other network resources for executing/instantiating the NFV 116. Additionally, since each of the NFVs 116A, . . . , 116N is associated with processing a different network traffic type, the scheduler 120 can further select a NIC (e.g., from the available NICs 125A, . . . , 125N) for use by the NFV 116. Each of the schedulers 120A, . . . , 120N can have a different type of SLA and QoS requirements, based on the network traffic type handled by the associated NFV. For example, each traffic type (e.g., 2G, 3G, 4G, 5G, or any other type of wireless connection to the MEC host) has an associated class of service (CloS) (e.g., 2G_low, 2G_mid, 2G_high, etc.) which can be preconfigured in the MEC host, defining CloS-specific resource requirements (i.e., I/O, memory, processing power, etc.) for different loads of that particular traffic type.

FIG. 1A further illustrates the MEC host 104 including MEC hardware 133, a MEC NFV-SCF 131, and schedulers 128A, . . . , 128N, which can have the same functionality as the MEC hardware 123, the MEC NFV-SCF 121, and the schedulers 120A, . . . , 120N described in connection with MEC host 102. Even though the MEC NFV-SCF 121 is illustrated as being implemented within the MEC platform 118, the present disclosure is not limited in this regard and one or more components of the MEC NFV-SCF 121 can be implemented within other modules of the MEC host 102 (such as the MEC data plane 122), a network function virtualization infrastructure, a network function virtualization orchestrator (e.g., NFVO 160), the MEC orchestrator 108, the MEC platform manager 106, or another entity within the architecture 100A or as a stand-alone node.

In some aspects, the MEC architecture 100A (or any of the MEC architectures discussed herein) can be configured to provide functionalities per the ETSI GS MEC-003 specification, the ETSI GR MEC-024 specification, and/or the ETSI GR MEC-017 specification.

Figure 1B:
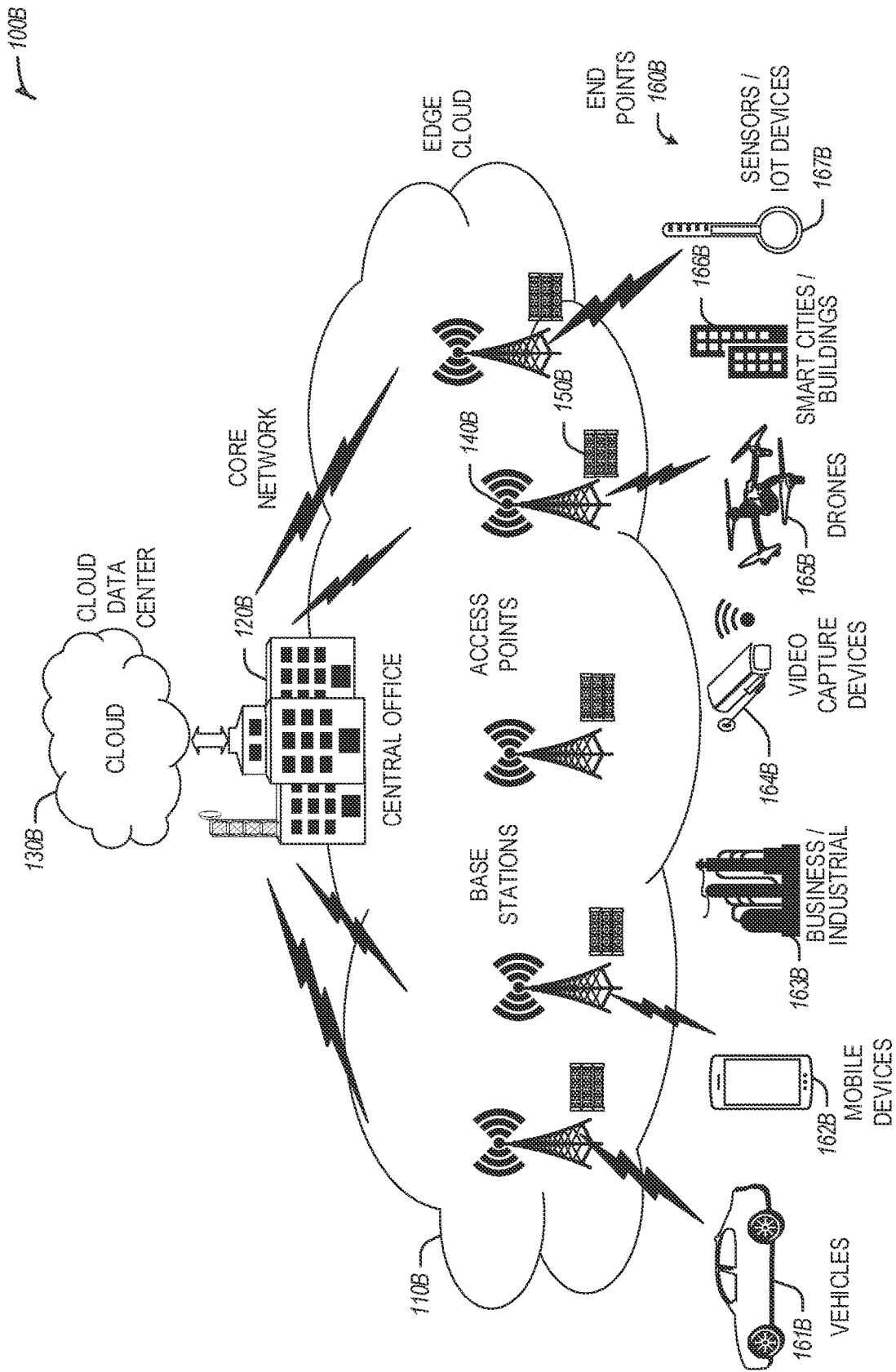
FIG. 1B illustrates an overview of an edge cloud configuration for edge computing, according to an example.

FIG. 1B is a block diagram 100B showing an overview of a configuration for edge computing, which includes a layer of processing referenced in many of the current examples as an "edge cloud". This network topology, which may include several conventional networking layers (including those not shown herein), may be extended through the use of E2E multi-slice support for configuring network resources associated with network slice instances (NSIs) within MEC-enabled 5G communication systems, to optimize the instantiation of MEC apps and virtualized resources associated with the NSI.

As shown, the edge cloud 110B is co-located at an edge location, such as the base station 140B, a local processing hub 150B, or a central office 120B, and thus may include multiple entities, devices, and equipment instances. The edge cloud 110B is located much closer to the endpoint (consumer and producer) data sources 160B (e.g., autonomous vehicles 161B, user equipment 162B, business, and industrial equipment 163B, video capture devices 164B, drones 165B, smart cities and building devices 166B, sensors and IoT devices 167B, etc.) than the cloud data center 130B. Compute, memory, and storage resources which are offered at the edges in the edge cloud 110B are critical to providing ultra-low latency response times for services and functions used by the endpoint data sources 160B as well as reduce network backhaul traffic from the edge cloud 110B toward cloud data center 130 thus improving energy consumption and overall network usages among other benefits.

Compute, memory, and storage are scarce resources, and generally, decrease depending on the edge location (e.g., fewer processing resources being available at consumer endpoint devices than at a base station or a central office). However, the closer that the edge location is to the endpoint (e.g., UEs), the more that space and power are constrained. Thus, edge computing, as a general design principle, attempts to minimize the number of resources needed for network services, through the distribution of more resources which are located closer both geographically and in-network access time.

The following describes aspects of an edge cloud architecture that covers multiple potential deployments and addresses restrictions that some network operators or service providers may have in their infrastructures. These include variation of configurations based on the edge location (because edges at a base station level, for instance, may have more constrained performance); configurations based on the type of compute, memory, storage, fabric, acceleration, or like resources available to edge locations, tiers of locations, or groups of locations; the service, security, and management and orchestration capabilities; and related objectives to achieve usability and performance of end services.

Edge computing is a developing paradigm where computing is performed at or closer to the "edge" of a network, typically through the use of a compute platform implemented at base stations, gateways, network routers, or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for the connected user equipment, without further communicating data via backhaul networks. Or as another example, central office network management hardware may be replaced with compute hardware that performs virtualized network functions and offers compute resources for the execution of services and consumer functions for connected devices. These and other scenarios may involve the use of platform resource management, as provided in the discussion below.

In contrast to the network architecture of FIG. 1A, traditional endpoint (e.g., UE, vehicle-to-vehicle (V2V), vehicle-to-everything (V2X), etc.) applications are reliant on local device or remote cloud data storage and processing to exchange and coordinate information. A cloud data arrangement allows for long-term data collection and storage but is not optimal for highly time-varying data, such as a collision, traffic light change, etc. and may fail in attempting to meet latency challenges.

Depending on the real-time requirements in a communications context, a hierarchical structure of data processing and storage nodes may be defined in an edge computing deployment. For example, such a deployment may include local ultra-low-latency processing, regional storage, and processing as well as remote cloud data-center based storage and processing. Key performance indicators (KPIs) may be used to identify where sensor data is best transferred and where it is processed or stored. This typically depends on the ISO layer dependency of the data. For example, a lower layer (PHY, MAC, routing, etc.) data typically changes quickly and is better handled locally to meet latency requirements. Higher layer data such as Application-Layer data is typically less time-critical and may be stored and processed in a remote cloud data-center.

Figure 2A:
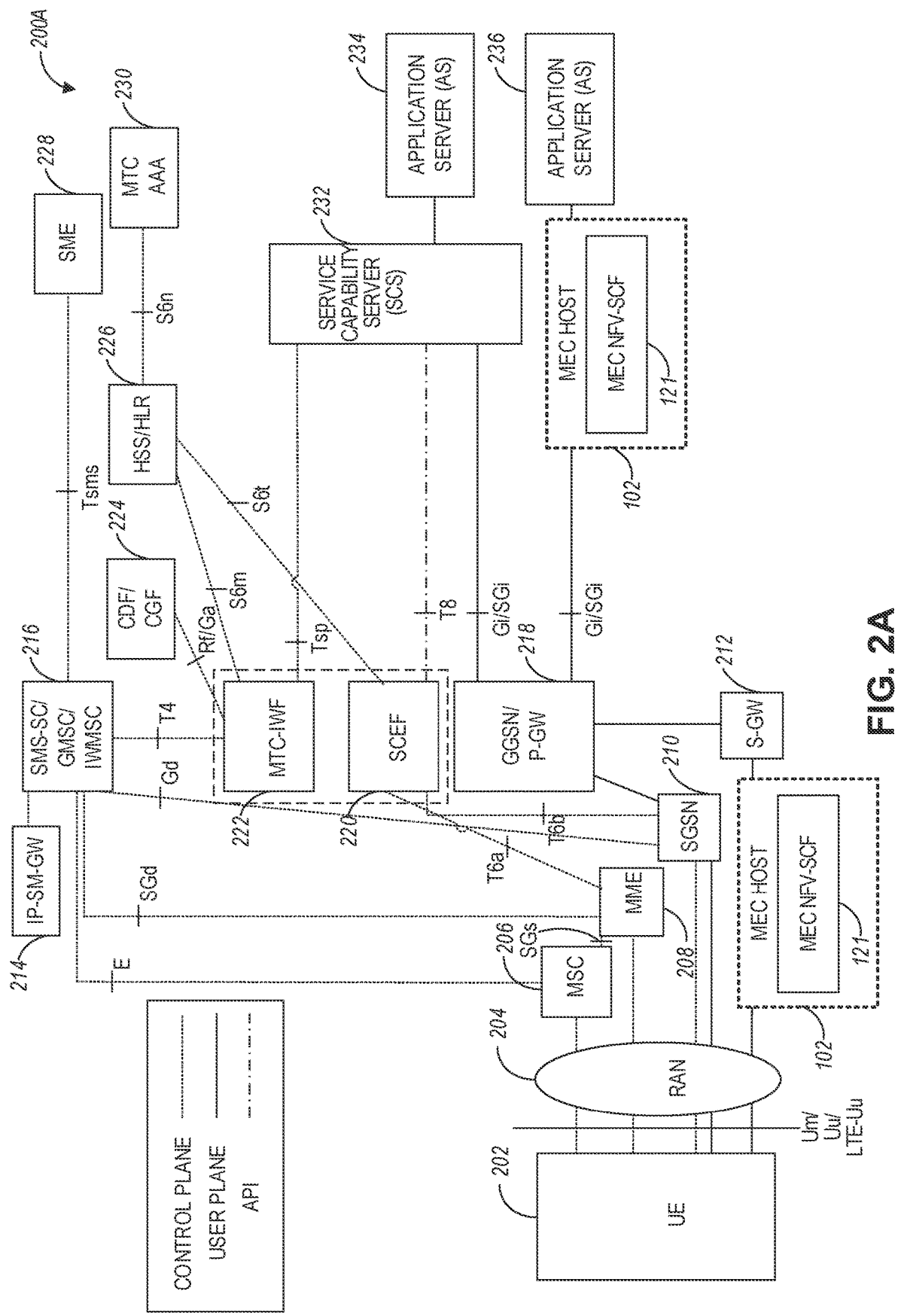
FIG. 2A illustrates an example Cellular Internet-of-Things (CIoT) network architecture with a MEC host using a MEC QoS manager, according to an example.

FIG. 2A illustrates an example Cellular Internet-of-Things (CIoT) network architecture with a MEC host using a MEC QoS manager, according to an example. Referring to FIG. 2A, the CIoT architecture 200A can include the UE 202 and the RAN 204 coupled to a plurality of core network entities. In some aspects, the UE 202 can be a machine-type communication (MTC) UE. The CIoT network architecture 200A can further include a mobile services switching center (MSC) 206, MME 208, a serving GPRS support node (SGSN) 210, a S-GW 212, an IP-Short-Message-Gateway (IP-SM-GW) 214, a Short Message Service-Service Center (SMS-SC)/gateway mobile service center (GMSC)/Interworking MSC (IWMSC) 216, MTC interworking function (MTC-IWF) 222, a Service Capability Exposure Function (SCEF) 220, a gateway GPRS support node (GGSN)/Packet-GW (P-GW) 218, a charging data function (CDF)/charging gateway function (CGF) 224, a home subscriber server (HSS)/a home location register (HLR) 226, short message entities (SME) 228, MTC authorization, authentication, and accounting (MTC AAA) server 230, a service capability server (SCS) 232, and application servers (AS) 234 and 236. In some aspects, the SCEF 220 can be configured to securely expose services and capabilities provided by various 3GPP network interfaces. The SCEF 220 can also provide means for the discovery of the exposed services and capabilities, as well as access to network capabilities through various network application programming interfaces (e.g., API interfaces to the SCS 232).

FIG. 2A further illustrates various reference points (or interfaces) between different servers, functions, or communication nodes of the CIoT network architecture 200A. Some example reference points related to MTC-IWF 222 and SCEF 220 include the following: Tsms (a reference point used by an entity outside the 3GPP network to communicate with UEs used for MTC via SMS), Tsp (a reference point used by a SCS to communicate with the MTC-IWF related control plane signaling), T4 (a reference point used between MTC-IWF 222 and the SMS-SC 216 in the HPLMN), T6a (a reference point used between SCEF 220 and serving MME 208), T6b (a reference point used between SCEF 220 and serving SGSN 210), T8 (a reference point used between the SCEF 220 and the SCS/AS 234, 236), S6m (a reference point used by MTC-IWF 222 to interrogate HSS/HLR 226), S6n (a reference point used by MTC-AAA server 230 to interrogate HSS/HLR 226), and S6t (a reference point used between SCEF 220 and HSS/HLR 226).

In some aspects, the UE 202 can be configured to communicate with one or more entities within the CIoT architecture 200A via the RAN 204 (e.g., CIoT RAN) according to a Non-Access Stratum (NAS) protocol, and using one or more radio access configuration, such as a narrowband air interface, for example, based on one or more communication technologies, such as Orthogonal Frequency-Division Multiplexing (OFDM) technology. As used herein, the term "CIoT UE" refers to a UE capable of CIoT optimizations, as part of a CIoT communications architecture. In some aspects, the NAS protocol can support a set of NAS messages for communication between the UE 202 and an Evolved Packet System (EPS) Mobile Management Entity (MME) 208 and SGSN 210. In some aspects, the CIoT network architecture 200A can include a packet data network, an operator network, or a cloud service network, having, for example, among other things, servers such as the Service Capability Server (SCS) 232, the AS 234, or one or more other external servers or network components.

The RAN 204 can be coupled to the HSS/HLR servers 226 and the AAA servers 230 using one or more reference points including, for example, an air interface based on an S6a reference point, and configured to authenticate/authorize CIoT UE 202 to access the CIoT network. The RAN 204 can be coupled to the CIoT network architecture 200A using one or more other reference points including, for example, an air interface corresponding to an SGi/Gi interface for 3GPP accesses. The RAN 204 can be coupled to the SCEF 220 using, for example, an air interface based on a T6a/T6b reference point, for service capability exposure. In some aspects, the SCEF 220 may act as an API GW towards a third-party application server such as server 234. The SCEF 220 can be coupled to the HSS/HLR 226 and MTC AAA 230 servers using an S6t reference point and can further expose an Application Programming Interface to network capabilities.

In certain examples, one or more of the CIoT devices disclosed herein, such as the UE 202, the RAN 204, etc., can include one or more other non-CIoT devices, or non-CIoT devices acting as CIoT devices, or having functions of a CIoT device. For example, the UE 202 can include a smartphone, a tablet computer, or one or more other electronic device acting as a CIoT device for a specific function, while having other additional functionality. In some aspects, the RAN 204 can include a CIoT enhanced Node B (CIoT eNB) communicatively coupled to a CIoT Access Network Gateway (CIoT GW). In certain examples, the RAN 204 can include multiple base stations (e.g., CIoT eNBs or other types of base stations) connected to the CIoT GW, which can include MSC 206, MME 208, SGSN 210, or S-GW 212. In certain examples, the internal architecture of RAN 204 and the CIoT GW may be left to the implementation and need not be standardized.

In some aspects, the CIoT architecture 200A can include one or more MEC hosts that can provide a communication link between different components of the CIoT architecture. For example, MEC host 102 can be coupled between the RAN 204 and the S-GW 212. In this case, the MEC host 102 can use one or more NFV instances to process wireless connections with the RAN 204 and the S-GW 212. The MEC host 102 can also be coupled between the P-GW 218 and the application server 236. In this case, the MEC host 102 can use one or more NFV instances to process wireless connections associated with one or more network slice instances, originating from or terminating at the P-GW 218 and the application server 236. In some aspects, the MEC host 102 includes a MEC NFV-SCF module 121, which is configured according to techniques disclosed herein to provide multi-slice support for the one or more network slice instances within MEC-enabled 5G deployments.

Figure 2B:
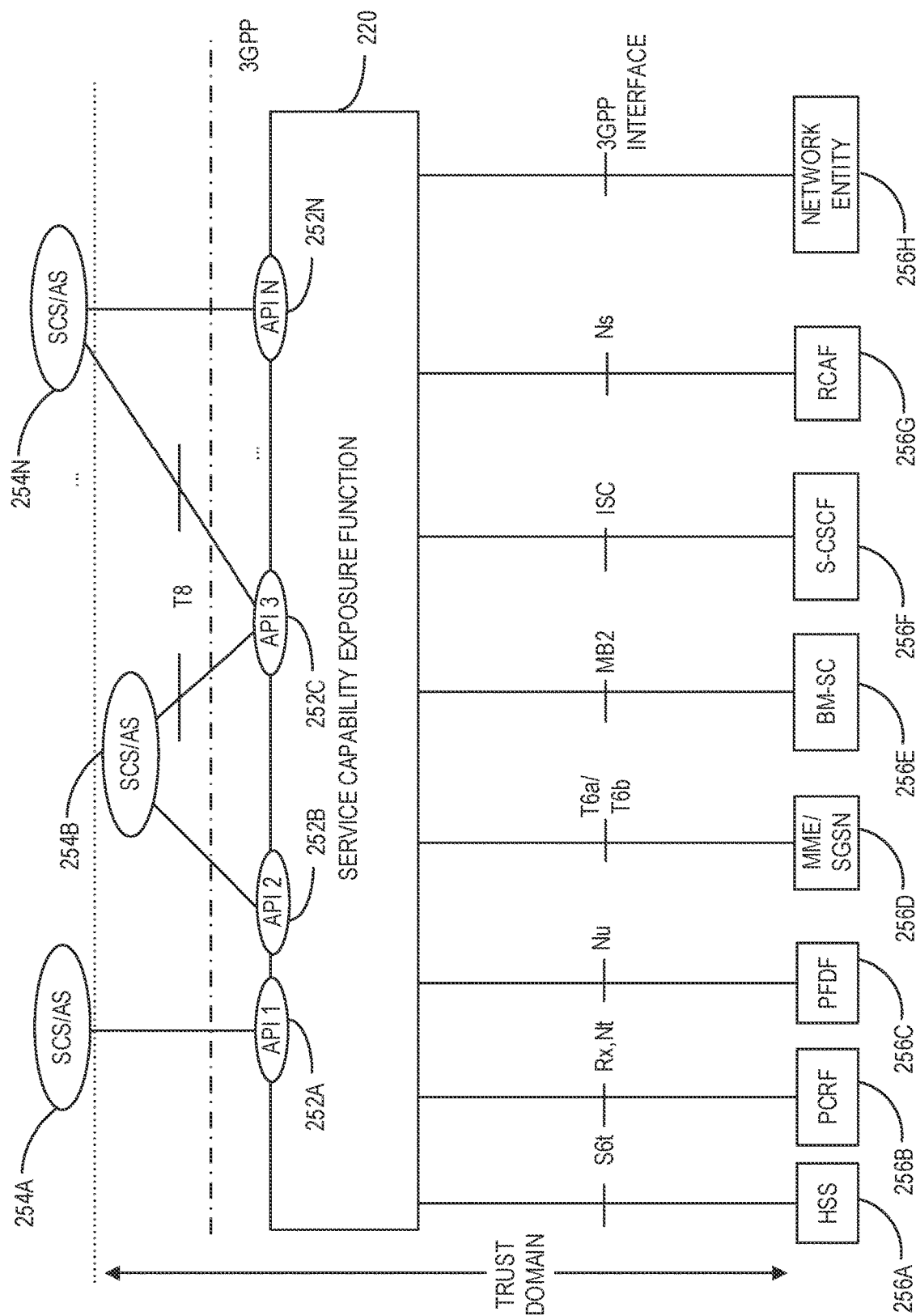
FIG. 2B illustrates an example Service Capability Exposure Function (SCEF) used by the CIoT network architecture of FIG. 2A, according to an example.

FIG. 2B illustrates an example Service Capability Exposure Function (SCEF) used by the CIoT network architecture of FIG. 2A, according to an example. Referring to FIG. 2B, the SCEF 220 can be configured to expose services and capabilities provided by 3GPP network interfaces to external third-party service provider servers hosting various applications. In some aspects, a 3GPP network such as the CIoT architecture 200A can expose the following services and capabilities: a home subscriber server (HSS) 256A, a policy and charging rules function (PCRF) 256B, a packet flow description function (PFDF) 256C, a MME/SGSN 256D, a broadcast multicast service center (BM-SC) 256E, a serving call server control function (S-CSCF) 256F, a RAN congestion awareness function (RCAF) 256G, and one or more other network entities 256H. The above-mentioned services and capabilities of a 3GPP network can communicate with the SCEF 220 via one or more interfaces as illustrated in FIG. 2B. The SCEF 220 can be configured to expose the 3GPP network services and capabilities to one or more applications running on one or more service capability server (SCS)/application server (AS), such as SCS/AS 254A, 254B, . . . , 254N. Each of the SCS/AS 254A-254N can communicate with the SCEF 220 via application programming interfaces (APIs) 252A, 252B, 252C, . . . , 252N, as illustrated in FIG. 2B.

Figure 3A:
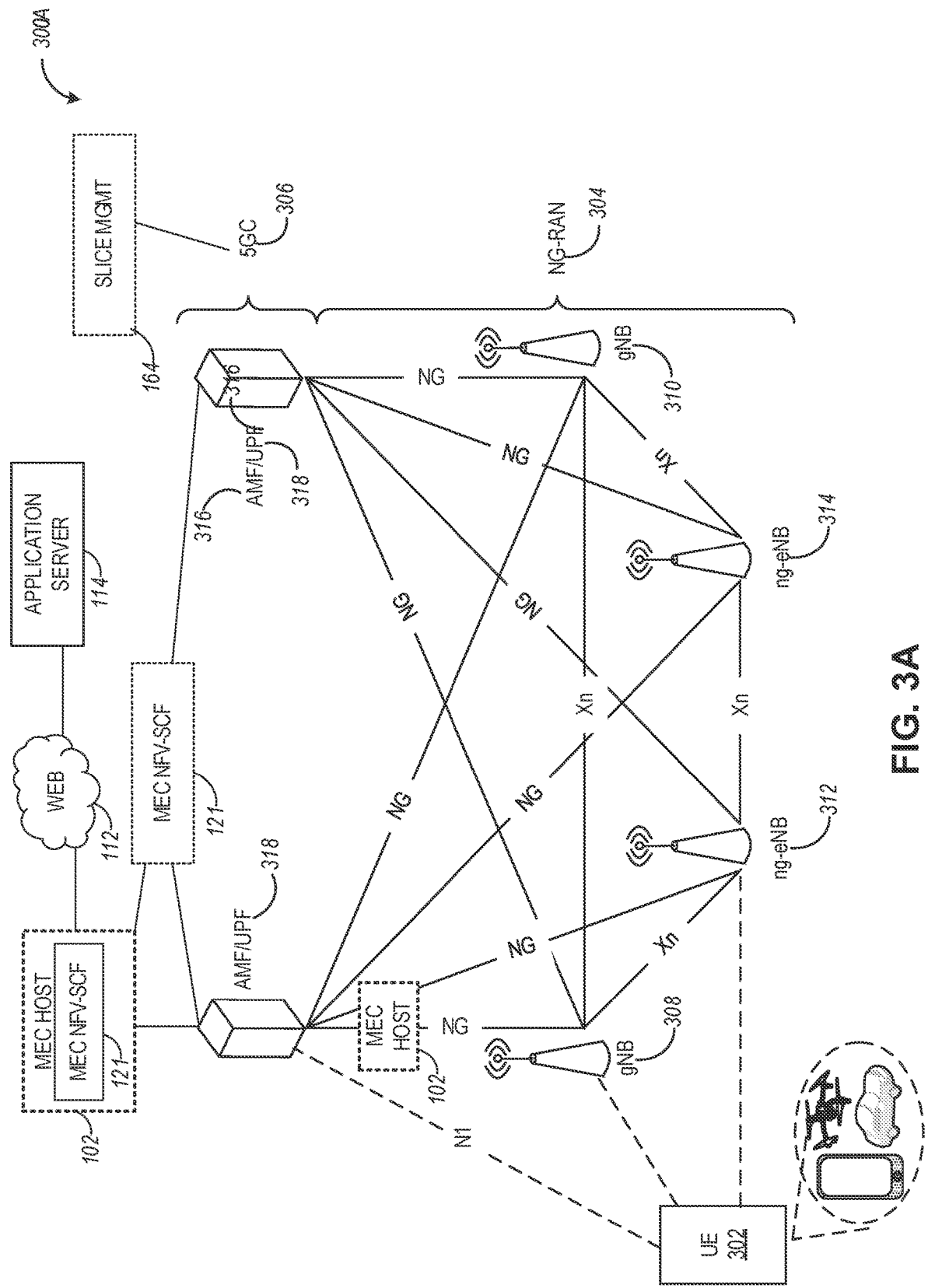
FIG. 3A is a simplified diagram of an exemplary Next-Generation (NG) system architecture with a MEC host using a MEC QoS manager, according to an example.

FIG. 3A is a simplified diagram of an exemplary Next-Generation (NG) system architecture with a MEC host using a MEC QoS manager, according to an example. Referring to FIG. 3A, the NG system architecture 300A includes NG-RAN 304 and a 5G network core (5GC) 306. The NG-RAN 304 can include a plurality of NG-RAN nodes, for example, gNBs 308 and 310, and NG-eNBs 312 and 314. The gNBs 308/310 and the NG-eNBs 312/314 can be communicatively coupled to the UE 302 via a wireless connection. The core network 306 (e.g., a 5G core network or 5GC) can include an access and mobility management function (AMF) 316 or a user plane function (UPF) 318. The AMF 316 and the UPF 318 can be communicatively coupled to the gNBs 308/310 and the NG-eNBs 312/314 via NG interfaces. More specifically, in some aspects, the gNBs 308/310 and the NG-eNBs 312/314 can be connected to the AMF 316 by N2 reference point, and to the UPF 318 by an N3 reference point. The gNBs 308/310 and the NG-eNBs 312/314 can be coupled to each other via Xn interfaces.

In some aspects, a gNB 308 can include a node providing New Radio (NR) user plane and control plane protocol termination towards the UE and can be connected via the NG interface to the 5GC 306. In some aspects, an NG-eNB 312/314 can include a node providing evolved universal terrestrial radio access (E-UTRA) user plane and control plane protocol terminations towards the UE and is connected via the NG interface to the 5GC 306. In some aspects, any of the gNBs 308/310 and the NG-eNBs 312/314 can be implemented as a base station (BS), a mobile edge server, a small cell, a home eNB, although aspects are not so limited.

In some aspects, the NG system architecture 300A can include one or more MEC hosts that can provide a communication link between different components of the NG architecture. For example, MEC host 102 can provide an interface between the AMF 316 (or the UPF 318) in the 5GC 306 and the application server 114. The MEC host 102 can use one or more NFV instances to process wireless connections associated with network slice instances with the 306 and the application server 114. The MEC host 102 can also be coupled between one or more of the gNBs (e.g., gNB 308) and the AMF/UPF in the 5GC 306. In this case, the MEC host 102 can use one or more NFV instances to process wireless connections of the NSIs, originating from or terminating at the gNB 308 and the 5GC 306.

In some aspects, the MEC host 102 includes an MEC NFV-SCF module 121, which is configured according to techniques disclosed herein to provide E2E multi-slice support for configuring network resources associated with network slice instances within MEC-enabled 5G communication systems, to optimize the instantiation of MEC apps and virtualized resources associated with the NSI. In some aspects, the MEC NFV-SCF module 121 can be incorporated as a standalone server or an application running on a virtual machine, which is accessible to the 5G core 306 as well as the MEC host 102. In some aspects, the 5G core 306 can provide slice management functionalities performed by the slice management module 164, as disclosed herein and with the assistance of the MEC NFV-SCF.

In some aspects, the system architecture 300A (which can be the same as 100A) can be a 5G-NR system architecture providing network slicing and supporting policy configuration and enforcement between network slices as per service level agreements (SLAs) within the RAN 304 (or 204). Additionally and as illustrated in greater detail in FIG. 3E, the RAN 304 can provide separation of central unit control plane (CU-CP) and central unit user plane (CU-UP) functionalities while supporting network slicing (e.g., using resource availability and latency information communication via different RAN interfaces (or reference points), such as E1, F1-C, and F1-U interfaces). In some aspects, the UE 302 (or 152) can communicate RRC signaling to the gNB 308 for establishing a connection with an entity (e.g., UPF 318) of the 5GC 306. The gNB 308 can include separate distributed units (DUs), CU-CP, and CU-UP entities (as illustrated in FIG. 3E). The CU-CP entity can obtain resource utilization and latency information from the DU and CU-UP entities and select a DU/CU-UP pair based on such information for purposes of configuring the network slice. Network slice configuration information associated with the configured network slice (including resources for use while communicating via the slice) can be provided to the UE 302 for purposes of initiating data communication with the 5GC UPF entity 318 using the network slice.

Figure 3B:
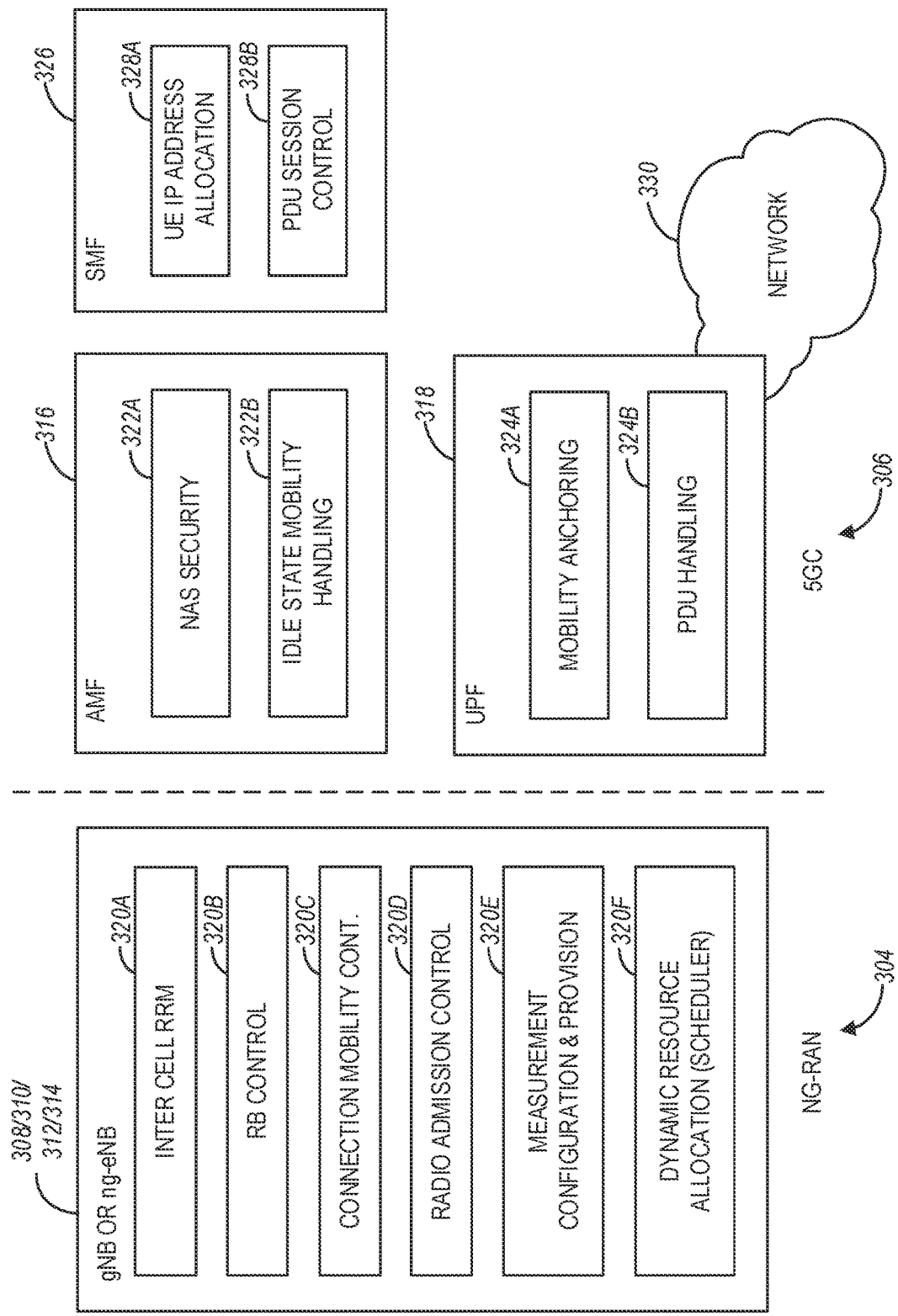
FIG. 3B illustrates an exemplary functional split between next generation radio access network (NG-RAN) and the 5G Core network (5GC) in connection with the NG system architecture of FIG. 3A, according to an example.

FIG. 3B illustrates an exemplary functional split between next generation radio access network (NG-RAN) and the 5G Core network (5GC) in connection with the NG system architecture of FIG. 3A, according to an example. FIG. 3B illustrates some of the functionalities the gNBs 308/310 and the NG-eNBs 312/314 can perform within the NG-RAN 304, as well as the AMF 316, the UPF 318, and a Session Management Function (SMF) 326 (not illustrated in FIG. 3A) within the 5GC 306. In some aspects, the 5GC 306 can provide access to a network 330 (e.g., the Internet) to one or more devices via the NG-RAN 304.

In some aspects, the gNBs 308/310 and the NG-eNBs 312/314 can be configured to host the following functions: functions for Radio Resource Management (e.g., inter-cell radio resource management 320A, radio bearer control 320B, connection mobility control 320C, radio admission control 320D, measurement and measurement reporting configuration for mobility and scheduling 320E, and dynamic allocation of resources to UEs in both uplink and downlink (scheduling) 320F); IP header compression; encryption and integrity protection of data; selection of an AMF at UE attachment when no routing to an AMF can be determined from the information provided by the UE; routing of User Plane data towards UPF(s); routing of Control Plane information towards AMF; connection setup and release; scheduling and transmission of paging messages (originated from the AMF); scheduling and transmission of system broadcast information (originated from the AMF or Operation and Maintenance); transport level packet marking in the uplink; session management; support of network slicing; QoS flow management and mapping to data radio bearers; support of UEs in RRC_INACTIVE state; distribution function for non-access stratum (NAS) messages; radio access network sharing; dual connectivity; and tight interworking between NR and E-UTRA, to name a few.

In some aspects, the AMF 316 can be configured to host the following functions, for example, NAS signaling termination; NAS signaling security 322A; access stratum (AS) security control; inter-core network (CN) node signaling for mobility between 3GPP access networks; idle state/mode mobility handling 322B, including mobile device, such as a UE reachability (e.g., control and execution of paging retransmission); registration area management; support of intra-system and inter-system mobility; access authentication; access authorization including check of roaming rights; mobility management control (subscription and policies); support of network slicing; or SMF selection, among other functions.

The UPF 318 can be configured to host the following functions, for example, mobility anchoring 324A (e.g., anchor point for Intra-/Inter-RAT mobility); packet data unit (PDU) handling 324B (e.g., external PDU session point of interconnect to data network); packet routing and forwarding; packet inspection and user plane part of policy rule enforcement; traffic usage reporting; uplink classifier to support routing traffic flows to a data network; branching point to support multi-homed PDU session; QoS handling for user plane, e.g., packet filtering, gating, UL/DL rate enforcement; uplink traffic verification (SDF to QoS flow mapping); or downlink packet buffering and downlink data notification triggering, among other functions.

The Session Management Function (SMF) 326 can be configured to host the following functions, for example, session management; UE IP address allocation and management 328A; selection and control of user plane function (UPF); PDU session control 328B, including configuring traffic steering at UPF 318 to route traffic to proper destination; control part of policy enforcement and QoS; or downlink data notification, among other functions.

Figure 3C:
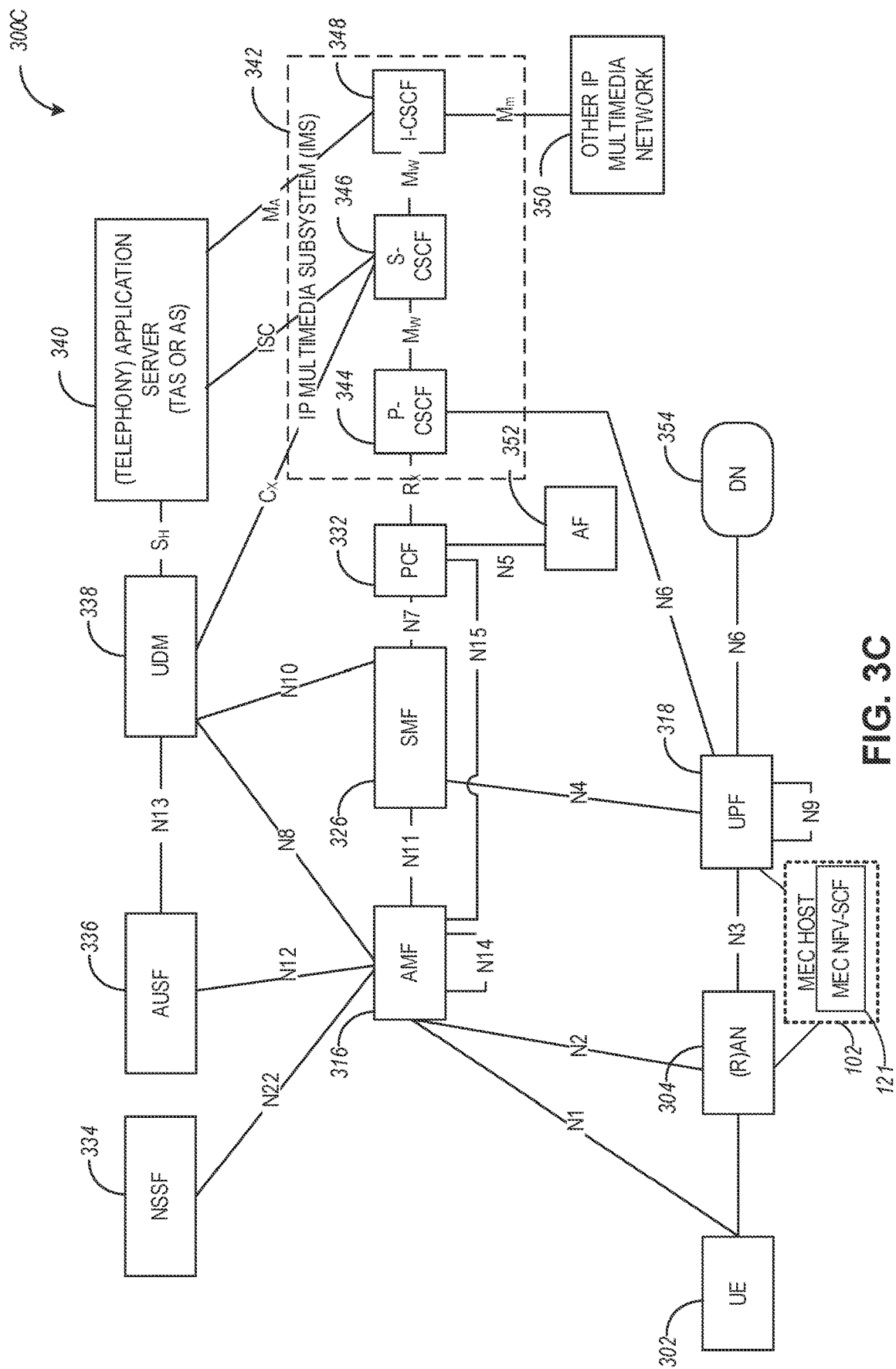
FIG. 3C and FIG. 3D illustrate non-roaming 5G system architectures with a MEC host using resource management and traceability functions, according to an example.
Figure 3D:
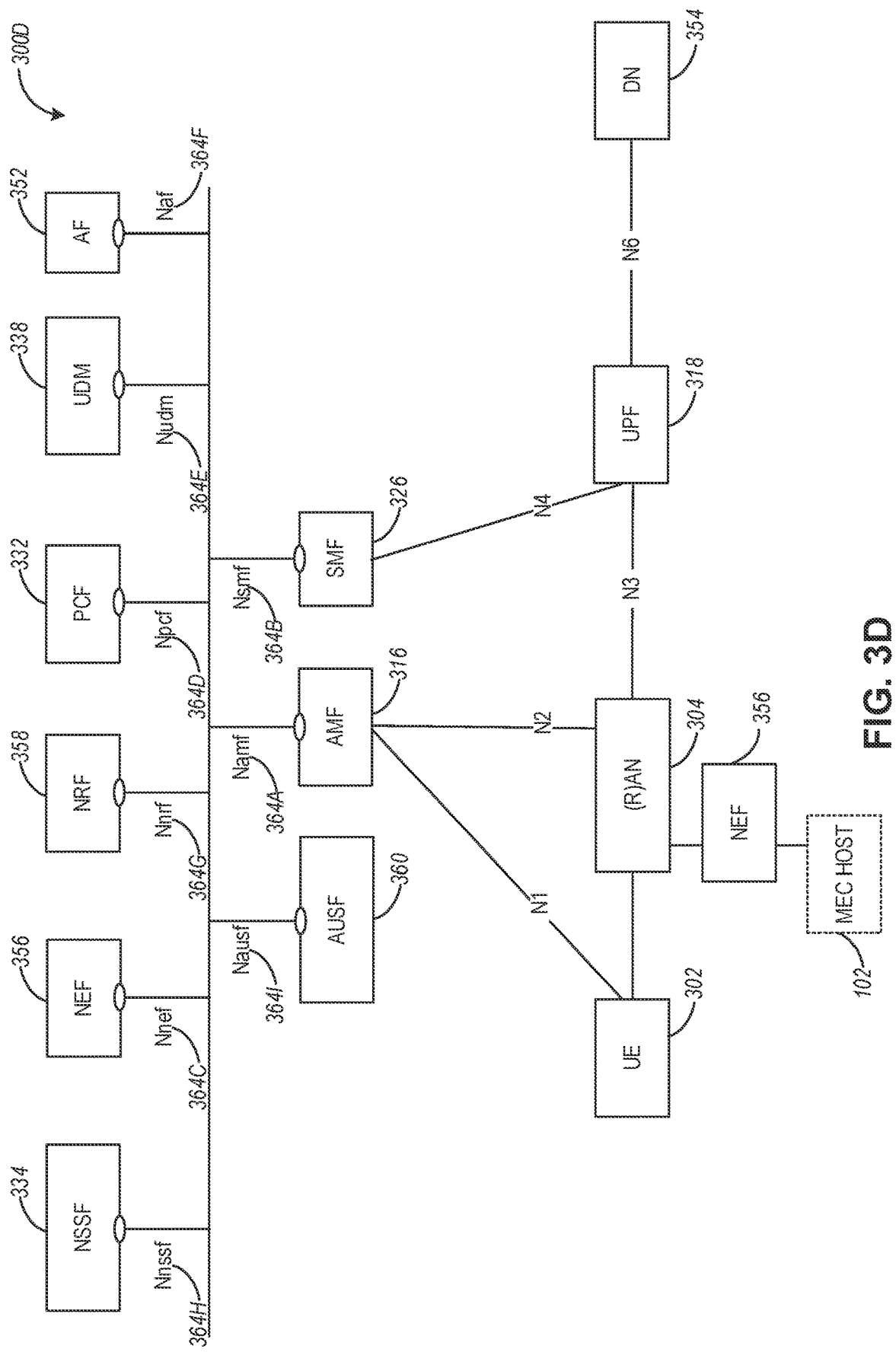
Figure 3E:
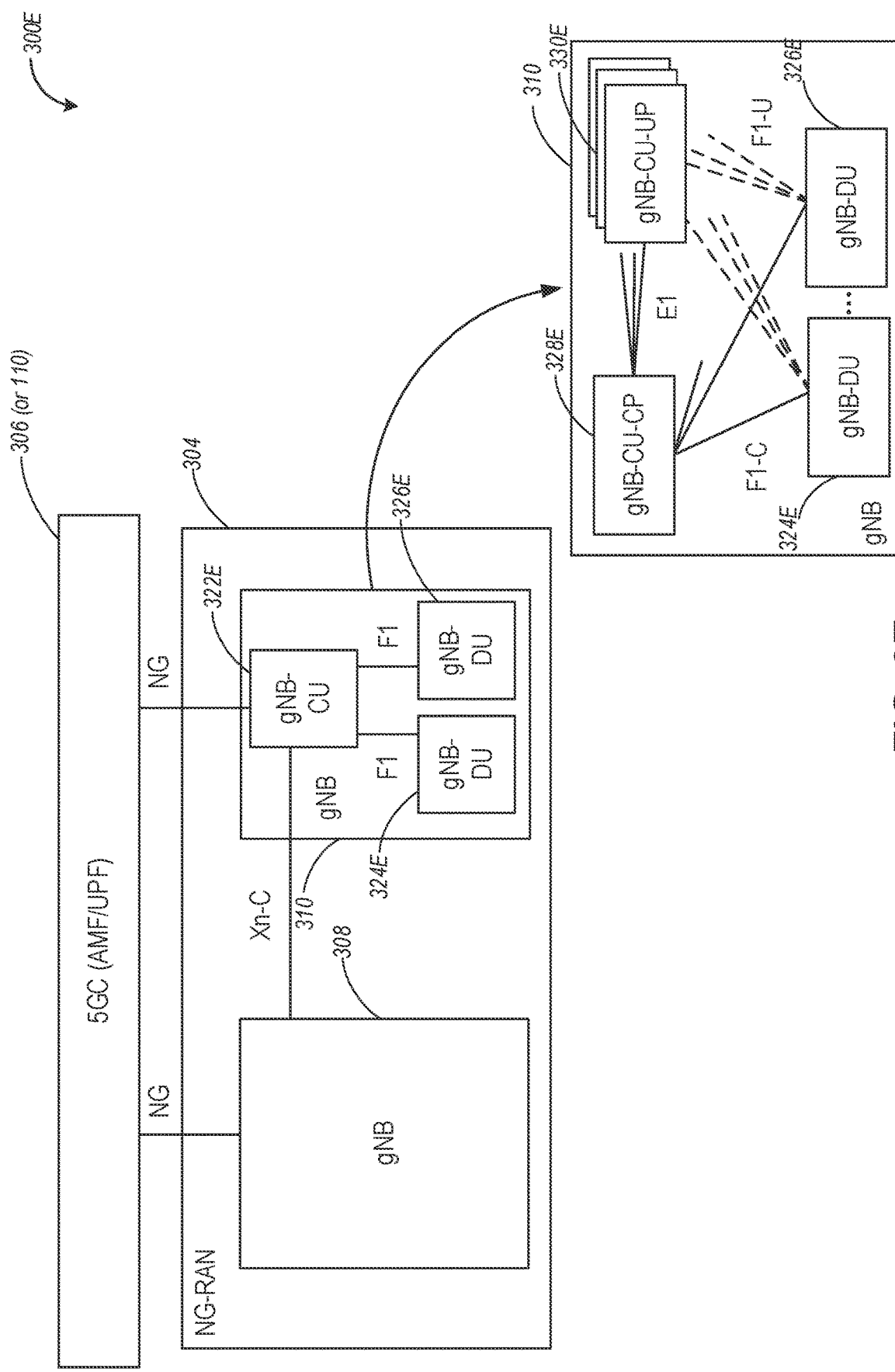
FIG. 3E illustrates components of an exemplary 5G-NR architecture with control unit control plane (CU-CP)—control unit user plane (CU-UP) separation, according to an example.

FIG. 3C and FIG. 3D illustrate exemplary non-roaming 5G system architectures with a MEC host using a MEC QoS manager, according to an example. Referring to FIG. 3C, an exemplary 5G system architecture 300C is illustrated in a reference point representation. More specifically, UE 302 can be in communication with RAN 304 as well as one or more other 5G core (5GC) network entities. The 5G system architecture 300C includes a plurality of network functions (NFs), such as access and mobility management function (AMF) 316, session management function (SMF) 326, policy control function (PCF) 332, application function (AF) 352, user plane function (UPF) 318, network slice selection function (NSSF) 334, authentication server function (AUSF) 336, and unified data management (UDM) 338.

The UPF 318 can provide a connection to a data network (DN) 354, which can include, for example, operator services, Internet access, or third-party services. The AMF 316 can be used to manage access control and mobility and can also include network slice selection functionality. The SMF 326 can be configured to set up and manage various sessions according to network policy. The UPF 318 can be deployed in one or more configurations according to the desired service type. The PCF 332 can be configured to provide a policy framework using network slicing, mobility management, and roaming (similar to PCRF in a 4G communication system). The UDM 338 can be configured to store subscriber profiles and data (similar to an HSS in a 4G communication system), such as V2X subscription information or another type of subscription information for services available within the architecture 300C.

In some aspects, the 5G system architecture 300C includes an IP multimedia subsystem (IMS) 342 as well as a plurality of IP multimedia core network subsystem entities, such as call session control functions (CSCFs). More specifically, the IMS 342 includes a CSCF, which can act as a proxy CSCF (P-CSCF) 344, a serving CSCF (S-CSCF) 346, an emergency CSCF (E-CSCF) (not illustrated in FIG. 3C), or interrogating CSCF (I-CSCF) 348. The P-CSCF 344 can be configured to be the first contact point for the UE 302 within the IMS 342. The S-CSCF 346 can be configured to handle the session states in the network, and the E-CSCF can be configured to handle certain aspects of emergency sessions such as routing an emergency request to the correct emergency center or public safety answering point (PSAP). The I-CSCF 348 can be configured to function as the contact point within an operator's network for all IMS connections destined to a subscriber of that network operator, or a roaming subscriber currently located within that network operator's service area. In some aspects, the I-CSCF 348 can be connected to another IP multimedia network 350, e.g. an IMS operated by a different network operator.

In some aspects, the UDM 338 can be coupled to an application server 340, which can include a telephony application server (TAS) or another application server (AS) including a MEC host. The AS 340 can be coupled to the IMS 342 via the S-CSCF 346 or the I-CSCF 348. In some aspects, the 5G system architecture 300C can use one or more MEC hosts to provide an interface and offload processing of wireless communication traffic. For example and as illustrated in FIG. 3C, the MEC host 102 can provide a connection between the RAN 304 and UPF 318 in the core network. The MEC host 102 can use one or more NFV instances instantiated on virtualization infrastructure within the host to process wireless connections of one or more network slice instances to and from the RAN 304 and the UPF 318. Additionally, the MEC host 102 can use the MEC NFV-SCF module 121, which is configured according to techniques disclosed herein to provide E2E multi-slice support for configuring network resources associated with network slice instances within MEC-enabled 5G communication systems, to optimize the instantiation of MEC apps and virtualized resources associated with the NSI.

FIG. 3D illustrates an exemplary 5G system architecture 300D in a service-based representation. System architecture 300D can be substantially similar to (or the same as) system architecture 300C. In addition to the network entities illustrated in FIG. 3C, system architecture 300D can also include a network exposure function (NEF) 356 and a network repository function (NRF) 358. In some aspects, 5G system architectures can be service-based and interaction between network functions can be represented by corresponding point-to-point reference points Ni (as illustrated in FIG. 3C) or as service-based interfaces or reference points (as illustrated in FIG. 3D).

A reference point representation shows that interaction can exist between corresponding NF services. For example, FIG. 3C illustrates the following reference points: N1 (between the UE 302 and the AMF 316), N2 (between the RAN 304 and the AMF 316), N3 (between the RAN 304 and the UPF 318), N4 (between the SMF 326 and the UPF 318), N5 (between the PCF 332 and the AF 352), N6 (between the UPF 318 and the DN 354), N7 (between the SMF 326 and the PCF 332), N8 (between the UDM 338 and the AMF 316), N9 (between two UPFs 318), N10 (between the UDM 338 and the SMF 326), N11 (between the AMF 316 and the SMF 326), N12 (between the AUSF 336 and the AMF 316), N13 (between the AUSF 336 and the UDM 338), N14 (between two AMFs 316), N15 (between the PCF 332 and the AMF 316 in case of a non-roaming scenario, or between the PCF 332 and a visited network and AMF 316 in case of a roaming scenario), N16 (between two SMFs; not shown), N22 (between AMF 316 and NSSF 334), and N33 (between NEF and AF; not shown). Other reference point representations not shown in FIG. 3C can also be used and are defined in the following 3GPP specification: TS 23.501, TS 22.261, TS 28.531, TS 28.532, and 38.300.

In some aspects, as illustrated in FIG. 3D, service-based representations can be used to represent network functions within the control plane that enable other authorized network functions to access their services. In this regard, 5G system architecture 300D can include the following service-based interfaces: Namf 364A (a service-based interface exhibited by the AMF 316), Nsmf 364B (a service-based interface exhibited by the SMF 326), Nnef 364C (a service-based interface exhibited by the NEF 356), Npcf 364D (a service-based interface exhibited by the PCF 332), Nudm 364E (a service-based interface exhibited by the UDM 338), Naf 364F (a service-based interface exhibited by the AF 352), Nnrf 364G (a service-based interface exhibited by the NRF 358), Nnssf 364H (a service-based interface exhibited by the NSSF 334), Nausf 364I (a service-based interface exhibited by the AUSF 360). Other service-based interfaces (e.g., Nudr, N5g-eir, and Nudsf) not shown in FIG. 3D can also be used.

In some aspects, the NEF 356 can provide an interface to a MEC host such as MEC host 102, which can be used to process wireless connections with the RAN 304. In some aspects, the MEC host 102 may be used to implement NFV-SCF functions and provide E2E multi-slice support for configuring network resources associated with network slice instances within MEC-enabled 5G communication systems, to optimize the instantiation of MEC apps and virtualized resources associated with the NSI.

FIG. 3E illustrates components of an exemplary 5G-NR architecture with a control unit control plane (CU-CP)—control unit user plane (CU-UP) separation, according to an example. Referring to FIG. 3E, the 5G-NR architecture 300E can include a 5G core (5GC) 306 and NG-RAN 304. The NG-RAN 304 can include one or more gNBs such as gNB 308 and 310. In some aspects, network elements of the NG-RAN 304 may be split into central and distributed units, and different central and distributed units, or components of the central and distributed units, may be configured for performing different protocol functions (e.g., different protocol functions of the protocol layers).

In some aspects, the gNB 308 can comprise or be split into one or more of a gNB Central Unit (gNB-CU) 322E and gNB Distributed Unit(s) (gNB-DU) 324E, 326E. Additionally, the gNB 308 can comprise or be split into one or more of a gNB-CU-Control Plane (gNB-CU-CP) 328E and a gNB-CU-User Plane (gNB-CU-UP) 330E. The gNB-CU 322E is a logical node configured to host the radio resource control (RRC) layer, service data adaptation protocol (SDAP) layer, and packet data convergence protocol layer (PDCP) protocols of the gNB or RRC, and PDCP protocols of the E-UTRA-NR gNB (en-gNB) that controls the operation of one or more gNB-DUs. The gNB-DU (e.g., 324E or 326E) is a logical node configured to host the radio link control layer (RLC), medium access control layer (MAC), and physical layer (PHY) layers of the gNB 128A, 128B or en-gNB, and its operation is at least partly controlled by gNB-CU 322E. In some aspects, one gNB-DU (e.g., 324E) can support one or multiple cells.

The gNB-CU 322E comprises a gNB-CU-Control Plane (gNB-CU-CP) entity 328E and a gNB-CU-User Plane entity (gNB-CU-UP) 330E. The gNB-CU-CP 328E is a logical node configured to host the RRC and the control-plane part of the PDCP protocol of the gNB-CU 322E for an en-gNB or a gNB. The gNB-CU-UP 330E is a logical (or physical)

node configured to host the user-plane part of the PDCP protocol of the gNB-CU 322E for an en-gNB, and the user plane part of the PDCP protocol and the SDAP protocol of the gNB-CU 322E for a gNB.

The gNB-CU 322E and the gNB-DUs 324E, 326E can communicate via the F1 interface, and the gNB 308 can communicate with the gNB-CU 322E via the Xn-C interface. The gNB-CU-CP 328E and the gNB-CU-UP 330E can communicate via the E1 interface(s). Additionally, the gNB-CU-CP 328E and the gNB-DUs 324E, 326E can communicate via the F1-C interface, and the gNB-DUs 324E, 326E, and the gNB-CU-UP 330E can communicate via the F1-U interface.

In some aspects, the gNB-CU 322E terminates the F1 interface connected with the gNB-DUs 324E, 326E, and in other aspects, the gNB-DUs 324E, 326E terminate the F1 interface connected with the gNB-CU 322E. In some aspects, the gNB-CU-CP 328E terminates the E1 interface connected with the gNB-CU-UP 330E and the F1-C interface connected with the gNB-DUs 324E, 326E. In some aspects, the gNB-CU-UP 330E terminates the E1 interface connected with the gNB-CU-CP 328E and the F1-U interface connected with the gNB-DUs 324E, 326E.

In some aspects, the F1 interface is a point-to-point interface between endpoints and supports the exchange of signaling information between endpoints and data transmission to the respective endpoints. The F1 interface can support the control plane and user plane separation and separate the Radio Network Layer and the Transport Network Layer. In some aspects, the E1 interface is a point-to-point interface between a gNB-CU-CP and a gNB-CU-UP and supports the exchange of signaling information between endpoints. The E1 interface can separate the Radio Network Layer and the Transport Network Layer, and in some aspects, the E1 interface may be a control interface not used for user data forwarding.

Referring to the NG-RAN 304, the gNBs 308, 310 of the NG-RAN 304 may communicate to the 5GC 306 via the NG interfaces, and can be interconnected to other gNBs via the Xn interface. In some aspects, the gNBs 308, 310 can be configured to support FDD mode, TDD mode, or dual-mode operation. In certain aspects, for EN-DC, the S1-U interface and an X2 interface (e.g., X2-C interface) for a gNB, consisting of a gNB-CU and gNB-DUs, can terminate in the gNB-CU.

In some aspects, gNB 310 supporting CP/UP separation, includes a single CU-CP entity 328E, multiple CU-UP entities 330E, and multiple DU entities 324E, . . . , 326E, with all entities being configured for network slice operation. As illustrated in FIG. 3E, each DU entity 324E, . . . , 326E can have a single connection with the CU-CP 328E via an F1-C interface. Each DU entity 324E, . . . , 326E can be connected to multiple CU-UP entities 330E using F1-U interfaces. The CU-CP entity 328E can be connected to multiple CU-UP entities 330E via E1 interfaces. Each DU entity 324E, . . . , 326E can be connected to one or more UEs, and the CU-UP entities 330E can be connected to a user plane function (UPF) and the 5G core 306.

In some aspects, entities within the gNB 310 can perform one or more procedures associated with interfaces or radio bearers within the NG-RAN 304 with the separation of CP/UP. For example, NG-RAN 304 can support the following procedures associated with network slice configuration:

E1 interface setup: this procedure allows the setup of the E1 interface, and it includes the exchange of the parameters needed for interface operation. The E1 setup is initiated by the CU-CP 328E;

E1 interface reset: this procedure allows the reset of the E1 interface, including changes in the configuration parameters. The E1 interface reset is initiated by either the CU-CP 328E or the CU-UP 330E;

E1 error indication: this procedure allows reporting of detected errors in one incoming message. The E1 interface reset is initiated by either the CU-CP 328E or the CU-UP 330E;

E1 load information: this procedure allows CU-UP 328E to inform CU-CP 328E of the prevailing load condition periodically. The same procedure could also be used to indicate the overload of CU-UP 330E with overload status (Start/Stop);

E1 configuration update: this procedure supports updates in CU-UP 330E configuration, such as capacity changes;

Data Radio Bearer (DRB) setup: this procedure allows the CU-CP 328E to setup DRBs in the CU-CP, including the security key configuration and the quality of service (QoS) flow to DRB mapping configuration; DRB modification: this procedure allows the CU-CP 328E to modify DRBs in the CU-CP, including the modification of security key configuration and the modification of the QoS flow to DRB mapping configuration;

DRB release: this procedure allows the CU-CP 328E to release DRBs in the CU-CP; and Downlink Data Notification (DDN): This procedure allows CU-UP 330E to request CU-CP 328E to trigger a paging procedure to support RRC Inactive state.

In some aspects, the NG-RAN 304 can be configured to support E1 interface management procedures for network slicing including resource availability indication from the CU-UP 330E, resource management in CU-UP 330E, and latency indication from the CU-UP 330E.

In some aspects, the NG-RAN 304 can be configured to support F1-C interface management procedures for network slicing including resource availability indication from the DU entities 324E, . . . 326E, the resource management in the DU entities 324E, . . . , 326E, and latency indication from the DU entities 324E, . . . , 326E.

In some aspects, the NG-RAN 304 can be configured to support latency measurements over the F1-U interface so that the UP elements including DU entities (324E, . . . , 326E) and CU-UP entities 330E can communicate latency information to other neighboring UP elements. In this regard, network slicing can be supported in the NG-RAN 304 with the separation of CP/UP. In some aspects, slice-level isolation and improved resource utilization can be provided by the central RRM in the CU-CP 328E.

In some aspects, procedures discussed herein associated with network slicing include operations and communications over the E1 interface, the F1-C interface, and the F1-U interface. With these procedures, the CU-CP 328E can select the appropriate DU and CU-UP entities to serve the specific network slicing request associated with a certain service level agreement (SLA).

In some aspects, the procedure over the E1 interface can include information collected from the CU-UP entities 330E and resource management in the CU-CP 328E. Specifically, the information collected can include resource availability indication and latency indication, while resource management can include resource allocation and resource release. The CU-CP 328E can be configured to collect the information from the CU-UP entities 330E periodically or issue an on-demanding query based on a network slice request. In some aspects, a resource availability indication procedure can allow the CU-UP entities 330E to inform the CU-CP 328E of the availability of resources to process a network slicing request. For example, the indication of the available resource can assist the CU-CP 328E to determine whether the specific CU-UP can serve the specific network slice requesting associated with a certain SLA.

In some aspects, a resource allocation procedure can allow the CU-CP 328E to allocate the resource in the CU-UP 330E that is associated with a specific slice. Upon the reception of a request for a network slice creation, the CU-CP 328E can select the CU-UP 330E (e.g., one of the CU-UP entities) following the indicated SLA and allocate the resource in the selected CU-UP to the network slice. In some aspects, a resource release procedure can allow the CU-CP 328E to release the resource in the CU-UP that is assigned to an established network slice. Upon the removal of the slice, the CU-CP 328E can notify the corresponding CU-UP to release the resource used by the removed network slice.

Figure 3F:
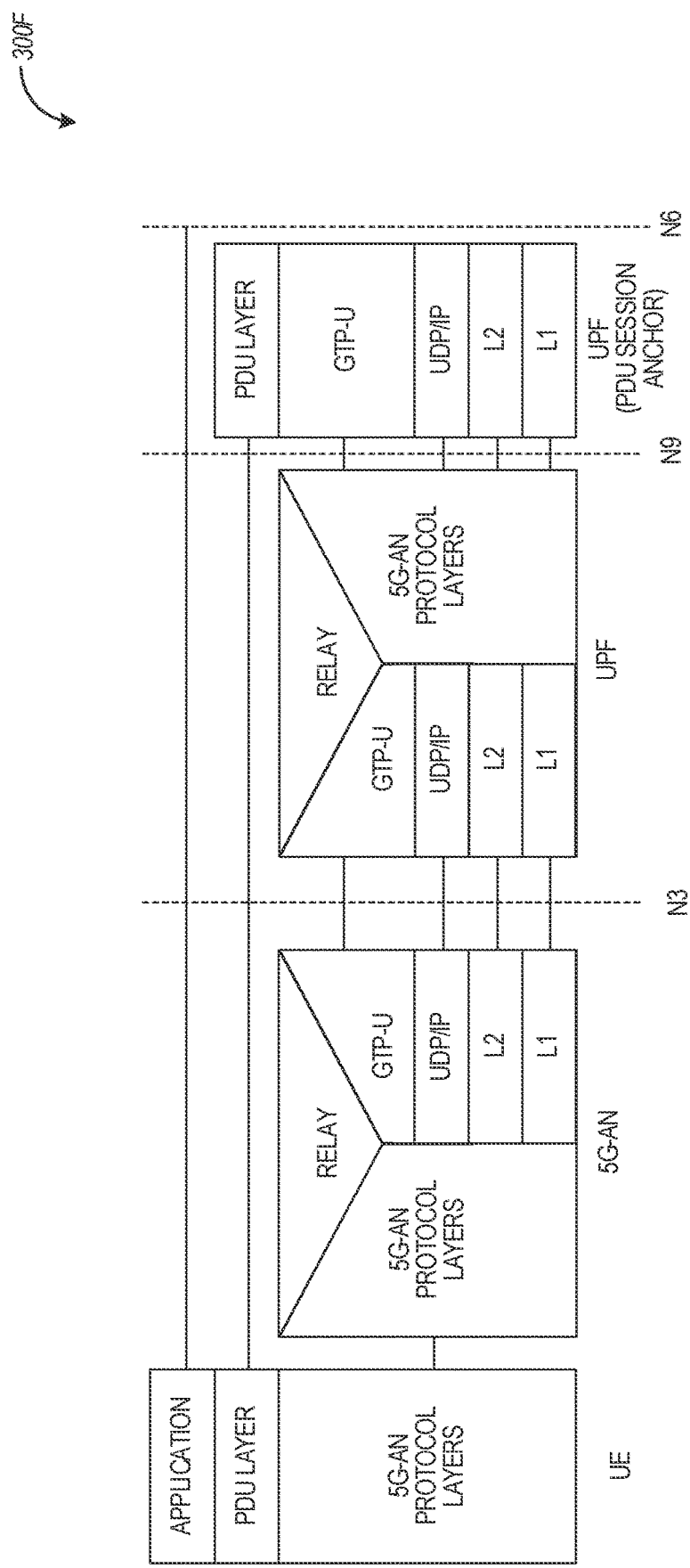
FIG. 3F illustrates a user plane protocol stack, according to an example.

FIG. 3F illustrates a user plane protocol stack 300F in connection with a 5G communication system, according to an example. Referring to FIG. 3F, the PDU layer corresponds to the PDU carried between the UE and the DN over the PDU Session. When the PDU Session Type is IPv4 or IPv6 or IPv4v6, it corresponds to IPv4 packets or IPv6 packets or both of them. When the PDU Session Type is Ethernet, it corresponds to Ethernet frames, etc.

The GPRS Tunneling Protocol for the user plane (GTP-U) supports multiplexing traffic of different PDU Sessions (possibly corresponding to different PDU Session Types) by tunneling user data over N3 (i.e., between the 5G-Access Network (5G-AN) node and the UPF) and N9 (i.e., between different UPFs of the 5GC) in the backbone network. GTP can encapsulate all end-user PDUs. It provides encapsulation on a per PDU Session level. This layer carries also the marking associated with a QoS Flow of a UE, where the QoS flow is associated with a network slice instance and an MEC app communicating data for the NSI.

5G-AN protocol stack: This set of protocols/layers depends on the AN. When the 5G-AN is a 3GPP NG-RAN, these protocols/layers are defined in TS 38.401. The radio protocol between the UE and the 5G-AN node (eNodeB or gNodeB) is specified in TS 36.300 and TS 38.300. When the AN is Untrusted non-3GPP access to 5GC, the 5G-AN interfaces with the 5GC at an N3IWF.

UDP/IP are the backbone network protocols. The number of UPF in the data path is not constrained by 3GPP specifications. There may be in the data path of a PDU Session 0, 1 or multiple UPF that do not support a PDU Session Anchor functionality for this PDU Session. The "non-PDU Session Anchor" UPF depicted in FIG. 3F is optional. The N9 reference point may be intra-PLMN or inter PLMN (in the case of Home Routed deployment).

If there is a UL CL (Uplink Classifier) or a Branching Point in the data path of a PDU Session, the UL CL or Branching Point acts as the non-PDU Session Anchor UPF of FIG. 3F. In that case, multiple N9 reference points are branching out of the UL CL/Branching Point each leading to different PDU Session anchors.

Figure 3G:
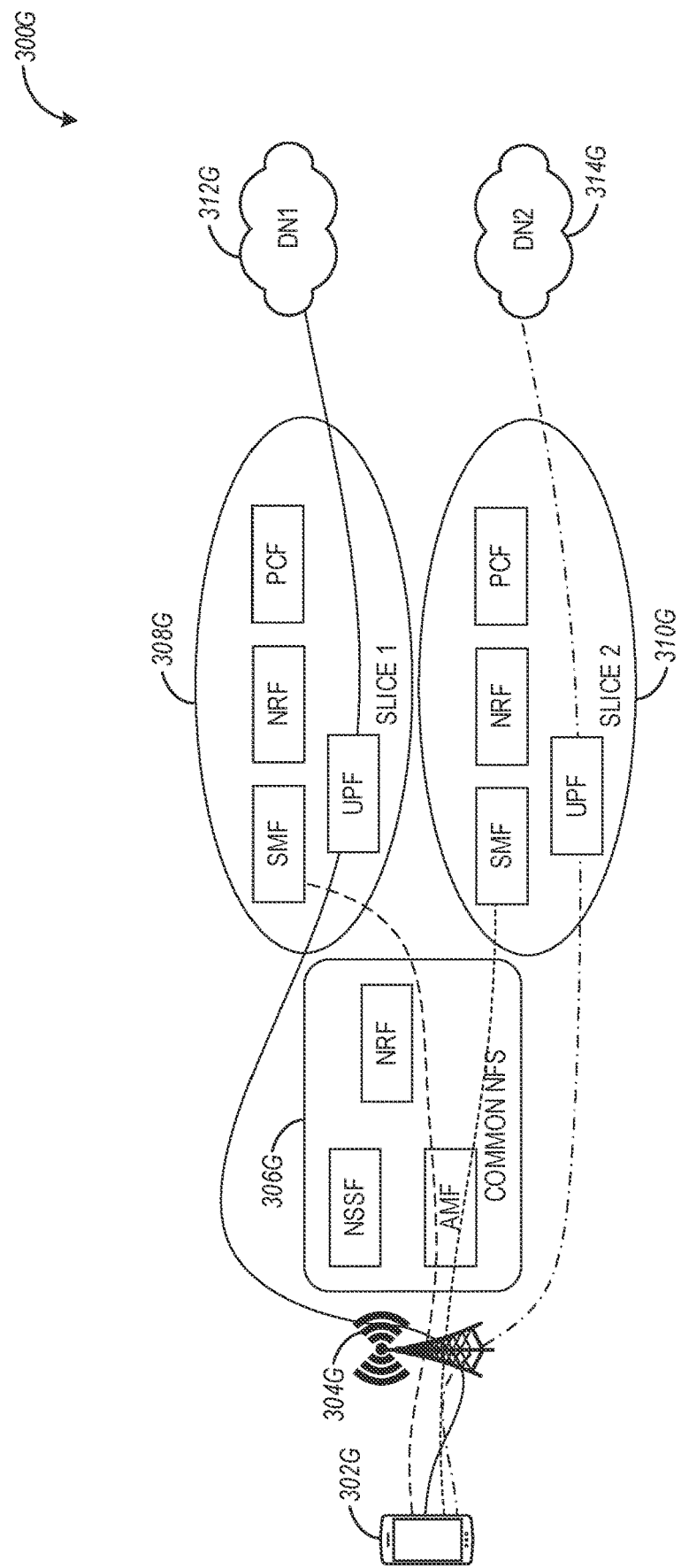
FIG. 3G illustrates examples of network slices, according to an example.

FIG. 3G illustrates a diagram 300G with examples of network slice instances (or NSIs) 308G and 310G, according to an example. As used herein, the term "network slicing" refers to the partitioning of the physical network into multiple virtual networks customized to meet a diverse set of vertical requirements. Network slicing can be relevant for Rel. 15 and beyond, and relevant 3GPP specifications include TS 23.501 (5GS Archit.), TS 22.261 (5G Requirements), and TS 28.531/28.532 (5G Slice Management).

In some aspects, 5G adoption depends on the ability to provide communication service providers (CSPs) the ability to provision, manage, adjust, and operate multiple virtual networks over a common set of physical (wireless and wired) network infrastructure. End-to-end network slice instances (or "slices") carve out virtual logical networks using physical computing and network resources. Each network slice instance can be specifically configured to support performance related to the service supported including capacity, security levels, geographical coverage, and latency. Network slice instances include partitioning the wireless radio of Radio Access Network (RAN), core infrastructure including the Evolved Packet Core (EPC), as well as the switches and Data Center Servers where the 5G mobile applications and content may be hosted. Furthermore, 5G edge devices may also be included in the slice depending on the service latency requirements.

In some aspects, 5G network slice instances will support a wide range of applications from (semi-)autonomous vehicles, remote health monitoring, and first-responder applications requiring the best security/traceability to tiered smartphone plans and IoT devices that may be ok without extra resource traceability.

Conventional network slice techniques use network slice instances that are deployed statically, i.e., as a pipe to a business. In some aspects, network slicing can be configured from the 5G radio access layer and up through the enterprise application layer. A network slice instance may be self-contained, not shared or carved up to create more slices and not dynamically scaled for individual applications.

A RAN 304G can support differentiated handling of traffic between preconfigured, isolated RAN NSIs (or RAN slices) 308G and 310G. The selection of the RAN slice may be based on IDs (which can be the slice service type and slice differentiator defined above) provided by the device (e.g., UE 302G) or the core network. A RAN NSI may or may not be available at a given location. In some aspects, the RAN 304G (or another network entity within the 5G system, such as a MEC entity when the 5G system is MEC-enabled as discussed hereinbelow) may configure network resources forming an NSI. For example, RAN 304G may select common network functions (NFs) 306G (including NSSF, NRF, and AMF NFs), which can be common to multiple NSIs (such as NSIs 308G and 310G). Each of the NSIs 308G and 310G can be formed based on additional NFs, such as SMF, NRF, PCF, and UPF, as illustrated in FIG. 3G.

In some aspects, QoS differentiation within a RAN NSI may be supported as well. In this regard, NSIs 308G and 310G can be used by the UE to serve separate QoS flows and communicate data with one or more NFV instances provided by one or more MEC apps using virtual resources (e.g., VMs) of the data networks 312G, 314G.

Referring to FIG. 3G, the Network Slice Selection Function (NSSF) supports selecting the Network Slice instances to serve the UE, determining the allowed NSSAI (Network Slice Selection Assistance Information) and determining the AMF set to be used to serve the UE (NSSF is new functionality not existing in EPC).

In some aspects, a Network Slice Template (NST) may be defined as a subset of attributes' values used for the creation of instances of Network Slice Information Object Class (IOC). The content of NST may not be standardized by 3GPP, i.e., it may be defined by MNO and vendor. In some aspects, slice-specific attributes specified by the NSI include one or more of the following: an end-to-end (E2E) latency requirement associated with communication of data within the NSI, a minimum available bandwidth requirement for the plurality of communication links of the NSI, and a communication throughput requirement of at least one of the plurality of communication links of the NSI.

In some aspects, slice selection is determined by the network (AMF or NSSF), based on network slice policy with the assisted information (NSSAI) sent by the UE. In some aspects, a maximum of 8 network slices per UE may be used, where each slice may be used in connection with a separate QoS flow of the UE.

Various 3GPP-related interfaces and reference points discussed herein are further defined in the following 3GPP-related technical specifications (TS): TS 23.501, TS 22.261, TS 28.531, TS 28.532, and 38.300. Various MEC-related interfaces and reference points discussed herein are further defined in the following ETSI-related technical specifications: ETSI GS MEC-003 and ETSI GR MEC-024 specifications.

Figure 4A:
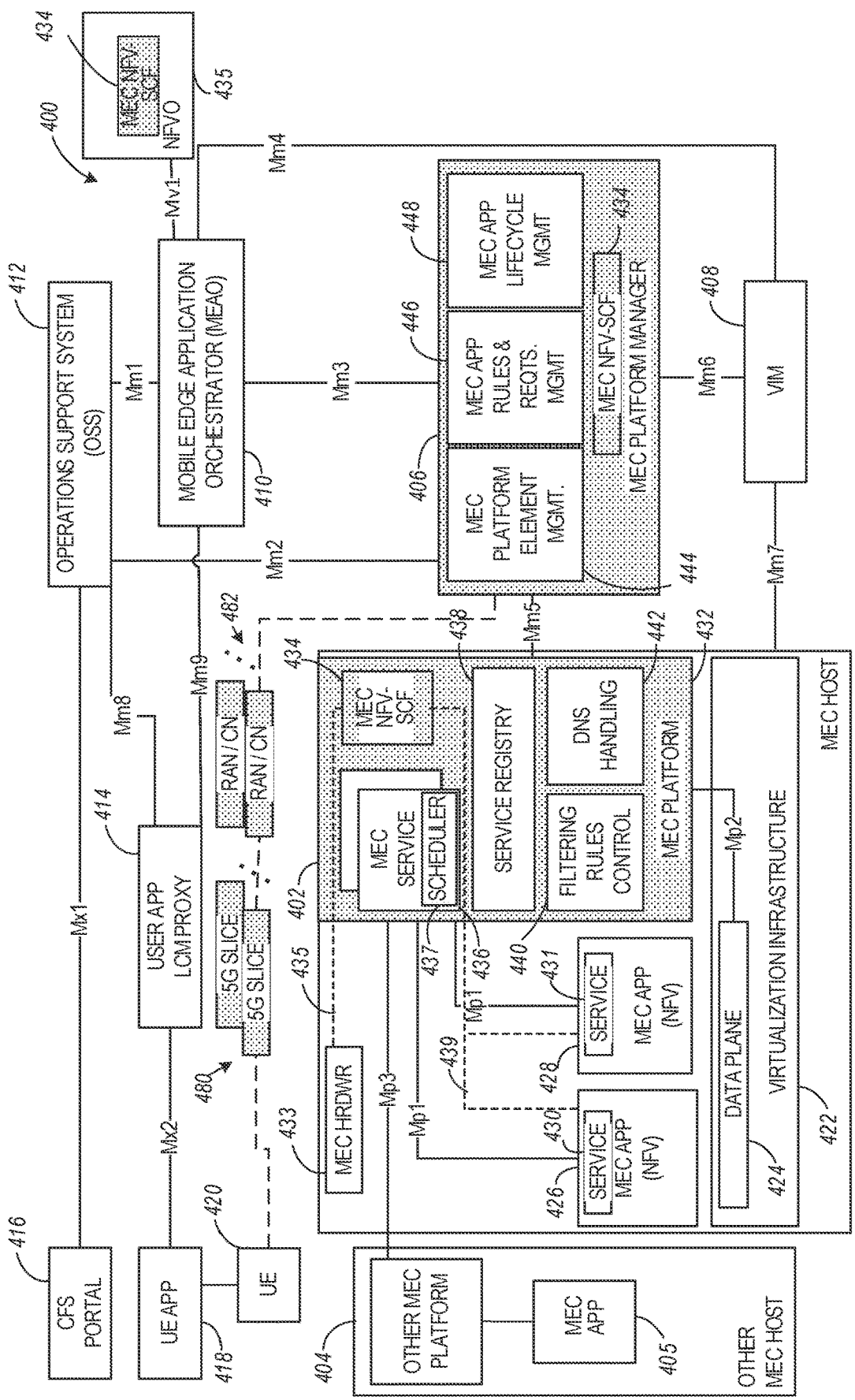
FIG. 4A illustrates a MEC network architecture modified for supporting slice management, resource management, and traceability functions, according to an example.
Figure 4B:
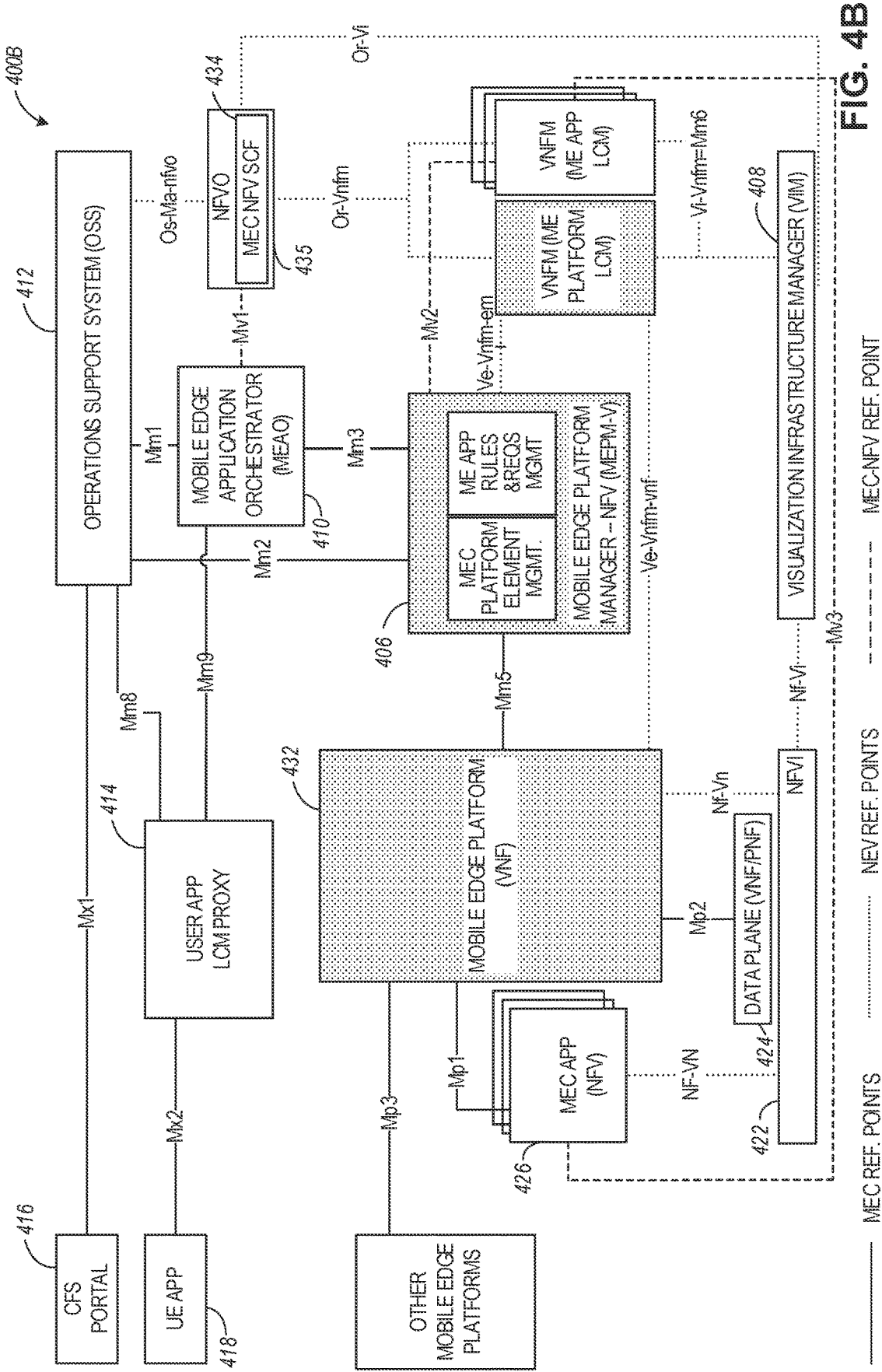
FIG. 4B illustrates a MEC reference architecture in a Network Function Virtualization (NFV) environment, according to an example.

FIG. 4A illustrates a MEC network architecture 400 modified for supporting slice management and resource management, according to an example. FIG. 4A specifically illustrates a MEC architecture 400 with MEC hosts 402 and 404 providing functionalities per the ETSI GS MEC-003 and ETSI GR MEC-024 specifications, with the shaded blocks used to indicate processing aspects for the MEC architecture configuration described herein in connection with slice and resource management functions. Specifically, enhancements to the MEC platform 432 and the MEC platform manager 406 may be used for providing slice and resource management functions within the MEC architecture 400. This may include provisioning of one or more network slice instances, dynamic management of resources used by the network slices, including generating and implementing one or more slice configuration policies based on utility function modeling and evaluation of latency or other characteristics of MEC and non-MEC communication links for a given NSI configured within a MEC-enabled 5G communication network.

Referring to FIG. 4A, the MEC network architecture 400 can include MEC hosts 402 and 404, a virtualization infrastructure manager (VIM) 408, an MEC platform manager 406, a Mobile Edge Application Orchestrator (MEAO) 410, an operations support system (OSS) 412, a user app proxy 414, a UE app 418 running on UE 420, and CFS portal 416. The MEC host 402 can include a MEC platform 432 with filtering rules control module 440, a DNS handling module 442, service registry 438, and MEC services 436. The MEC host 404 can include resources used to instantiate MEC apps 405. The MEC services 436 can include at least one scheduler 437, which can be used to select resources for instantiating MEC apps (or NFVs) 426 and 428 upon virtualization infrastructure 422 that includes a data plane 424. The MEC apps 426 and 428 can be configured to provide services 430/431, which can include processing network communications traffic of different types associated with one or more wireless connections (e.g., connections to one or more RAN or core network entities as illustrated in FIGS. 1-3D). The MEC platform 432 can provide filtering rules control functions 440, DNS handling functions 442, and service registry function 438. The MEC hardware 433 and the at least one scheduler 437 can be similar to the MEC hardware 123 and the scheduler 120 discussed in connection with FIG. 1A.

The MEC platform manager 406 can include MEC platform element management module 444, MEC app rules and requirements management module 446, and a MEC app lifecycle management module 448. The various entities within the MEC architecture 400 can perform functionalities as disclosed by the ETSI GS MEC-003 and ETSI GR MEC-024 specifications.

In some aspects, UE 420 can be configured to communicate to one or more of the core networks 482 via one or more of the network slice instances 480. In some aspects, the core networks 482 can use slice management functions (e.g., as provided by slice management module 164) to dynamically configure NSIs 480, including dynamically assign a slice to a UE, configure network functions associated with the slice, configure a MEC app for communicating data using the slice, reassign a slice to a UE, dynamically allocate or reallocate resources used by one or more of the slices 480, or other slice related management functions. One or more of the functions performed in connection with slice management can be initiated based on user requests (e.g., via a UE), based on a request by a service provider, or maybe triggered automatically in connection with an existing Service Level Agreement (SLA) specifying slice-related performance objectives. In some aspects, the slice management functions in connection with network slices 480 can be facilitated by E2E multi-slice support functions for MEC-enabled 5G deployments, provided by the MEC NFV-SCF 434 within the MEC host 402, the MEC platform manager 406, or within another MEC entity.

In some aspects, the MEC NFV-SCF 434 can be within an NFV orchestrator (NFVO) 435, which can be coupled to the MEC orchestrator 410, as well as to other MEC entities, as illustrated in FIG. 4B and FIG. 11. Additional multi-slice support functionalities and use cases are illustrated in connection with FIG. 11, FIG. 12, FIG. 13, FIG. 14, FIG. 15, and FIG. 16A-FIG. 16H.

FIG. 4B illustrates a MEC reference architecture 400B in a Network Function Virtualization (NFV) environment, according to an example. The MEC architecture 400B can be configured to provide functionalities per the ETSI GR MEC-017 specification.

In some aspects, ETSI MEC can be deployed in an NFV environment as illustrated in FIG. 4B. In some aspects, the MEC platform is deployed as a virtualized network function (VNF). The MEC applications can appear like VNFs towards the ETSI NFV Management and Orchestration (MANO) components (e.g., VIM 408, MEAO 410 and NFVO 435). This allows the re-use of ETSI NFV MANO functionality. In some aspects, the full set of MANO functionality may be unused and certain additional functionality may be needed. Such a specific MEC application is denoted by the name "MEC app VNF" (or ME app VNF) as discussed herein. In some aspects, the virtualization infrastructure is deployed as an NFVI and its virtualized resources are managed by the virtualized infrastructure manager (VIM). For that purpose, one or more of the procedures defined by ETSI NFV Infrastructure specifications, i.e. ETSI GS NFV-INF 003, ETSI GS NFV-INF 004, and ETSI GS NFV-INF 005 can be used.

In some aspects, the MEC application (or app) VNFs will be managed like individual VNFs, allowing that a MEC-in-NFV deployment can delegate certain orchestration and Life Cycle Management (LCM) tasks to the NFVO and VNFM functional blocks, as defined by ETSI NFV MANO.

In some aspects, the Mobile Edge Platform Manager (MEPM) 406 can be transformed into a "Mobile Edge Platform Manager—NFV" (MEPM-V) that delegates the LCM part to one or more virtual network function manager(s) (VNFM(s)). The Mobile Edge Orchestrator (MEO), as defined in the MEC reference architecture ETSI GS MEC-003, can be transformed into a "Mobile Edge Application Orchestrator" (MEAO) 410 that uses the NFVO 435 for resource orchestration, and orchestration of the set of MEC app VNFs as one or more NFV Network Services (NSs).

In some aspects, the Mobile Edge Platform VNF, the MEPM-V, and the VNFM (ME platform LCM) can be deployed as a single package as per the ensemble concept in 3GPP TR 32.842, or that the VNFM is a Generic VNFM as per ETSI GS NFV-IFA 009 and the Mobile Edge Platform VNF and the MEPM-V are provided by a single vendor.

In some aspects, the Mp1 reference point between an MEC application and the ME platform can be optional for the MEC application, unless it is an application that provides and/or consumes a ME service. Various MEC-related interfaces and reference points discussed herein are further defined in the following ETSI-related technical specifications: ETSI GS MEC-003 and ETSI GR MEC-024 specifications.

The Mp1 reference point is a reference point between the mobile edge platform and the mobile edge applications. The Mp1 reference point provides service registration, service discovery, and communication support for services. It also provides other functionality such as application availability, session state relocation support procedures, traffic rules and DNS rules activation, access to persistent storage and time of day information, etc. This reference point can be used for consuming and providing service specific functionality.

The Mp2 reference point is a reference point between the mobile edge platform and the data plane of the virtualization infrastructure. The Mp2 reference point is used to instruct the data plane on how to route traffic among applications, networks, services, etc.

The Mp3 reference point is a reference point between mobile edge platforms and it is used for control communication between mobile edge platforms.

In some aspects, the Mm3* reference point between the MEAO 410 and the MEPM-V 406 is based on the Mm3 reference point, as defined by ETSI GS MEC-003. Changes may be configured to this reference point to cater to the split between MEPM-V and VNFM (MEC applications LCM).

In some aspects, the following new reference points (Mv1, Mv2, and Mv3) are introduced between elements of the ETSI MEC architecture and the ETSI NFV architecture to support the management of MEC app VNFs. The following reference points are related to existing NFV reference points, but only a subset of the functionality may be used for ETSI MEC, and extensions may be necessary: Mv1 (this reference point connects the MEAO and the NFVO; it is related to the Os-Ma-nfvo reference point, as defined in ETSI NFV); Mv2 (this reference point connects the VNF Manager that performs the LCM of the MEC app VNFs with the MEPM-V to allow LCM related notifications to be exchanged between these entities; it is related to the Ve-Vnfm-em reference point as defined in ETSI NFV, but may include additions, and might not use all functionality offered by Ve-Vnfm-em); Mv3 (this reference point connects the VNF Manager with the MEC app VNF instance, to allow the exchange of messages e.g. related to MEC application LCM or initial deployment-specific configuration; it is related to the Ve-Vnfm-vnf reference point, as defined in ETSI NFV, but may include additions, and might not use all functionality offered by Ve-Vnfm-vnf).

In some aspects, the following reference points are used as they are defined by ETSI NFV: Nf-Vn (this reference point connects each MEC app VNF with the NFVI); Nf-Vi (this reference point connects the NFVI and the VIM); Os-Ma-nfvo (this reference point connects the OSS and the NFVO. It is primarily used to manage NSs, i.e. several VNFs connected and orchestrated to deliver a service); Or-Vnfm (this reference point connects the NFVO and the VNFM; it is primarily used for the NFVO to invoke VNF LCM operations); Vi-Vnfm (this reference point connects the VIM and the VNFM; it is primarily used by the VNFM to invoke resource management operations to manage the cloud resources that are needed by the VNF; it is assumed in an NFV-based MEC deployment that this reference point corresponds 1:1 to Mm6); and Or-Vi (this reference point connects the NFVO and the VIM; it is primarily used by the NFVO to manage cloud resources capacity).

Figure 5:
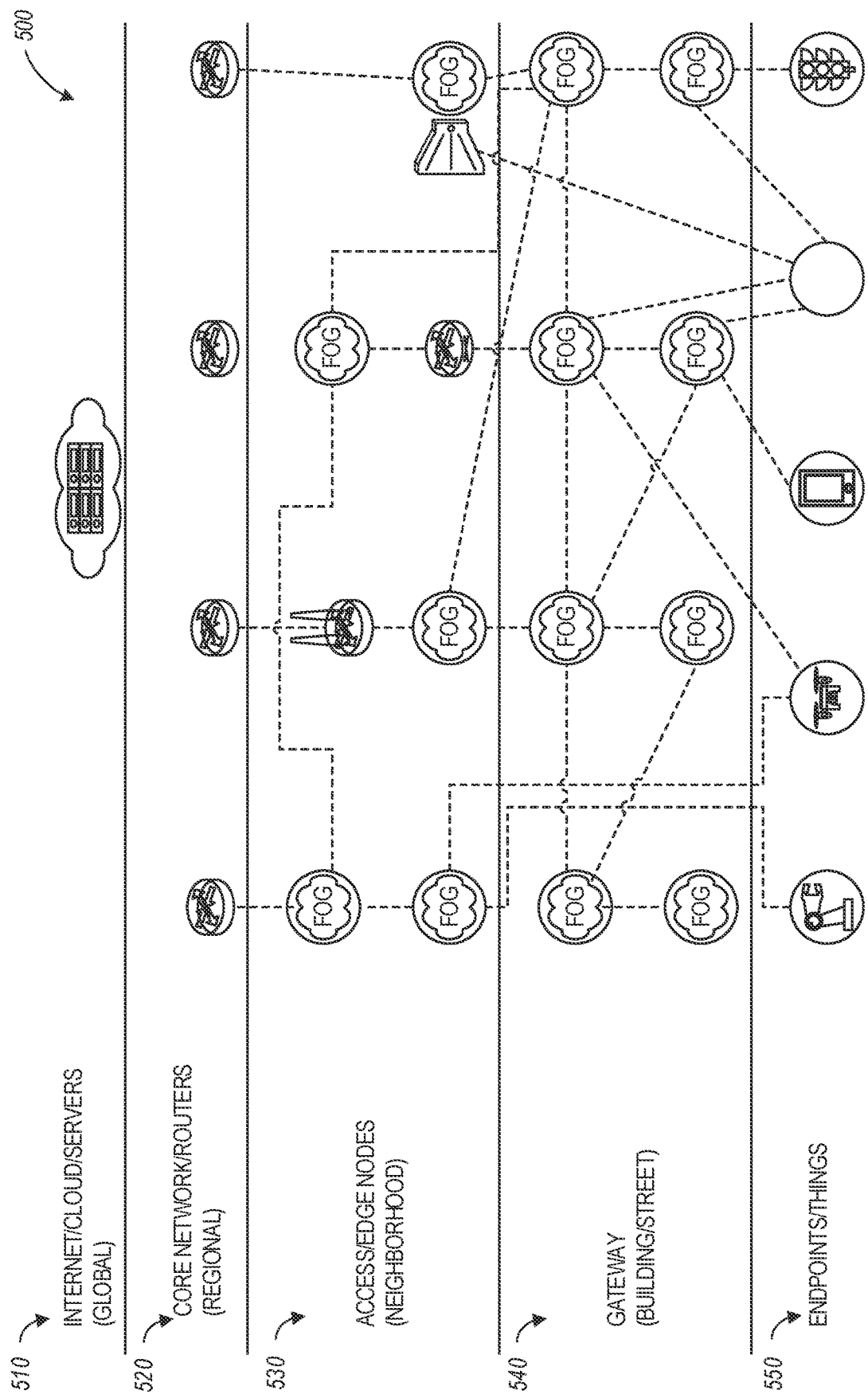
FIG. 5 illustrates a MEC and FOG network topology, according to an example.

FIG. 5 illustrates a MEC and FOG network topology 500, according to an example. Referring to FIG. 5, the network topology 500 can include several conventional networking layers, that can be extended through the use of a MEC QoS manager discussed herein. Specifically, the relationships between endpoints (at endpoints/things network layer 550), gateways (at gateway layer 540), access or edge computing nodes (e.g., at neighborhood nodes layer 530), core network or routers (e.g., at regional or central office layer 520), may be represented through the use of data communicated via MEC hosts that use MEC QoS managers that can be located at various nodes within the topology 500.

A FOG network (e.g., established at gateway layer 540) may represent a dense geographical distribution of near-user edge devices (e.g., FOG nodes), equipped with storage capabilities (e.g., to avoid the need to store data in cloud data centers), communication capabilities (e.g., rather than routed over the internet backbone), control capabilities, configuration capabilities, measurement and management capabilities (rather than controlled primarily by network gateways such as those in the LTE core network), among others. In this context, FIG. 5 illustrates a general architecture that integrates several MEC and FOG nodes—categorized in different layers (based on their position, connectivity and processing capabilities, etc.), with each node implementing a MEC V2X API that can enable a MEC app or other entity of a MEC enabled node to communicate with other nodes. It will be understood, however, that such FOG nodes may be replaced or augmented by edge computing processing nodes.

FOG nodes may be categorized depending on the topology and the layer where they are located. In contrast, from a MEC standard perspective, each FOG node may be considered as a MEC host, or a simple entity hosting a MEC app and a light-weighted MEC platform.

In an example, a MEC or FOG node may be defined as an application instance, connected to or running on a device (MEC host) that is hosting a MEC platform. Here, the application consumes MEC services and is associated with a MEC host in the system. The nodes may be migrated, associated with different MEC hosts, or consume MEC services from other (e.g., local or remote) MEC platforms.

In contrast to this approach, traditional V2V applications are reliant on remote cloud data storage and processing to exchange and coordinate information. A cloud data arrangement allows for long-term data collection and storage but is not optimal for highly time-varying data, such as a collision, traffic light change, etc. and may fail in attempting to meet latency challenges, such as stopping a vehicle when a child runs into the street.

In some aspects, the MEC or FOG facilities can be used to locally create, maintain, and destroy MEC or FOG nodes to host data exchanged via NFVs and using resources managed by a MEC QoS manager, based upon need. Depending on the real-time requirements in a vehicular communications context, a hierarchical structure of data processing and storage nodes can be defined. For example, including local ultra-low-latency processing, regional storage, and processing as well as remote cloud data-center based storage and processing. Key Performance Indicators (KPIs) may be used to identify where sensor data is best transferred and where it is processed or stored. This typically depends on the ISO layer dependency of the data. For example, the lower layer (PHY, MAC, routing, etc.) data typically changes quickly and is better handled locally to meet latency requirements. Higher layer data such as Application-Layer data is typically less time-critical and may be stored and processed in a remote cloud data-center. In some aspects, the KPIs are metrics or operational parameters that can include spatial proximity to a V2X-related target event (e.g., accident, etc.); physical proximity to other objects (e.g., how much time is required to transfer data from one data or application object to another object); available processing power; or current load of the target (network) node and corresponding processing latency. In some aspects, the KPIs can be used to facilitate automated location and relocation of data in a MEC architecture.

Figure 6:
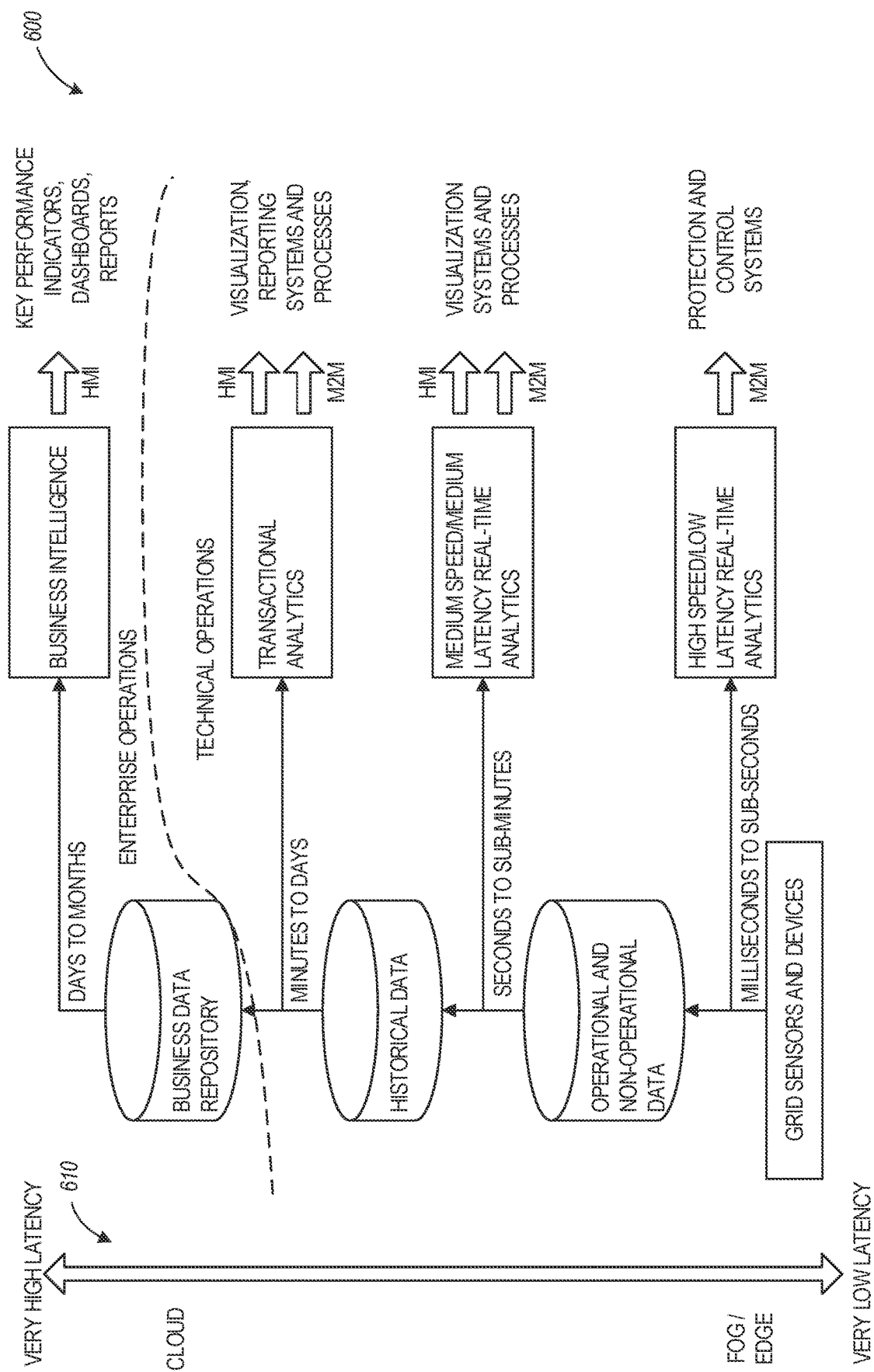
FIG. 6 illustrates the processing and storage layers in a MEC and FOG network, according to an example.

FIG. 6 illustrates the processing and storage layers in a MEC and FOG network 600, according to an example. The illustrated data storage or processing hierarchy 610 relative to the cloud and fog/edge networks allows dynamic reconfiguration of elements to meet latency and data processing parameters, enabling E2E multi-slice support for MEC-enabled 5G communication networks.

The lowest hierarchy level is on a vehicle-level. This level stores data on past observations or data obtained from other vehicles. The second hierarchy level is distributed storage across several vehicles. This distributed storage may change on short notice depending on vehicle proximity to each other or a target location (e.g., near an accident). The third hierarchy level is in a local anchor point, such as a MEC component, carried by a vehicle to coordinate vehicles in a pool of cars. The fourth level of the hierarchy is storage shared across MEC components. For example, data is shared between distinct pools of vehicles that are in the range of each other.

The fifth level of the hierarchy is fixed infrastructure storage, such as in RSUs. This level may aggregate data from entities in hierarchy levels 1-4. The sixth level of the hierarchy is storage across the fixed infrastructure. This level may, for example, be located in the Core Network of a telecommunications network, or an enterprise cloud. Other types of layers and layer processing may follow from this example.

Even though techniques disclosed herein for network slicing, resource management, and blockchain traceability are discussed in connection with MEC-related architectures where at least one MEC entity is present, the disclosure is not limited in this regard and the disclosed techniques may be used in architectures that do not use MEC entities. For example, techniques associated with network slicing, resource management, and blockchain traceability can be performed in non-MEC architectures as well.

Even though techniques disclosed herein are described in connection with a MEC architecture and 5G architecture, the disclosure is not limited in this regard and the disclosed techniques can be used with other types of wireless architectures (e.g., 2G, 3G, 4G, etc.) that use one or more MEC entities.

Any of the radio links described herein may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300

GHz and THz bands, (3GPP/LTE based or IEEE 802.11p and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others (typically operating in 5850 MHz to 5925 MHz), the European ITS-G5 system (i.e. the European flavor of IEEE 802.11p based DSRC, including ITS-G5A (i.e., Operation of ITS-G5 in European ITS frequency bands dedicated to ITS for safety related applications in the frequency range 5,875 GHz to 5,905 GHz), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHz)), DSRC in Japan in the 700 MHz band (including 715 MHz to 725 MHz), etc.

Aspects described herein can be used in the context of any spectrum management scheme including a dedicated licensed spectrum, unlicensed spectrum, (licensed) shared spectrum (such as LSA=Licensed Shared Access in 2.3-2.4 GHz, 3.4-3.6 GHz, 3.6-3.8 GHz, and further frequencies and SAS=Spectrum Access System/CBRS=Citizen Broadband Radio System in 3.55-3.7 GHz and further frequencies). Applicable spectrum bands include IMT (International Mobile Telecommunications) spectrum as well as other types of spectrum/bands, such as bands with national allocation (including 450-470 MHz, 902-928 MHz (note: allocated for example in US (FCC Part 15)), 863-868.6 MHz (note: allocated for example in European Union (ETSI EN 300 220)), 915.9-929.7 MHz (note: allocated for example in Japan), 917-923.5 MHz (note: allocated for example in South Korea), 755-779 MHz and 779-787 MHz (note: allocated for example in China), 790-960 MHz, 1710-2025 MHz, 2110-2200 MHz, 2300-2400 MHz, 2.4-2.4835 GHz (note: it is an ISM band with global availability and it is used by Wi-Fi technology family (11b/g/n/ax) and also by Bluetooth), 2500-2690 MHz, 698-790 MHz, 610-790 MHz, 3400-3600 MHz, 3400-3800 MHz, 3.55-3.7 GHz (note: allocated for example in the US for Citizen Broadband Radio Service), 5.15-5.25 GHz and GHz and 5.47-5.725 GHz and 5.725-5.85 GHz bands (note: allocated for example in the US (FCC part 15), consists of four U-NII bands in total 500 MHz spectrum), 5.725-5.875 GHz (note: allocated for example in EU (ETSI EN 301 893)), 5.47-5.65 GHz (note: allocated for example in South Korea, 5925-7125 MHz and 5925-6425 MHz band (note: under consideration in US and EU, respectively), IMT-advanced spectrum, IMT-2020 spectrum (expected to include 3600-3800 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc.), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), 57-64/66 GHz (e.g., having near-global designation for Multi-Gigabit Wireless Systems (MGWS)/WiGig; in US (FCC part 15) allocated as total 14 GHz spectrum, while EU (ETSI EN 302 567 and ETSI EN 301 217-2 for fixed P2P) allocated as total 9 GHz spectrum), the 70.2 GHz—71 GHz band, any band between 65.88 GHz and 71 GHz, bands currently allocated to automotive radar applications such as 76-81 GHz, and future bands including 94-300 GHz and above. Furthermore, the scheme can be used on a secondary basis on bands such as the TV White Space bands (typically below 790 MHz), where particularly the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

Aspects described herein can also implement a hierarchical application of the scheme by, e.g., introducing a hierarchical prioritization of usage for different types of users (e.g., low/medium/high priority, etc.), based on a prioritized access to the spectrum e.g. with the highest priority to tier-1 users, followed by tier-2, then tier-3 users, and so forth.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources. Some of the features in this document are defined for the network side, such as Access Points, eNodeBs, New Radio (NR) or next generation Node-Bs (gNodeB or gNB), such as used in the context of 3GPP fifth-generation (5G) communication systems, etc. Still, a User Equipment (UE) may take this role as well and act as an Access Points, eNodeBs, gNodeBs, etc. Accordingly, some or all features defined for network equipment may be implemented by a UE or a mobile computing device.

Figure 7:
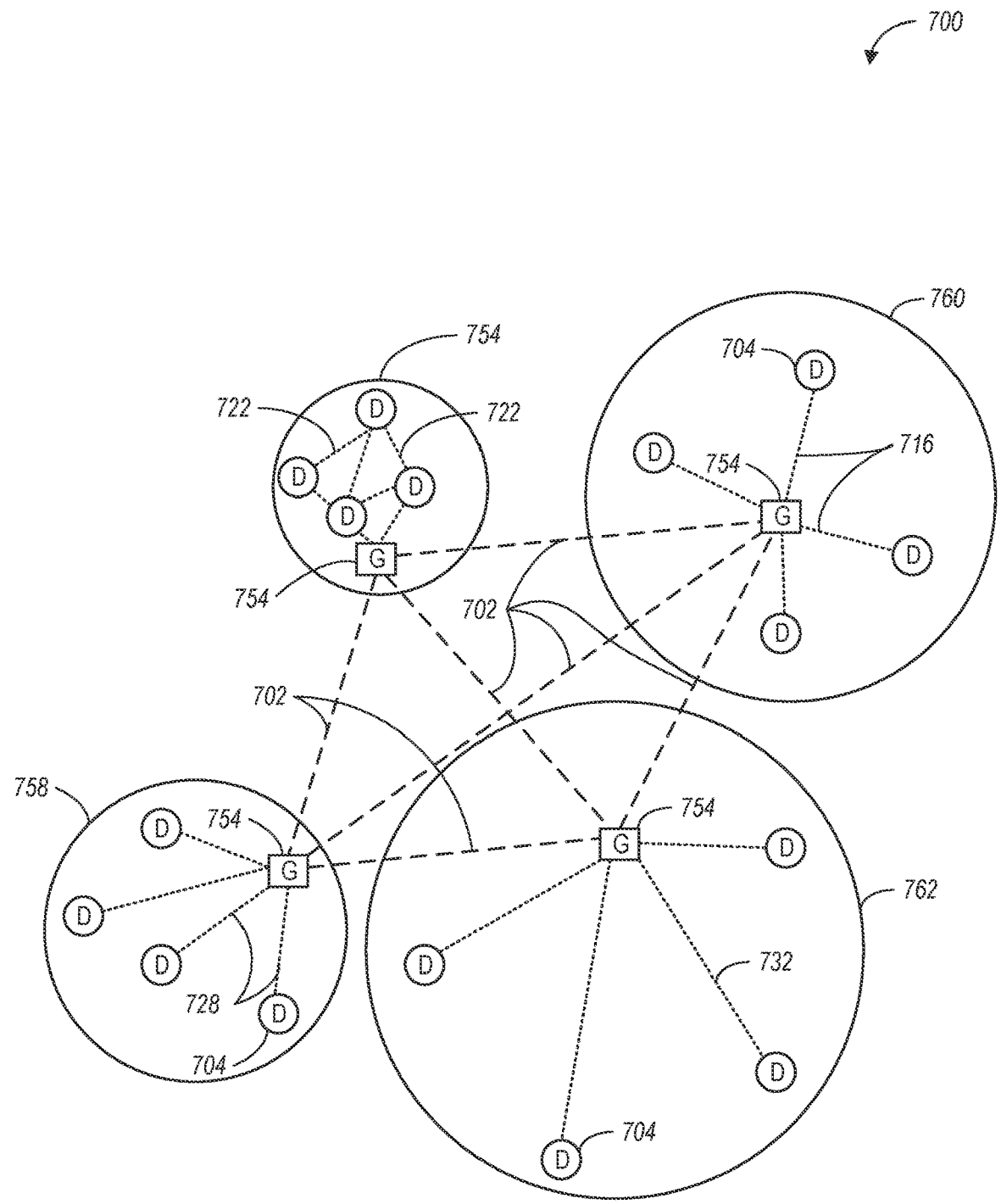
FIG. 7 illustrates a domain topology for respective Internet-of-Things (IoT) networks coupled through links to respective gateways, according to an example.

In further examples, the preceding examples of network communications and operations may be integrated with IoT and like device-based network architectures. FIG. 7 illustrates an example domain topology for respective IoT networks coupled through links to respective gateways. The IoT is a concept in which a large number of computing devices are interconnected to each other and to the Internet to provide functionality and data acquisition at very low levels. Thus, as used herein, a computing device may include a semi-autonomous device performing a function, such as sensing or control, among others, in communication with other computing devices and a wider network, such as the Internet.

MEC use cases have been envisioned to integrate into several network and application settings, including those to support network arrangements of IoT deployments. Computing devices are physical or virtualized objects that may communicate on a network (typically at the edge or endpoint of a network) and may include sensors, actuators, and other input/output components, such as to collect data or perform actions from a real-world environment. For example, computing devices may include low-powered devices that are embedded or attached to everyday things, such as buildings, vehicles, packages, etc., to provide sensing, data, or processing functionality. Recently, computing devices have become more popular and thus applications and use cases using these devices have proliferated.

Various standards have been proposed to more effectively interconnect and operate computing devices and IoT network use cases, including those with MEC and mobile network architectures. Some of the relevant communication and network architecture standards include those distributed by groups such as ETSI, 3rd Generation Partnership Project (3GPP), Institute of Electrical and Electronics Engineers (IEEE), in addition to specialized IoT application interaction architecture and configuration standards distributed by working groups such as the Open Connectivity Foundation (OCF).

Often, computing devices are limited in memory, size, or functionality, enabling larger numbers to be deployed for a similar cost to smaller numbers of larger devices. However, a computing device may be a smartphone, laptop, tablet, PC, or other larger device. Further, a computing device may be a virtual device, such as an application on a smartphone or another computing device. Computing devices may include IoT gateways, used to couple computing devices to other computing devices and to cloud applications, for data storage, process control, and the like.

Networks of computing devices may include commercial and home automation devices, such as water distribution systems, electric power distribution systems, pipeline control systems, plant control systems, light switches, thermostats, locks, cameras, alarms, motion sensors, and the like. The computing devices may be accessible through remote computers, servers, and other systems, for example, to control systems or access data.

The future growth of the Internet and like networks may involve very large numbers of computing devices. Accordingly, in the context of the techniques discussed herein, several innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of computing devices and networks present several new challenges in a heterogeneous network of connectivity comprising a combination of wired and wireless technologies.

FIG. 7 specifically provides a simplified drawing of a domain topology that may be used for several IoT networks comprising computing devices 704, with the IoT networks 756, 758, 760, 762, coupled through backbone links 702 to respective gateways 754. For example, several computing devices 704 may communicate with a gateway 754, and with each other through the gateway 754. To simplify the drawing, not every computing device 704, or communications link (e.g., link 716, 722, 728, or 732) is labeled. The backbone links 702 may include any number of wired or wireless technologies, including optical networks, and may be part of a local area network (LAN), a wide area network (WAN), or the Internet. Additionally, such communication links facilitate optical signal paths among both computing devices 704 and gateways 754, including the use of MUXing/deMUXing components that facilitate the interconnection of the various devices.

The network topology may include any number of types of IoT networks, such as a mesh network provided with the network 756 using Bluetooth low energy (BLE) links 722. Other types of IoT networks that may be present include a wireless local area network (WLAN) network 758 used to communicate with computing devices 704 through IEEE 802.11 (Wi-Fi®) links 728, a cellular network 760 used to communicate with computing devices 704 through an LTE/LTE-A (4G) or 5G cellular network, and a low-power wide-area (LPWA) network 762, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with the use of a variety of network and internet application protocols such as the Constrained Application Protocol (CoAP). The respective IoT networks may also be integrated with coordinator devices that provide a chain of links that form the cluster tree of linked devices and networks.

Each of these IoT networks may provide opportunities for new technical features, such as those described herein. The improved technologies and networks may enable the exponential growth of devices and networks, including the use of IoT networks into fog devices or systems. As the use of such improved technologies grows, the IoT networks may be developed for self-management, functional evolution, and collaboration, without needing direct human intervention. Improved technologies may even enable IoT networks to function without centralized controlled systems. Accordingly, the improved technologies described herein may be used to automate and enhance network management and operation functions far beyond current implementations.

In an example, communications between computing devices 704, such as over the backbone links 702, may be protected by a decentralized system for authentication, authorization, and accounting (AAA). In a decentralized AAA system, distributed payment, credit, audit, authorization, and authentication systems may be implemented across the interconnected heterogeneous network infrastructure. This enables systems and networks to move towards autonomous operations. In these types of autonomous operations, machines may even contract for human resources and negotiate partnerships with other machine networks. This may enable the achievement of mutual objectives and balanced service delivery against outlined, planned service level agreements as well as achieve solutions that provide metering, measurements, traceability, and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the computing devices. The integration of sensory systems may enable systematic and autonomous communication and coordination of service delivery against contractual service objectives, orchestration and QoS-based swarming and fusion of resources. Some of the individual examples of network-based resource processing include the following.

The mesh network 756, for instance, maybe enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource-based trust and service indices may be inserted to improve the data integrity, quality, assurance and deliver a metric of data confidence.

The WLAN network 758, for instance, may use systems that perform standards conversion to provide multi-standard connectivity, enabling computing devices 704 using different protocols to communicate. Further systems may provide seamless interconnectivity across a multi-standard infrastructure comprising visible Internet resources and hidden Internet resources.

Communications in the cellular network 760, for instance, maybe enhanced by systems that offload data, extend communications to more remote devices, or both. The LPWA network 762 may include systems that perform non-Internet protocol (IP) to IP interconnections, addressing, and routing. Further, each of the computing devices 704 may include the appropriate transceiver for wide-area communications with that device. Further, each computing device 704 may include other transceivers for communications using additional protocols and frequencies. This is discussed further concerning the communication environment and hardware of an IoT processing device depicted in FIG. 9 and FIGS. 10A-10B.

Finally, clusters of computing devices may be equipped to communicate with other computing devices as well as with a cloud network. This may enable the computing devices to form an ad-hoc network between the devices, enabling them to function as a single device, which may be termed a fog device, fog platform, or fog network. This configuration is discussed further concerning FIG. 8 below.

Figure 8:
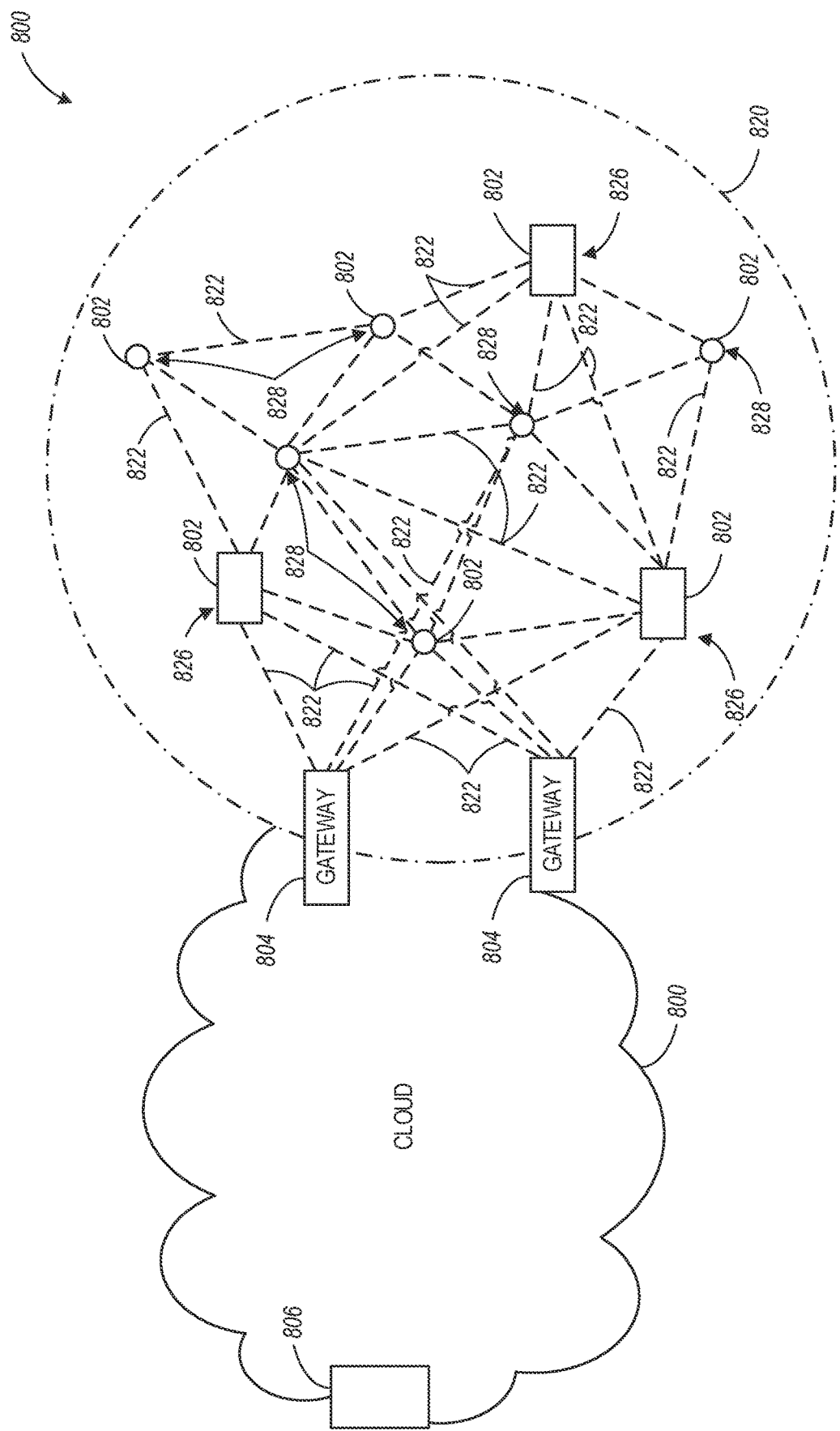
FIG. 8 illustrates a cloud-computing network in communication with a mesh network of computing devices operating as fog devices at the edge of the cloud computing network, according to an example.

FIG. 8 illustrates a cloud-computing network in communication with a mesh network of computing devices (devices 802) operating as fog devices at the edge of the cloud computing network, according to an example. The mesh network of computing devices may be termed a fog network 820, established from a network of devices operating at the edge of the cloud 800. To simplify the diagram, not every computing device 802 is labeled.

The fog network 820 may be considered to be a massively interconnected network wherein several computing devices 802 are in communications with each other, for example, by radio links 822. The fog network 820 may establish a horizontal, physical, or virtual resource platform that can be considered to reside between IoT edge devices and cloud or data centers. A fog network, in some examples, may support vertically-isolated, latency-sensitive applications through layered, federated, or distributed computing, storage, and network connectivity operations. However, a fog network may also be used to distribute resources and services at and among the edge and the cloud. Thus, references in the present document to the "edge", "fog", and "cloud" are not necessarily discrete or exclusive of one another.

As an example, the fog network 820 may be facilitated using an interconnect specification released by the Open Connectivity Foundation™ (OCF). This standard enables devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Three types of computing devices 802 are shown in this example, gateways 804, data aggregators 826, and sensors 828, although any combinations of computing devices 802 and functionality may be used. The gateways 804 may be edge devices that provide communications between the cloud 800 and the fog 820 and may also provide the backend process function for data obtained from sensors 828, such as motion data, flow data, temperature data, and the like. The data aggregators 826 may collect data from any number of the sensors 828 and perform the back-end processing function for the analysis. The results, raw data, or both may be passed along to the cloud 800 through the gateways 804. The sensors 828 may be full computing devices 802, for example, capable of both collecting data and processing the data. In some cases, the sensors 828 may be more limited in functionality, for example, collecting the data and enabling the data aggregators 826 or gateways 804 to process the data.

Communications from any of the computing devices 802 may be passed along a convenient path (e.g., a most convenient path) between any of the computing devices 802 to reach the gateways 804. In these networks, the number of interconnections provides substantial redundancy, enabling communications to be maintained, even with the loss of several computing devices 802. Further, the use of a mesh network may enable computing devices 802 that are very low power or located at a distance from infrastructure to be used, as the range to connect to another computing device 802 may be much less than the range to connect to the gateways 804.

The fog 820 provided from these computing devices 802 may be presented to devices in the cloud 800, such as a server 806, as a single device located at the edge of the cloud 800, e.g., a fog device. In this example, the alerts coming from the Fog device may be sent without being identified as coming from a specific computing devices 802 within the fog 820. In this fashion, the fog 820 may be considered a distributed platform that provides computing and storage resources to perform processing or data-intensive tasks such as data analytics, data aggregation, and machine learning, among others.

In some examples, the computing devices 802 may be configured using an imperative programming style, e.g., with each computing device 802 having a specific function and communication partners. However, the computing devices 802 forming the fog device may be configured in a declarative programming style, enabling the computing devices 802 to reconfigure their operations and communications, such as to determine needed resources in response to conditions, queries, and device failures. As an example, a query from a user located at a server 806 about the operations of a subset of equipment monitored by the computing devices 802 may result in the fog 820 device selecting the computing devices 802, such as particular sensors 828, needed to answer the query. The data from these sensors 828 may then be aggregated and analyzed by any combination of the sensors 828, data aggregators 826, or gateways 804, before being sent on by the fog 820 device to the server 806 to answer the query. In this example, computing devices 802 in the fog 820 may select the sensors 828 used based on the query, such as adding data from flow sensors or temperature sensors. Further, if some of the computing devices 802 are not operational, other computing devices 802 in the fog 820 device may provide analogous data, if available.

In other examples, the operations and functionality described above may be embodied by a computing device machine in the example form of an electronic processing system, within which a set or sequence of instructions may be executed to cause the electronic processing system to perform any one of the methodologies discussed herein, according to an example. The machine may be a computing device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine.

Further, these and like examples to a processor-based system shall be taken to include any set of one or more machines that are controlled by or operated by a processor, set of processors, or processing circuitry (e.g., a machine in the form of a computer, UE, MEC processing device, IoT processing device, etc.) to individually or jointly execute instructions to perform any one or more of the methodologies discussed herein. Accordingly, in various examples, applicable means for processing (e.g., processing, controlling, generating, evaluating, etc.) may be embodied by such processing circuitry.

Figure 9:
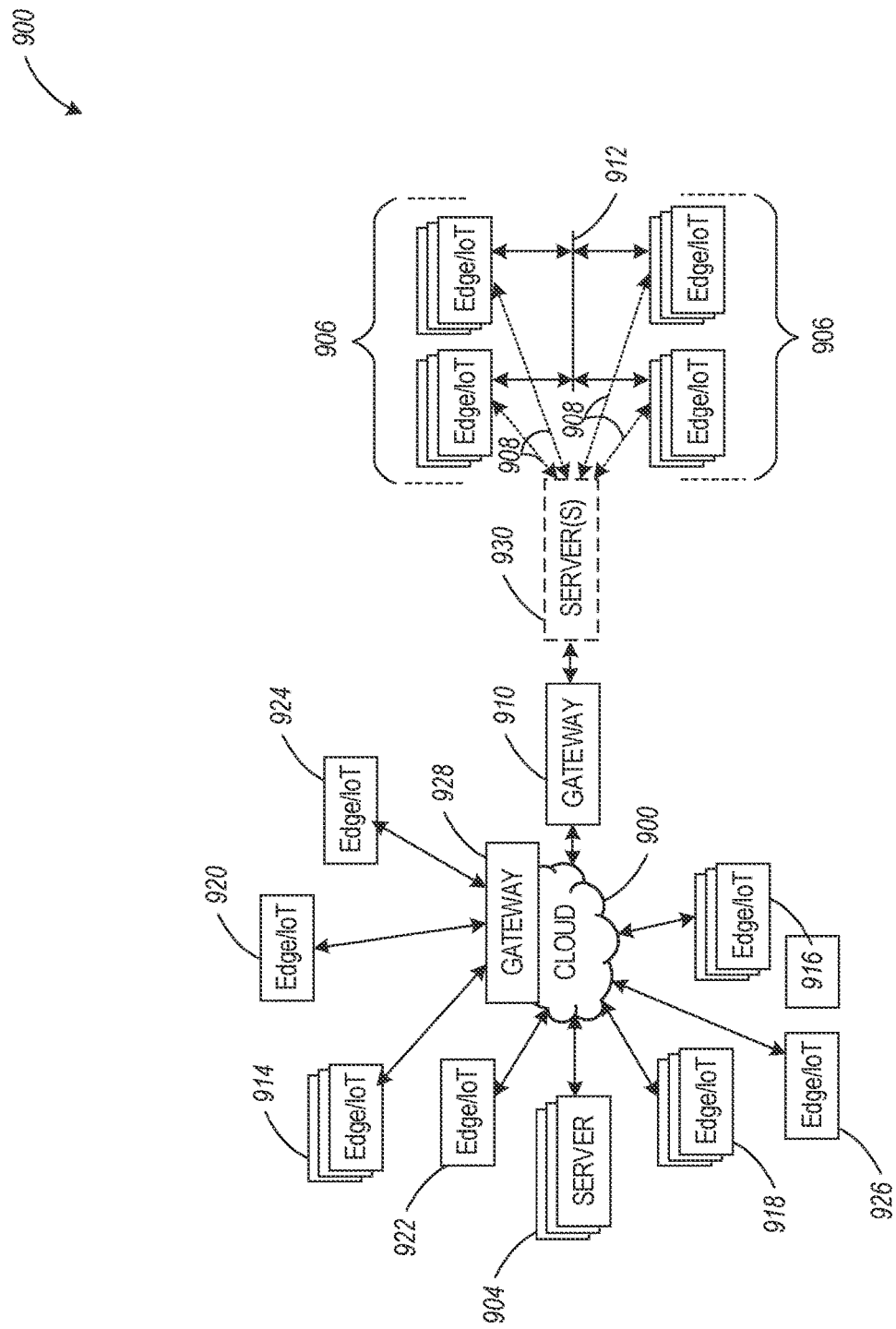
FIG. 9 illustrates a block diagram of a cloud computing network in communication with several computing devices, according to an example.

FIG. 9 illustrates a block diagram of a cloud computing network, or cloud 900, in communication with several computing devices, according to an example. The cloud computing network (or "cloud") 900 may represent the Internet or maybe a local area network (LAN), or a wide area network (WAN), such as a proprietary network for a company. The computing devices may include any number of different types of devices, grouped in various combinations. For example, a traffic control group 906 may include computing devices along the streets in a city. These computing devices may include stoplights, traffic flow monitors, cameras, weather sensors, and the like. The traffic control group 906, or other subgroups, may be in communication with the cloud 900 through wired or wireless links 908, such as LPWA links, optical links, and the like. Further, a wired or wireless sub-network 912 may allow the computing devices to communicate with each other, such as through a local area network, a wireless local area network, and the like. The computing devices may use another device, such as a gateway 910 or 928 to communicate with remote locations such as the cloud 900; the computing devices may also use one or more servers 930 to facilitate communication with the cloud 900 or with the gateway 910. For example, the one or more servers 930 may operate as an intermediate network node to support a local edge cloud or fog implementation among a local area network. Further, the gateway 928 that is depicted may operate in a cloud-to-gateway-to-many edge devices configuration, such as with the various computing devices 914, 920, 924 being constrained or dynamic to an assignment and use of resources in the cloud 900.

Other example groups of computing devices may include remote weather stations 914, local information terminals 916, alarm systems 918, automated teller machines 920, alarm panels 922, or moving vehicles, such as emergency vehicles 924 or other vehicles 926, among many others. Each of these computing devices may be in communication with other computing devices, with servers 904, with another IoT fog platform or system, or a combination therein. The groups of computing devices may be deployed in various residential, commercial, and industrial settings (including in both private or public environments).

As may be seen from FIG. 9, a large number of computing devices may be communicating through the cloud 900. This may allow different computing devices to request or provide information to other devices autonomously. For example, a group of computing devices (e.g., the traffic control group 906) may request a current weather forecast from a group of remote weather stations 914, which may provide the forecast without human intervention. Further, an emergency vehicle 924 may be alerted by an automated teller machine 920 that a burglary is in progress. As the emergency vehicle 924 proceeds towards the automated teller machine 920, it may access the traffic control group 906 to request clearance to the location, for example, by lights turning red to block cross traffic at an intersection insufficient time for the emergency vehicle 924 to have unimpeded access to the intersection.

Clusters of computing devices, such as the remote weather stations 914 or the traffic control group 906, may be equipped to communicate with other computing devices as well as with the cloud 900. This may allow the computing devices to form an ad-hoc network between the devices, allowing them to function as a single device, which may be termed a fog platform or system (e.g., as described above concerning FIG. 8).

Example Computing Devices

Figure 10A:
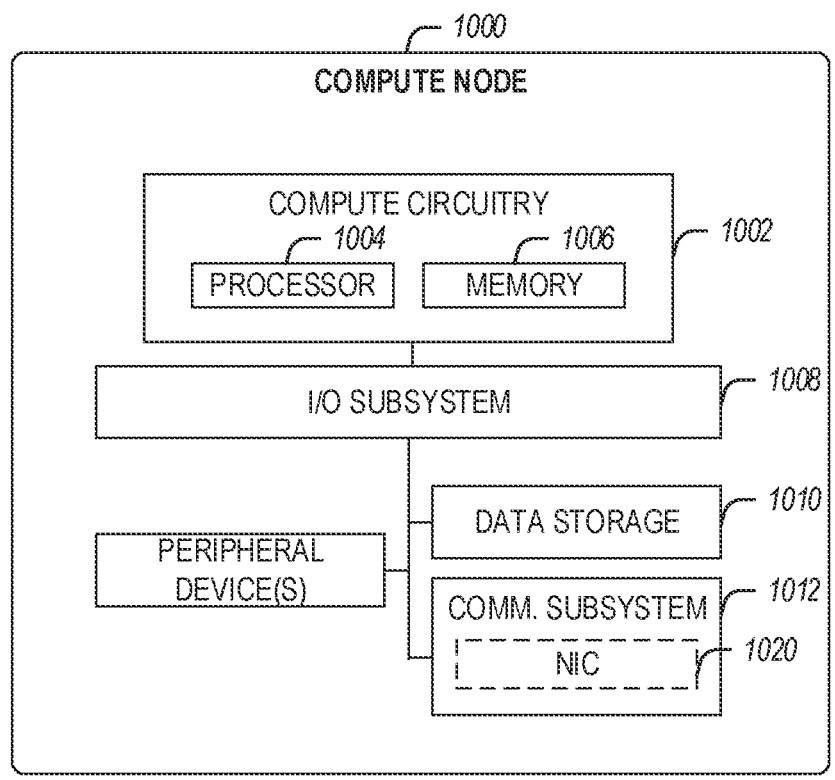
FIG. 10A illustrates an overview of example components deployed at a compute node system, according to an example.
Figure 10B:
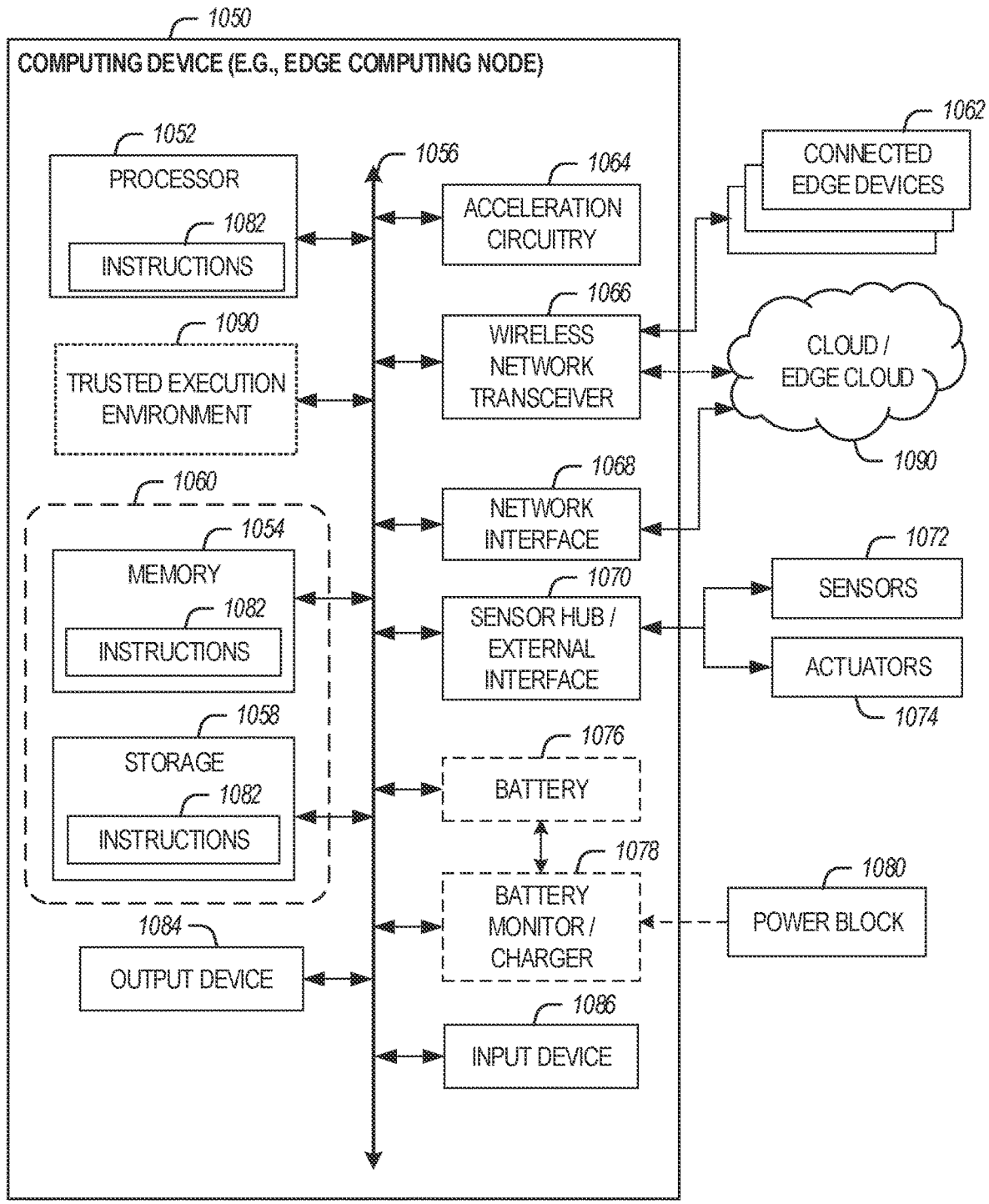
FIG. 10B illustrates a further overview of example components within a computing device for implementing the techniques (e.g., operations, processes, methods, and methodologies) described herein, according to an example.

In further examples, any of the compute nodes or devices discussed concerning the present edge computing systems and environment may be fulfilled based on the components depicted in FIGS. 10A and 10B. Each edge compute node may be embodied as a type of device, appliance, computer, or other "thing" capable of communicating with other edges, networking, or endpoint components. For example, an edge compute device may be embodied as a smartphone, a mobile computing device, a smart appliance, an in-vehicle computing system (e.g., a navigation system), or other device or system capable of performing the described functions.

In the simplified example depicted in FIG. 10A, an edge compute node 1000 includes a compute engine (also referred to herein as "compute circuitry") 1002, an input/output (I/O) subsystem 1008, data storage 1010, a communication circuitry subsystem 1012, and, optionally, one or more peripheral devices 1014. In other examples, each computing device may include other or additional components, such as those used in personal or server computing systems (e.g., a display, peripheral devices, etc.). Additionally, in some examples, one or more of the illustrative components may be incorporated in, or otherwise form a portion of, another component.

The compute node 1000 may be embodied as any type of engine, device, or collection of devices capable of performing various compute functions. In some examples, the compute node 1000 may be embodied as a single device such as an integrated circuit, an embedded system, a field-programmable gate array (FPGA), a system-on-a-chip (SOC), or other integrated system or device. In the illustrative example, the compute node 1000 includes or is embodied as a processor 1004 and a memory 1006. The processor 1004 may be embodied as any type of processor capable of performing the functions described herein (e.g., executing an application). For example, the processor 1004 may be embodied as a multi-core processor(s), a microcontroller, or other processor or processing/controlling circuit. In some examples, the processor 1004 may be embodied as, include, or be coupled to an FPGA, an application-specific integrated circuit (ASIC), reconfigurable hardware or hardware circuitry, or other specialized hardware to facilitate the performance of the functions described herein.

The main memory 1006 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In one example, the memory device is a block addressable memory device, such as those based on NAND or NOR technologies. A memory device may also include a threedimensional crosspoint memory device (e.g., Intel 3D XPoint™ memory), or other byte-addressable write-in-place nonvolatile memory devices. The memory device may refer to the die itself and/or to a packaged memory product. In some examples, 3D crosspoint memory (e.g., Intel 3D XPoint™ memory) may comprise a transistor-less stackable cross-point architecture in which memory cells sit at the intersection of word lines and bit lines and are individually addressable and in which bit storage is based on a change in bulk resistance. In some examples, all or a portion of the main memory 1006 may be integrated into the processor 1004. The main memory 1006 may store various software and data used during operation such as one or more applications, data operated on by the application(s), libraries, and drivers.

The compute circuitry 1002 is communicatively coupled to other components of the compute node 1000 via the I/O subsystem 1008, which may be embodied as circuitry and/or components to facilitate input/output operations with the compute circuitry 1002 (e.g., with the processor 1004 and/or the main memory 1006) and other components of the compute circuitry 1002. For example, the I/O subsystem 1008 may be embodied as, or otherwise include memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 1008 may form a portion of a system-on-a-chip (SoC) and be incorporated, along with one or more of the processor 1004, the main memory 1006, and other components of the compute circuitry 1002, into the compute circuitry 1002.

The one or more illustrative data storage devices 1010 may be embodied as any type of device configured for short-term or long-term storage of data such as, for example, memory devices and circuits, memory cards, hard disk drives, solid-state drives, or other data storage devices. Each data storage device 1010 may include a system partition that stores data and firmware code for the data storage device 1010. Each data storage device 1010 may also include one or more operating system partitions that store data files and executables for operating systems depending on, for example, the type of compute node 1000.

The communication circuitry 1012 may be embodied as any communication circuit, device, or collection thereof, capable of enabling communications over a network between the compute circuitry 1002 and another compute device (e.g., an edge gateway node 612 of the edge computing system 600). The communication circuitry 1012 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, etc.) to effect such communication.

The illustrative communication circuitry 1012 includes a network interface controller (NIC) 1020, which may also be referred to as a host fabric interface (HFI). The NIC 1020 may be embodied as one or more add-in-boards, daughter cards, network interface cards, controller chips, chipsets, or other devices that may be used by the compute node 1000 to connect with another compute device (e.g., an edge gateway node 612). In some examples, the NIC 1020 may be embodied as part of a system-on-a-chip (SoC) that includes one or more processors or included on a multichip package that also contains one or more processors. In some examples, the NIC 1020 may include a local processor (not shown) and/or a local memory and storage (not shown) that are local to the NIC 1020. In such examples, the local processor of the NIC 1020 (which can include general-purpose accelerators or specific accelerators) may be capable of performing one or more of the functions of the compute circuitry 1002 described herein. Additionally, or in such examples, the local memory of the NIC 1020 may be integrated into one or more components of the client compute node at the board level, socket level, chip level, and/or other levels.

Additionally, in some examples, each compute node 1000 may include one or more peripheral devices 1014. Such peripheral devices 1014 may include any type of peripheral device found in a compute device or server such as audio input devices, a display, other input/output devices, interface devices, and/or other peripheral devices, depending on the particular type of the compute node 1000. In further examples, the compute node 1000 may be embodied by a respective edge compute node in an edge computing system (e.g., client compute node 602, edge gateway node 612, edge aggregation node 622) or like forms of appliances, computers, subsystems, circuitry, or other components.

In a more detailed example, FIG. 10B illustrates a block diagram of an example of components that may be present in an edge computing device (or node) 1050 for implementing the techniques (e.g., operations, processes, methods, and methodologies) described herein. The edge computing node 1050 may include any combinations of the components referenced above, and it may include any device usable with an edge communication network or a combination of such networks. The components may be implemented as ICs, portions thereof, discrete electronic devices, or other modules, logic, hardware, software, firmware, or a combination thereof adapted in the edge computing node 1050, or as components otherwise incorporated within a chassis of a larger system.

The edge computing node 1050 may include processing circuitry in the form of a processor 1052, which may be a microprocessor, a multi-core processor, a multithreaded processor, an ultra-low voltage processor, an embedded processor, or other known processing elements. The processor 1052 may be a part of a system on a chip (SoC) in which the processor 1052 and other components are formed into a single integrated circuit, or a single package, such as the Edison™ or Galileo™ SoC boards from Intel Corporation, Santa Clara, California. As an example, the processor 1052 may include an Intel® Architecture Core™ based processor, such as a Quark™, an Atom™, an i3, an i5, an i7, an i9, or an MCU-class processor, or another such processor available from Intel®. However, any number other processors may be used, such as available from Advanced Micro Devices, Inc. (AMD) of Sunnyvale, California, a MIPS-based design from MIPS Technologies, Inc. of Sunnyvale, California, an ARM-based design licensed from ARM Holdings, Ltd. or a customer thereof, or their licensees or adopters. The processors may include units such as an A5-A12 processor from Apple® Inc., a Snapdragon™ processor from Qualcomm® Technologies, Inc., or an OMAP™ processor from Texas Instruments, Inc.

The processor 1052 may communicate with a system memory 1054 over an interconnect 1056 (e.g., a bus). Any number of memory devices may be used to provide for a given amount of system memory. As examples, the memory may be random access memory (RAM) per a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, maybe directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1058 may also couple to the processor 1052 via the interconnect 1056. In an example, the storage 1058 may be implemented via a solid-state disk drive (SSDD). Other devices that may be used for the storage 1058 include flash memory cards, such as SD cards, microSD cards, XD picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin-transfer torque (STT)-MRAM, a spintronic magnetic junction memory-based device, a magnetic tunneling junction (MTJ) based device, a DW (Domain Wall) and SOT (Spin-Orbit Transfer) based device, a thyristor-based memory device, or a combination of any of the above, or other memory.

In low power implementations, the storage 1058 may be on-die memory or registers associated with the processor 1052. However, in some examples, the storage 1058 may be implemented using a micro hard disk drive (HDD) or solid-state drive (SSD). Further, any number of new technologies may be used for the storage 1058 in addition to, or instead of, the technologies described, such resistance change memories, phase change memories, holographic memories, or chemical memories, among others.

The components may communicate over the interconnect 1056. The interconnect 1056 may include any number of technologies, including industry-standard architecture (ISA), extended ISA (EISA), peripheral component interconnect (PCI), peripheral component interconnect extended (PCIx), PCI express (PCIe), or any number of other technologies. The interconnect 1056 may be a proprietary bus, for example, used in an SoC based system. Other bus systems may be included, such as an I2C interface, an SPI interface, point to point interfaces, and a power bus, among others.

The interconnect 1056 may couple the processor 1052 to a transceiver 1066, for communications with the connected edge devices 1062. The transceiver 1066 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 1062. For example, a wireless local area network (WLAN) unit may be used to implement Wi-Fi® communications per the Institute of Electrical and Electronics Engineers (IEEE) 802.11 standard. Also, wireless wide area communications, e.g., according to a cellular or other wireless wide area protocol, may occur via a wireless wide area network (WWAN) unit.

The wireless network transceiver 1066 (or multiple transceivers) may communicate using multiple standards or radios for communications at a different range. For example, the edge computing node 1050 may communicate with close devices, e.g., within about 10 meters, using a local transceiver based on BLE, or another low power radio, to save power. More distant connected edge devices 1062, e.g., within about 50 meters, maybe reached over ZigBee or other intermediate power radios. Both communications techniques may take place over a single radio at different power levels or may take place over separate transceivers, for example, a local transceiver using BLE and a separate mesh transceiver using ZigBee.

A wireless network transceiver 1066 (e.g., a radio transceiver) may be included to communicate with devices or services in the edge cloud 1090 via local or wide area network protocols. The wireless network transceiver 1066 may be an LPWA transceiver that follows the IEEE 802.15.4, or IEEE 802.15.4g standards, among others. The edge computing node 1050 may communicate over a wide area using LoRaWAN™ (Long Range Wide Area Network) developed by Semtech and the LoRa Alliance. The techniques described herein are not limited to these technologies but may be used with any number of other cloud transceivers that implement long-range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 1066, as described herein. For example, the transceiver 1066 may include a cellular transceiver that uses spread spectrum (SPA/SAS) communications for implementing high-speed communications. Further, any number of other protocols may be used, such as Wi-Fi® networks for medium speed communications and provision of network communications. The transceiver 1066 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 1068 may be included to provide a wired communication to nodes of the edge cloud 1090 or other devices, such as the connected edge devices 1062 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, Time Sensitive Networks (TSN), among many others. An additional NIC 1068 may be included to enable connecting to a second network, for example, a first NIC 1068 providing communications to the cloud over Ethernet, and a second NIC 1068 providing communications to other devices over another type of network.

Given the variety of types of applicable communications from the device to another component or network, applicable communications circuitry used by the device may include or be embodied by any one or more of components 1064, 1066, 1068, or 1070. Accordingly, in various examples, applicable means for communicating (e.g., receiving, transmitting, etc.) may be embodied by such communications circuitry.

The edge computing node 1050 may include or be coupled to acceleration circuitry 1064, which may be embodied by one or more AI accelerators, a neural compute stick, neuromorphic hardware, an FPGA, an arrangement of GPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. Accordingly, in various examples, applicable means for acceleration may be embodied by such acceleration circuitry.

The interconnect 1056 may couple the processor 1052 to a sensor hub or external interface 1070 that is used to connect additional devices or subsystems. The devices may include sensors 1072, such as accelerometers, level sensors, flow sensors, optical light sensors, camera sensors, temperature sensors, a global positioning system (GPS) sensors, pressure sensors, barometric pressure sensors, and the like. The hub or interface 1070 further may be used to connect the edge computing node 1050 to actuators 1074, such as power switches, valve actuators, an audible sound generator, a visual warning device, and the like.

In some optional examples, various input/output (I/O) devices may be present within or connected to, the edge computing node 1050. For example, a display or other output device 1084 may be included to show information, such as sensor readings or actuator position. An input device 1086, such as a touch screen or keypad may be included to accept input. An output device 1084 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the edge computing node 1050.

A battery 1076 may power the edge computing node 1050, although, in examples in which the edge computing node 1050 is mounted in a fixed location, it may have a power supply coupled to an electrical grid. The battery 1076 may be a lithium-ion battery, or a metal-air battery, such as a zinc-air battery, an aluminum-air battery, a lithium-air battery, and the like.

A battery monitor/charger 1078 may be included in the edge computing node 1050 to track the state of charge (SoCh) of the battery 1076. The battery monitor/charger 1078 may be used to monitor other parameters of the battery 1076 to provide failure predictions, such as the state of health (SoH) and the state of function (SoF) of the battery 1076. The battery monitor/charger 1078 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX. The battery monitor/charger 1078 may communicate the information on the battery 1076 to the processor 1052 over the interconnect 1056. The battery monitor/charger 1078 may also include an analog-to-digital (ADC) converter that enables the processor 1052 to directly monitor the voltage of the battery 1076 or the current flow from the battery 1076. The battery parameters may be used to determine actions that the edge computing node 1050 may perform, such as transmission frequency, mesh network operation, sensing frequency, and the like.

A power block 1080, or other power supply coupled to a grid, may be coupled with the battery monitor/charger 1078 to charge the battery 1076. In some examples, the power block 1080 may be replaced with a wireless power receiver to obtain the power wirelessly, for example, through a loop antenna in the edge computing node 1050. A wireless battery charging circuit, such as an LTC4020 chip from Linear Technologies of Milpitas, California, among others, may be included in the battery monitor/charger 1078. The specific charging circuits may be selected based on the size of the battery 1076, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1058 may include instructions 1082 in the form of software, firmware, or hardware commands to implement the techniques described herein. Although such instructions 1082 are shown as code blocks included in the memory 1054 and the storage 1058, it may be understood that any of the code blocks may be replaced with hardwired circuits, for example, built into an application-specific integrated circuit (ASIC).

In an example, the instructions 1082 provided via memory 1054, the storage 1058, or the processor 1052 may be embodied as a non-transitory, machine-readable medium 1060 including code to direct the processor 1052 to perform electronic operations in the edge computing node 1050. The processor 1052 may access the non-transitory, machine-readable medium 1060 over the interconnect 1056. For instance, the non-transitory, machine-readable medium 1060 may be embodied by devices described for the storage 1058 or may include specific storage units such as optical disks, flash drives, or any number of other hardware devices. The non-transitory, machine-readable medium 1060 may include instructions to direct the processor 1052 to perform a specific sequence or flow of actions, for example, as described concerning the flowchart(s) and block diagram(s) of operations and functionality depicted above. As used in, the terms "machine-readable medium" and "computer-readable medium" are interchangeable.

In an example, the computing device 1050 can be implemented using components/modules/blocks 1052-1086 which are configured as IP Blocks. Each IP Block may contain a hardware RoT (e.g., device identifier composition engine, or DICE), where a DICE key may be used to identify and attest the IP Block firmware to a peer IP Block or remotely to one or more of components/modules/blocks 1062-1080.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of several transfer protocols (e.g., HTTP).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

Each of the block diagrams of FIGS. 10A and 10B are intended to depict a high-level view of components of a device, subsystem, or arrangement of an edge computing node. However, it will be understood that some of the components shown may be omitted, additional components may be present, and a different arrangement of the components shown may occur in other implementations.

Development of MEC-enabled 5G communication systems may be dependent on the ability to provide communication service providers (CoSPs) the ability to provision, manage, adjust, and operate multiple network slice instances using virtual networks over a common set of physical (wireless and wired) network infrastructure. E2E network slice instances may carve out virtual resources (e.g., resources forming virtual logical networks) using physical computing and network resources of the MEC-enabled 5G communication systems. Each network slice instance can be specifically configured to support performance related to a QoS flow of a UE, including capacity, security levels, geographical coverage, and latency. Network slice instances may include partitioning of RAN functionalities, core infrastructure including the Evolved Packet Core (EPC), as well as the switches and Data Center Servers where the 5G mobile applications and content may be hosted (e.g., as VNFs provided by MEC applications executing on resources of a MEC system within the 5G communication network). Furthermore, 5G EDGE devices may also be included in the slice depending on the service latency requirements. Techniques disclosed herein may include provisioning of one or more network slice instances and dynamic management of resources used by the network slices, including generating and implementing one or more slice configuration policies, based on utility function modeling and evaluation of latency or other characteristics of MEC and non-MEC communication links for a given NSI configured within a MEC-enabled 5G communication network.

In some aspects, 5G network slices will support a wide range of applications from (semi-)autonomous vehicles, remote health monitoring and first-responder applications requiring the best security/traceability to tiered smartphone plans and IoT devices that may be ok without extra resource traceability.

FIG. 11 illustrates a MEC-enabled 5G communication system 1100 and an example of the mapping of MEC entities to some of the 5G system's components (namely, AF and UPF), according to an example. The MEC-enabled 5G communication system 1100 can be configured to provide functionalities per the ETSI GS MEC-003 specification, the ETSI GR MEC-017 specification, and/or the ETSI GS MEC-024 specification.

The mapping of MEC entities into a 5G system is depicted in FIG. 11. In particular: a MEC platform is implemented as a particular application function (AF) in 3GPP; the Data Plane in the MEC architecture corresponds to a User Plane Function (UPF) in 3GPP, and the MEC apps are mapped to the local DN (Data Network) in 3GPP.

As illustrated in FIG. 11, UE 1102 is coupled to RAN 1106 via a remote radio head (RRH) 1104. The RAN 1106 communicates with a MEC data plane 1110 within NFVI 1108. The MEC data plane 1110 within the NFVI 1108 is coupled to a local data network 1112 of the MEC platform 1118 via an N6 reference point. The MEC platform 1118 is coupled to the local data network 1112 via a MEC reference point Mp1. The MEC platform 1118 may be instantiated as a VNF and may include MEC APIs 1120 and 1122 four communication with MEC apps 1114 and 1116 instantiated as a VNFs within the local data network 1112. The MEC platform 1118 may further include API configuration information 1124 (e.g., as provided by the ETSI MEC-009 specification) and application enablement functions 1126 (e.g., as provided by the ETSI MEC-011 specification). The MEC platform 1118 is coupled to 3GPP network functions such as NEF 1130, PCF 1128, SMF 1132, and UPF 1134. The MEC data plane 1110 is coupled to the 3GPP network functions SMF 1132 and the UPF 1134. Both the MEC platform 1118 and the MEC data plane 1110 are coupled to the central data network 1136 and the application server 1138 via the UPF 1134.

In some aspects, the RAN 1106 may be fully virtualized (e.g., as a VNF using resources of the MEC system). For In some aspects, the MEC-enabled 5G communication system 1100 may use a MEC NFV-SCF to provide E2E multi-slice support, including generating and implementing one or more slice configuration policies based on utility function modeling and evaluation of latency or other characteristics of MEC and non-MEC communication links for a given NSI configured within a MEC-enabled 5G communication network. For example, a QoS flow of the UE 1102 may be associated with a network slice instance which includes a virtual RAN 1106, the MEC data plane 1110 functioning as a 5G UPF network function, a MEC app such as 1114 within the local data network 1112, and the MEC platform VNF 1118 functioning as a 5G AF network function. In this regard, a specific NSI associated with a QoS of the UE 1102 includes non-MEC reference points (e.g., wireless physical links between the UE 1102, the RRH 1104, and the virtual RAN 1106, as well as the N3 and N6 5G reference points. The NSI may further include MEC reference points such as the Mp1 reference points between the MEC app 1114 within the local data network 1112 and the MEC platform VNF 1118. A MEC NFV-SCF (e.g., as illustrated in connection with FIG. 12-FIG. 15) may be configured to generate a slice configuration policy based on utility function modeling and evaluation of latency-associated both the MEC and non-MEC reference points used by the slice, and communicate the generated slice configuration policy to another management entity (e.g., a virtualization infrastructure manager) to determine whether to implement the generated slice configuration policy based on available resources within the MEC-enabled 5G communication network 1100.

In some aspects, the slice configuration policy may include a resource allocation policy for allocating resources to a new NSI or reallocating resources used by an existing NSI. In other aspects, the slice configuration policy may include a VM allocation and handoff policy. As used herein, the term "VM allocation" refers to allocation of network resources to virtual resources of a MEC system (e.g., a VM used), which resources are used for, e.g., executing a MEC app or instantiating a VNF to perform different network functions such as a RAN or a MEC platform. As used herein, the term "VM handoff" is similar to the concept of a handover and includes terminating an existing virtual resource (e.g., at a first location) used for instantiating a VNF that performs a specific network functions (e.g., RAN functions, MEC platform functions, MEC application functions, etc.) and configuring a different virtual resource (e.g., at a second location to instantiate the same VNF). The concept of VM handoff is illustrated in greater detail in connection with FIG. 16A-FIG. 16 H.

In some aspects, a starting point for determining the slice configuration policy by the NFV-SCF is to consider that the End-to-End (E2E) 5G system performance depends not only on the performance of Radio Access Network (RAN) and Core Network (CN) system components alone but also on the performance of the MEC functional entities. For example, the E2E latency (i.e. between the UE 1102 and the MEC application 1114), is composed of the Packet Delay Budget (PDB) (defined in 5G specifications as the E2E delay between the UE and UPF, with a confidence of 98%) and the additional delay between the UPF and the Local DN 1112 (where the MEC apps are located). This second latency component is not taken into account by 5G QoS Class Identifier (5QI) characteristics in 3GPP, although it is important for performance optimization, as it is tightly related to the instantiation of the MEC applications. As a consequence, since the user traffic termination point is at the MEC app 1114 (located in the DN 1112), network slice-relevant performance metrics (such as the PDB) are not sufficient to describe the overall E2E performance and overall latency for all communication links of the NSI. Instead, MEC application instantiation and the related Virtual Machine (VM) allocation may be considered (as discussed herein in connection with functionalities of the MEC NFV-SCF) to optimize the total E2E latency, as per the slice requirements.

The disclosed techniques include the deployment of a MEC system in a (fully virtualized) 5G system (e.g., RAN 1106 is a virtual RAN or vRAN instantiated as a VNF), able to accommodate multiple network slice instances. This deployment includes optimizing the instantiation of MEC apps and the allocation of VMs across the edge cloud, according to a slice-aware strategy using a MEC NFV-SCF. The goal of this allocation is to meet the E2E performance requirements of the network slice instance (which may be part of a Service Level Agreement (SLA), between the network operator and a vertical industry provider).

As mentioned above, some 3GPP standards for 5G networks specify the PDB (packet delay budget) as the upper bound for the time that a packet may be delayed between the UE and the UPF, thus not considering the last part of the user plane traffic path (i.e., over the N6 reference point from the UPF to the MEC app, as depicted in FIG. 11). More specifically, the PDB defines an upper bound for the time that a packet may be delayed between the UE and the UPF (for GBR flows, the PDB shall be interpreted as a maximum delay with a confidence level of 98 percent if the QoS flow is not exceeding the GFBR). For a delay critical GBR QoS flow, a packet delayed more than the value of the PDB is counted as lost (it can be either delivered or discarded depending on implementation) if the transmitted data burst is less than the Maximum Data Burst Volume within the period of the PDB, the QoS flow is not exceeding the GFBR. For Non-GBR Flows, in uncongested scenarios, 98 percent of the packets may not experience a delay exceeding the 5QI's PDB.

In this regard, there is no standard means/parameters in 3GPP to ensure a complete E2E performance, as the MEC app is an entity external to the 3GPP network. Moreover, when instantiating a specific network slice, there is still no standard definition of a (logical) interface between a MEC system to be deployed within a 5G network, and the 5G network orchestrator to perform slice-specific VM allocation and handoff over the MEC and 3GPP-relevant entities and to apply slice performance-compliant mobility management.

FIG. 12 illustrates aspects of the disclosed techniques for E2E multi-slice support for MEC-enabled 5G deployments, according to an example. Referring to FIG. 12, diagram 1200 includes several entities from the architecture 1100, which can be used for implementing techniques disclosed herein for E2E multi-slice support.

Figure 13:
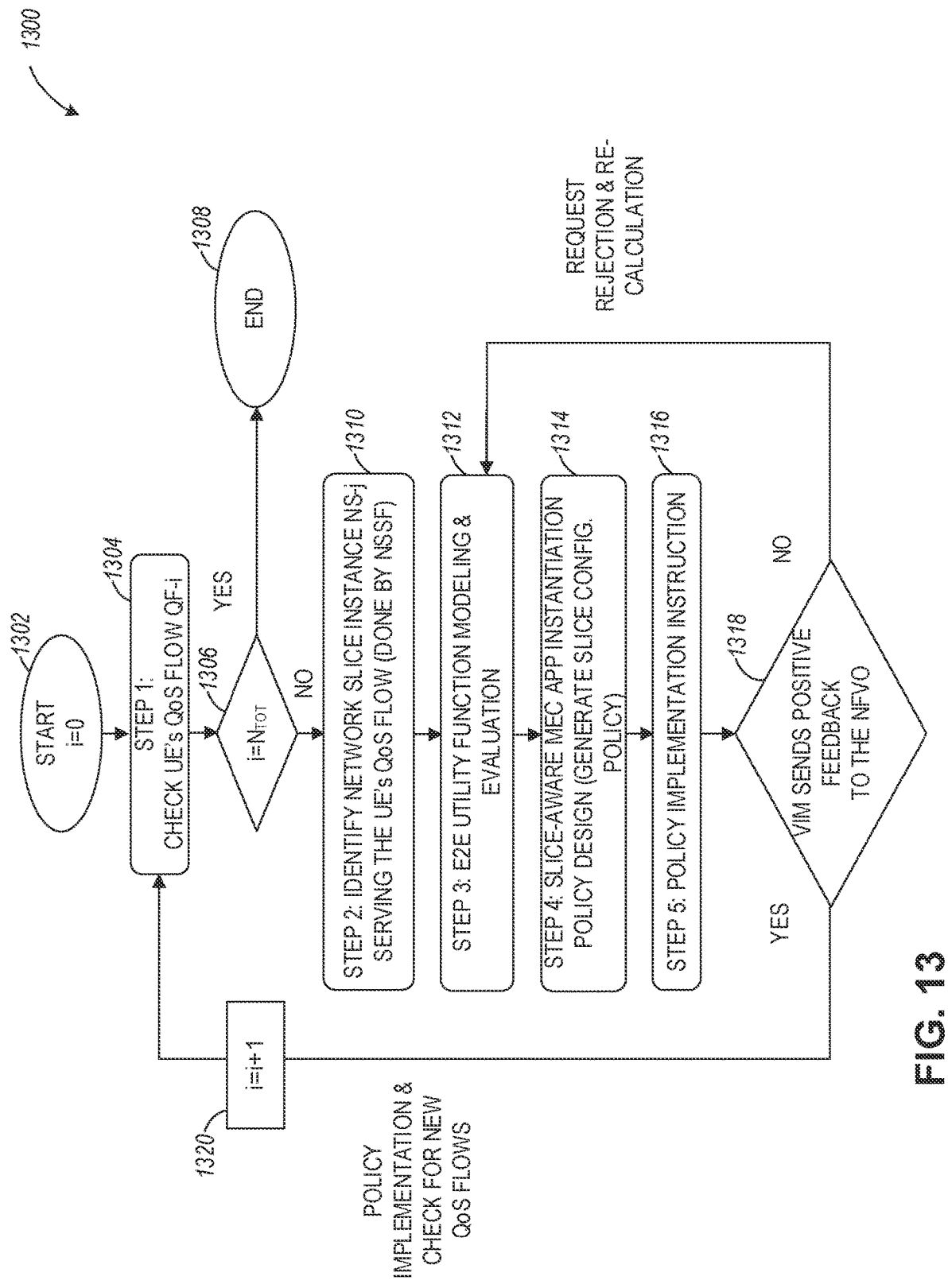
FIG. 13 illustrates a flowchart of disclosed techniques for slice-aware VM allocation in MEC-enabled 5G system deployments, according to an example.
Figure 14:
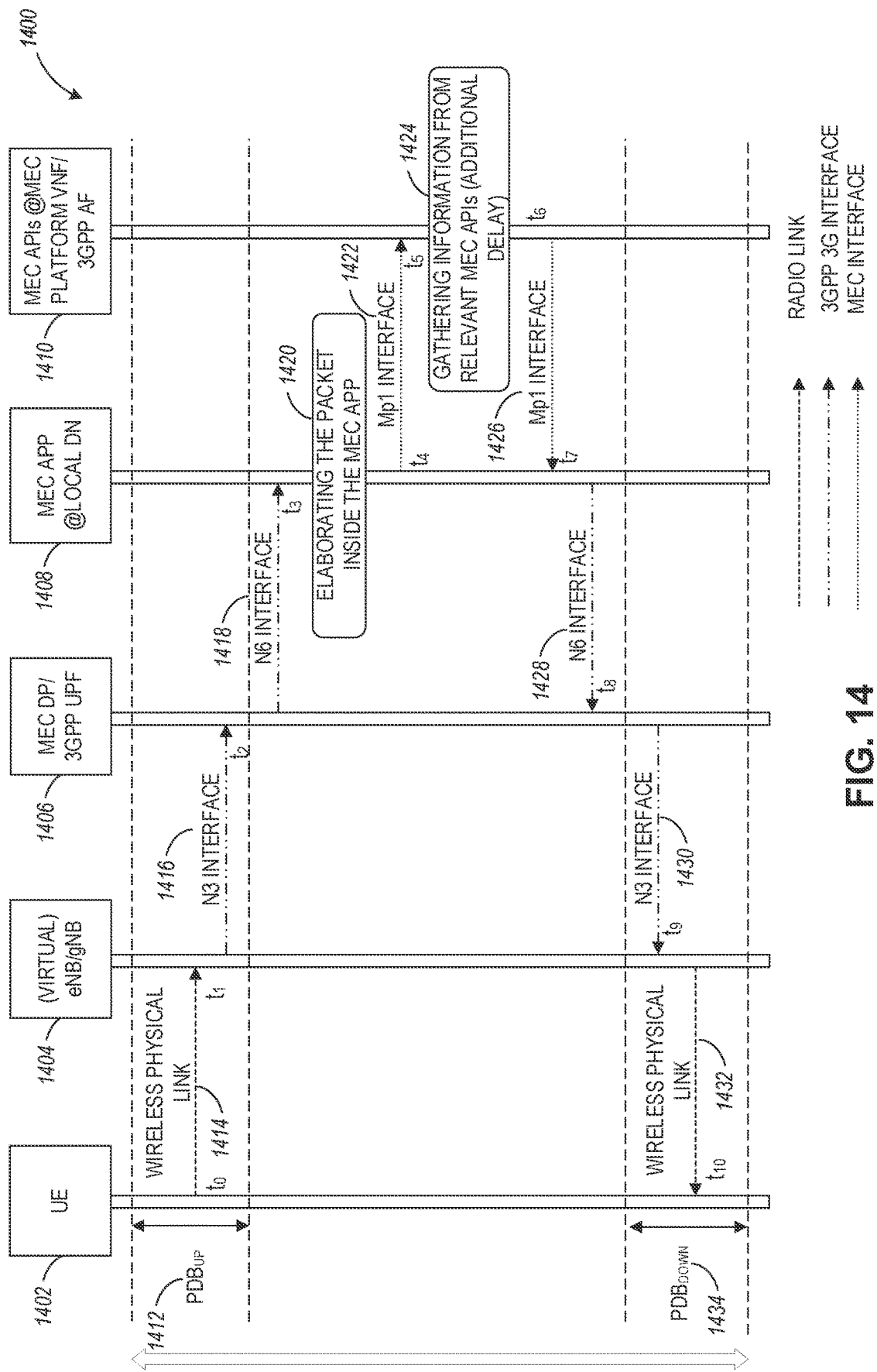
FIG. 14 is a message sequence chart illustrating the various latency components during the direct communication between a UE client and a MEC app at the edge (which consumes some MEC services running on the MEC platform), according to an example.
Figure 15:
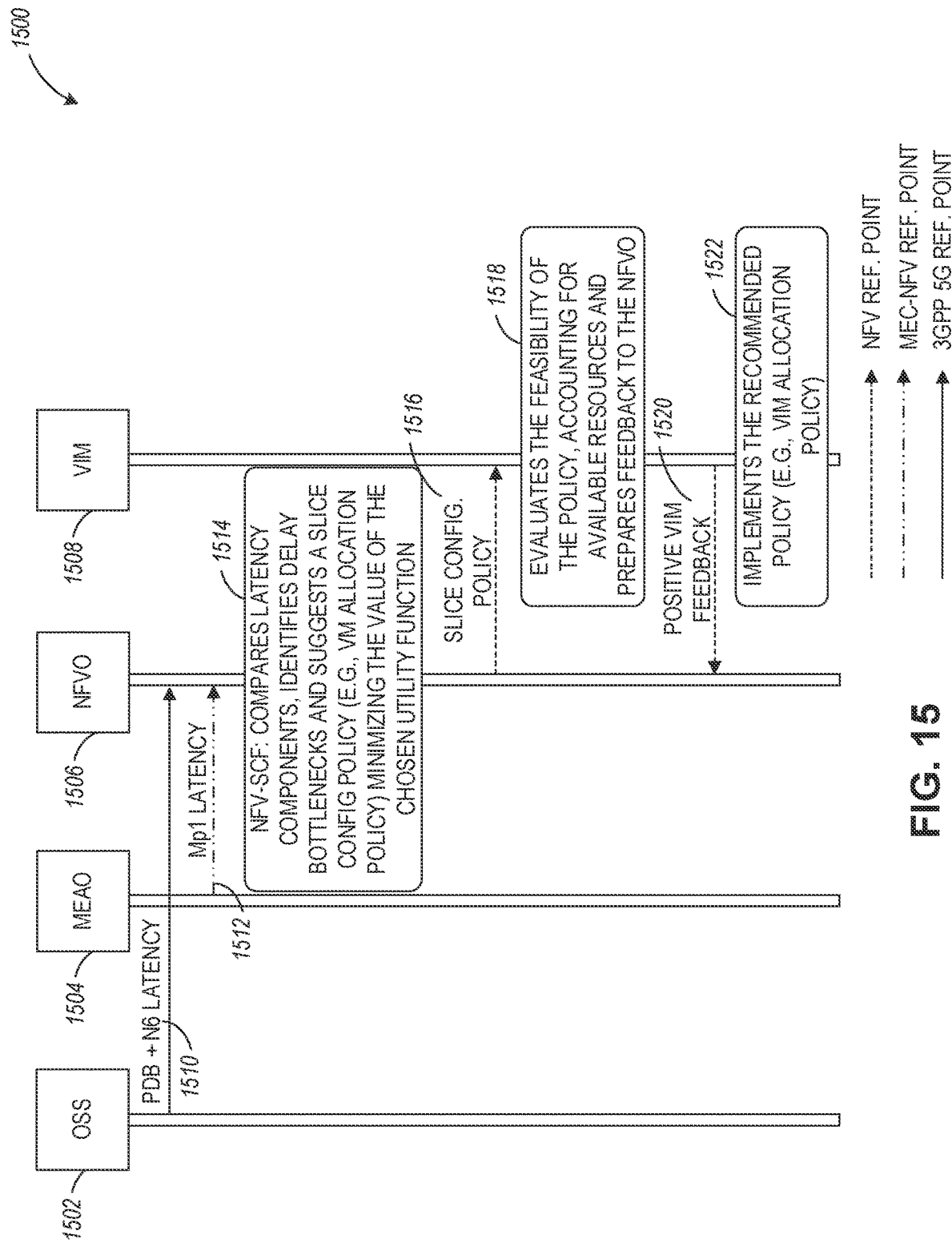
FIG. 15 is a message sequence chart illustrating example communication for deriving and implementing a slice-aware VM allocation policy, according to an example.

The disclosed techniques include an iterative procedure (e.g., as illustrated in FIG. 13-FIG. 15), involving both 3GPP (i.e., a MNO's Operations Support System (OSS) 1202) and ETSI MEC entities (i.e., the MEC system's Multi-access Edge Orchestrator (MEAO) 1204, and the Network Function Virtualization Orchestrator (NFVO) 1206), the goal of which is a slice-efficient allocation of VMs, especially in the existence of UE mobility.

The above mentioned iterative procedure is proposed to be controlled by the MEC NFV-SCF 1208, which may be implemented within the NFVO 1206. As an alternative aspect, the function NFV-SCF could be a separate entity from the NFVO, e.g. in the OSS or an independent entity managed by a third party. The role of NFV-SCF 1208 is similar to the role of the Policy Control Function (PCF) in a 5G architecture. However, the basic difference is that, instead of traffic steering and Policy and Charging Control (PCC), the NFV-SCF 1208, implemented within the NFV domain (and not the 3GPP system domain) may be configured to formulate a slice-aware VM allocation policy taking inputs from the 5GS (OSS 1202), such as the Network Slice Template (NST) 1212 containing slice-specific inputs and attributes, as well as feasibility feedback by the system's Virtualized Infrastructure Manager (VIM) 1210. The disclosed techniques can find an application when it comes to both single and multiple MNOs and MEC systems.

The advantage of the proposed techniques is that utilizing slice-specific configurability of the virtualized, MEC-enabled 5G communication system, full integration of MEC in 5G systems can be achieved through impacting the standard from a management point of view. The disclosed techniques may be used to facilitate the adoption of MEC deployments in 5G systems. As a consequence, the disclosed techniques (if standardized) may introduce enhancements associated with the long-term deployment of MEC.

FIG. 13 illustrates a flowchart 1300 of disclosed techniques for slice-aware VM allocation in MEC-enabled 5G system deployments, according to an example.

The target of the disclosed techniques is to accomplish and maintain slice stability from a QoS guarantee point of view (i.e., when an SLA is reached between a network operator and a service provider or the end application consumer). As elaborated in the flowchart 1300, a slice-aware optimization framework can be used based on the communication between the MEC system and the 3GPP-based 5G system to realize slice-centric VM allocation. Assuming a given set of network slice instances, UEs, as well as several $N_{TOT}$ QoS flows per UE (i.e., QoS flow 0, 1, . . . , $N_{TOT}$–1), the disclosed techniques are summarized in the following iterative procedure, also described in FIG. 13.

Processing may start at operation 1302 (first QoS flow is referenced as QF-i, with i=0). A single UE can be associated with different PDU sessions containing multiple QoS flows. Multiple UEs may be served by a network slice instance (which is not specific for a certain UE). Additionally, multiple network slice instances may be present within the MEC-enabled 5G communication network (e.g., 1100).

FIG. 13 illustrates processing functions associated with an outer loop and an inner loop. The outer loop analyzes all QoS flows (including new ones).

The outer loop may start at operation 1304 when the UE is checked for QoS flow QF-i. The QoS flow can be an existing one (thus with an already associated application endpoint at the MEC side) or a new one. If this is a new QoS flow, a new MEC app may be instantiated and may be used for data communication with the UE via the allocated NSI. A certain NSI may be associated with the new QoS flow, or a new NSI may be configured for the QoS flow. Otherwise (in case of an existing flow), new QoS measures (or QoS predictions) can trigger a change of the network slice instance (associated with that QoS flow) or the instantiation of a new slice. In summary, according to the above assumptions, the NFV-SCF 1208 may identify (and, subsequently, create) a network slice instance associated with the QoS flow QF-j, which is performed at operation 1310. The specific implementation of a network slice instance creation/instantiation is outside of the scope of the disclosed techniques.

At operation 1306, it is determined whether the end of the QoS flow list is reached (e.g., i=$N_{TOT}$. If all QoS flows in the system (both existing and new ones) have been analyzed, then the outer iteration ends at operation 1308.

At operation 1310, network slice instance identification is performed. More specifically, the NFV-SCF 1208 may identify (and, subsequently, create) a network slice, NS-j (serving a specific vertical, e.g. automotive, industrial automation, etc.) and its E2E performance requirement(s). The 3GPP management system determines the list of UEs associated with that slice, and whether the UEs require the instantiation of new MEC applications, connected through that slice.

The inner loop includes operations 1312-1318. The inner loop is related to the identification of a suitable MEC app instantiation, and it terminates after the VIM 1210 implements the derived slice configuration policy (which may include a VM allocation and handoff policy).

At operation 1312, E2E utility function modeling and evaluation is performed, which is explained in greater detail hereinbelow. The slice-specific MEC app (e.g., 1114), the instantiation of which may need to satisfy the total E2E performance demand of the service, is identified. Subsequently, aided by a signaling framework among the 3GPP 5G system's OSS 1202, the MEC system's MEAO 1204, and the NFVO 1206, the contribution of each (virtualized) MEC and 3GPP 5G system entity to the total E2E slice performance, i.e., between the UE and the current local DN 1112, is evaluated. The utility function may be modeled by the NFV-SCF 1208 within the NFVO 1206. In some aspects, the utility function may be selected based on an existing SLA or other pre-configured utility function selection.

At operation 1314, a slice-aware MEC app instantiation policy design may be performed and a slice configuration policy may be generated by the NFV-SCF 1208. Exploiting the designed utility function, the NFV-SCF 1208 designs the slice configuration policy, which may include a VM allocation and handoff sequence policy over the virtualized MEC and 3GPP 5G entities, which satisfies the E2E slice requirement.

At operation 1316, policy implementation instructions may be generated. More specifically, having derived a slice-aware, an optimal slice configuration policy (e.g., including a VM allocation and handoff policy) at operation 1314, the NFVO 1206 (or the NFV-SCF 1208) instructs the VIM 1210 to implement such policy.

Operation 1318 is associated with communicating feedback (e.g., by the VIM 1210 to the NFVO 1206. The following two feedback options may be used.

(a) Policy implementation. In this case, the NFV-SCF 1208 (or the NFVO 1206) request can be satisfied (e.g., the VIM 1210 determines there are sufficient network resources to re-configure an NSI or perform a VM handoff to restructure resources used by the NSI). The VIM 1210 then communicates an acknowledgment signal (or a "positive" feedback signal) to the NFVO 1206 and implements the slice configuration policy. The inner loop then terminates, the index i is incremented at operation 1320 (indicating a new QoS flow) and operation 1304 is revisited to check if the new QoS flow exists.

(b) VIM requests rejection and re-calculation of the slice configuration policy. In this case, the request to implement the determined slice configuration policy cannot be fulfilled by the VIM 1210 (e.g., based on insufficient network resources). The VIM 1210 then sends a "negative" feedback signal back to the NFVO, which seeks to strike a balance between slice E2E performance demand satisfaction and VM resource availability. Processing may then resume at operation 1312 to determine a new slice configuration policy.

In some aspects, based on case (b) above, unless the NFVO request is satisfied, the inner processing loop may continue without any specific exit condition (not desirable). Nevertheless, there could be multiple mechanisms to avoid endless inner loop processing, which are not discussed herein. Several examples are given by the following exit conditions: a maximum number of iterations given a certain time budget, the maximum number of acceptable solutions before rejecting the request and re-negotiating QoS, etc. As an example, QoS negotiation with the vertical segment may quickly reach an agreement (and, thus, terminate the inner loop), if the SLA compliance flexibility is expressed by a confidence level (e.g. SLA compliance when an E2E latency requirement is satisfied for, at least, 95% of the slice's total activity time).

Processing functions associated with operations 1312 and 1314 are described in greater detail hereinbelow about FIG. 14 and FIG. 15, respectively.

FIG. 14 is a message sequence chart 1400 illustrating the various latency components during the direct communication between a UE client (e.g., UE 1102) and a MEC app at the edge, such as MEC app 1114 (which consumes some MEC services running on the MEC platform 1118), according to an example.

Referring to FIG. 14, there is illustrated a communication exchange between a UE 1402, a base station 1404 (e.g., virtual RAN 1106), a MEC data plane 1406 (or 1110), a MEC app 1408 at a local data network (e.g., MEC app 1114 at local data network 1112), and MEC APIs 1410 (e.g., MEC API 1120 at the MEC platform 1118).

FIG. 14 illustrates the various latencies associated with communications and processing delays between various network nodes 1402-1410. Non-MEC interfaces (or reference points) include the wireless physical link between the UE 1402 and the base station 1404, the N3 reference point between the base station 1404 and the MEC data plane 1406, and the N6 reference point between the MEC data plane 1406 and the MEC app 1408. MEC reference points include the Mp1 reference point between the MEC app 1408 and the MEC API 1410.

E2E Utility Function Modeling and Evaluation
(Operation 1312 in FIG. 13)

The starting point for the evaluation of the E2E performance (e.g., concerning the total latency experienced by the UE) is the consideration of all entities involved in the Round Trip Time (RTT) of the user traffic, which refers to operation 1312 of the functionalities illustrated in FIG. 13.

As observed in FIG. 14, in addition to the typical latency given by the 3GPP network slice (UE-UPF), the delay between the UE 1402 and the MEC data plane (DP) 1406 can be considered, in addition to the time needed for the MEC app 1408 to gather/consume information (at operation 1420) from the MEC platform (preferably instantiated at a local DN, thus in proximity to the MEC app, and providing output through the Mp1 reference point. The packet Delay Budget (PDB) of the 5G communication system includes PDB 1412 for the uplink and PDB 1434 for the downlink. However, additional processing delays may also be considered in the total latency determination (e.g., accounting for the time delay between time t2, when the MEC data plane 1406 initiates communication with the MEC app 1408, and time t8, when the MEC data plane 1406 initiates communication with the base station 1404.

Examples of such information which may be gathered by the MEC API 1410 at the MEC platform include, e.g., Radio Network Information (RNI), location information, or any other slice-specific information (e.g., a packet carrying information on PC5, configuration parameters stored in the MEC server available via a V2X API relevant to a vehicular application, or a packet carrying information on IoT communication parameters available via a possible "IoT API").

Hence, the RTT for a UE running a service belonging to a specific network slice instance will be expressed as follows: $RTT=d_{3GPP} \pm d_{MEC}$, where $d_{3GPP}$ is the delay from time t0 (when the UE 1402 initiates communication with the base station 1404) till time t3 (when the MEC app 1408 forms operation 1420), and from time t7 (when the MEC app 1408 initiates communication with the MEC data plane 1406) till time t10 (when the UE 1402 receives a communication from the base station 1404); and $d_{MEC}$ is the delay from time t3 (when the MEC app 1408 performs operation 1420) till time t7 (with the MEC app 1408 initiates communication with the MEC data plane 1406).

Having modeled and evaluated the different components of the slice's E2E performance, e.g., in terms of latency, as depicted in FIG. 14, the management entities of the 3GPP 5G system (i.e., the OSS 1202) and the MEC system (i.e., the MEAO 1204 and the NFVO 1206), may interact to instantiate the MEC app (e.g., 1408 or 1114). As a result of the interaction, the NFVO 1206 can obtain the values of the involved latency components—referring to both relevant 3GPP and MEC reference points. Then, the NFV-SCF 1208 may obtain this information, identify the latency "bottlenecks" and, based on a utility function, determine a slice configuration policy (e.g., a VM allocation policy). Examples of utility functions (which may be selected based on an SLA or pre-configured) include the following:

(a) 5G system (5GS) efficiency-centric utility function. The goal is the minimization of the E2E delay introduced by the 3GPP 5GS components affecting the slice QoS, subject to a maximum tolerable RTT constraint, $\tau_{slice}$ (with a certain confidence of satisfaction, e.g., for more than 95% of the slice's activity time), and a fixed delay of the ETSI MEC system components, $\bar{d}_{3GPP}$ This is mathematically expressed as follows:

minimize $d_{3GPP}$ s.t.$Prob(RTT > \tau_{slice}) < p, d_{MEC} = \bar{d}_{MEC}$ (b) ETSI MEC efficiency-centric utility. The goal is the minimization of the E2E delay introduced by the ETSI MEC components affecting the slice QoS, subject to a maximum tolerable RTT constraint, $\tau_{slice}$ (with a certain confidence of satisfaction, e.g., for more than 95% of the slice's activity time), and a fixed delay of the 3GPP 5GS components, $\bar{d}_{3GPP}$. This is mathematically expressed as follows:

minimize $d_{MEC}$ s.t.$Prob(RTT > \tau_{slice}) < p, d_{3GPP} = \bar{d}_{3GPP}$.

(c) Overall efficiency utility. Assuming latency contributions are of the same priority, the goal is to minimize slice SLA breaches, hence:

minimize $Prob(RTT > \tau_{slice})$.

FIG. 15 is a message sequence chart 1500 illustrating example communication for deriving and implementing a slice-aware VM allocation policy, according to an example. Referring to FIG. 15, the example communication exchange can take place between the OSS 1502 (or 1202), the MEAO 1504 (or 12 four), the NFVO 1506 (or 1206), and the VIM 1508 (or 1210).

Slice-Aware MEC App Instantiation Policy Design
(Operation 1314 in FIG. 13)

As illustrated in FIG. 15, the NFVO 1506 (or the NFV-SCF 1208 within the NFVO) retrieves latency information 1510 associated with non-MEC communication links (e.g., PDB latency as well as latency on the N6 reference point) as well as latency information 1512 associated with MEC communication links such as the Mp1 reference point. At operation 1514, the NFV-SCF compares latency components, identifies delay bottlenecks, and generates a slice configuration policy (which may include a VM allocation and handoff policy indicating virtual resources of the MEC system for relocation or handoff to a different MEC system). The NFV-SCF 1208 communicates the slice configuration policy at operation 1516 to the VIM 1508. At 1518, the VIM 1508 evaluates the visibility of the slice configuration policy, accounting for available network resources and prepares feedback for communication to the NFVO 1506. At operation 1520, positive feedback (as explained hereinabove in connection with FIG. 13) is communicated to the NFVO 1506. At operation 1522, the VIM 1508 implements the recommended slice configuration policy.

As a consequence of the proposed NFV-SCF to design the E2E slice-aware utility function and suggest a VM migration policy, the NFVO 1506 (via the NFV-SCF) can be configured to instruct the VIM to implement this policy. The steps of the procedure, referring to operations 1314-1318 of FIG. 13, are illustrated in FIG. 15, focusing on the case, where, the VIM provides positive feedback to the NFVO and implements the recommended policy. In aspects when the VIM 1508 provides negative feedback, it will trigger the 3GPP (OSS 1502) and the MEC management entities (MEAO 1504) to interact again via the NFVO 1506, to reach a compromise, hence, a new (inner) iteration will be performed and a new slice configuration policy may be generated.

FIG. 16A-FIG. 16H illustrate various implementation aspects 1600A, 1600B, 1600C, 1600D, 1600E, 1600F, 1600G, and 1600H of techniques disclosed herein associated with an automotive example of a computing device (e.g., UE 1602) within a moving vehicle.

Figure 16A:
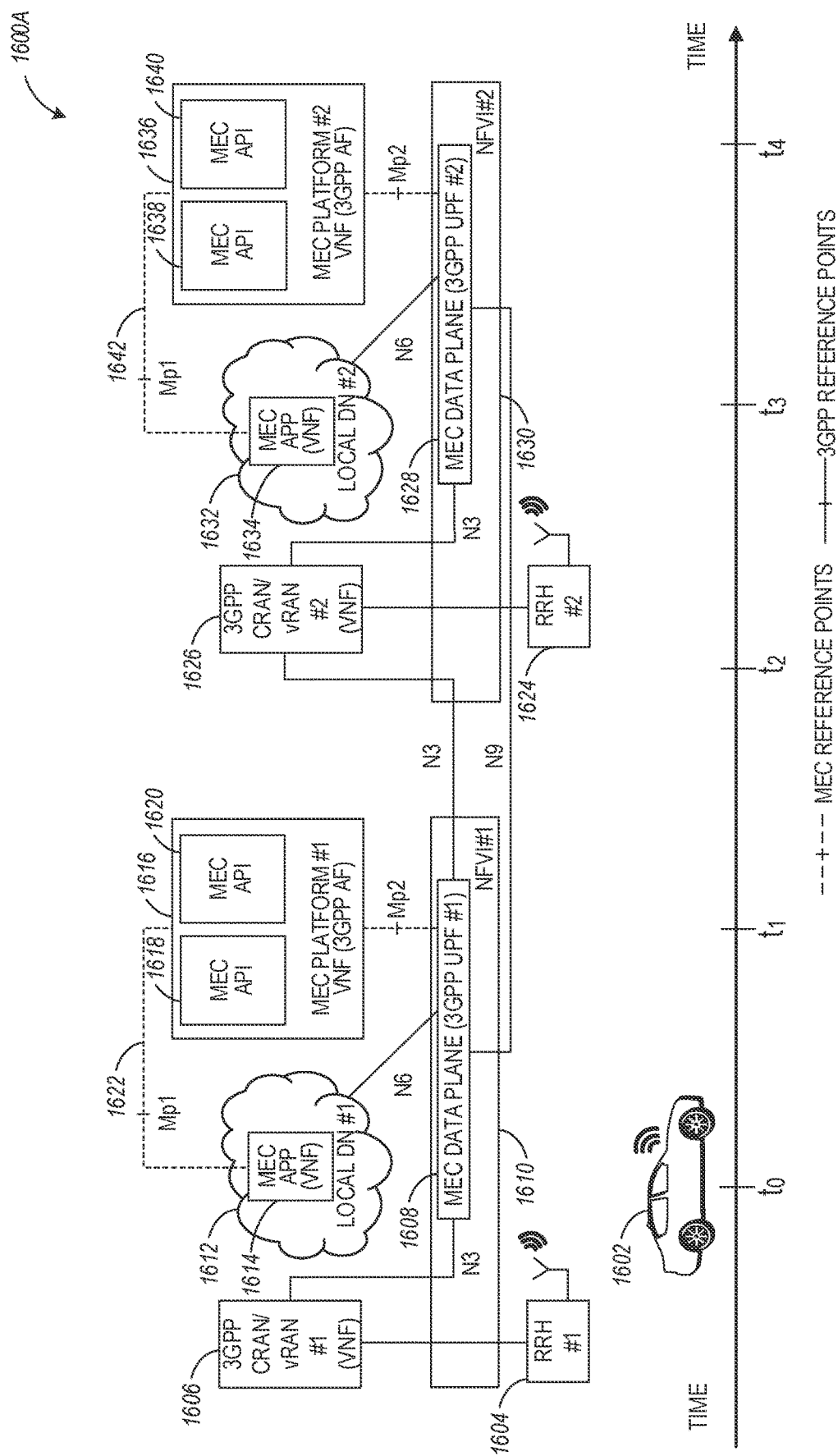
FIG. 16A-FIG. 16H illustrate various example and implementation aspects of techniques disclosed herein.
Figure 16B:
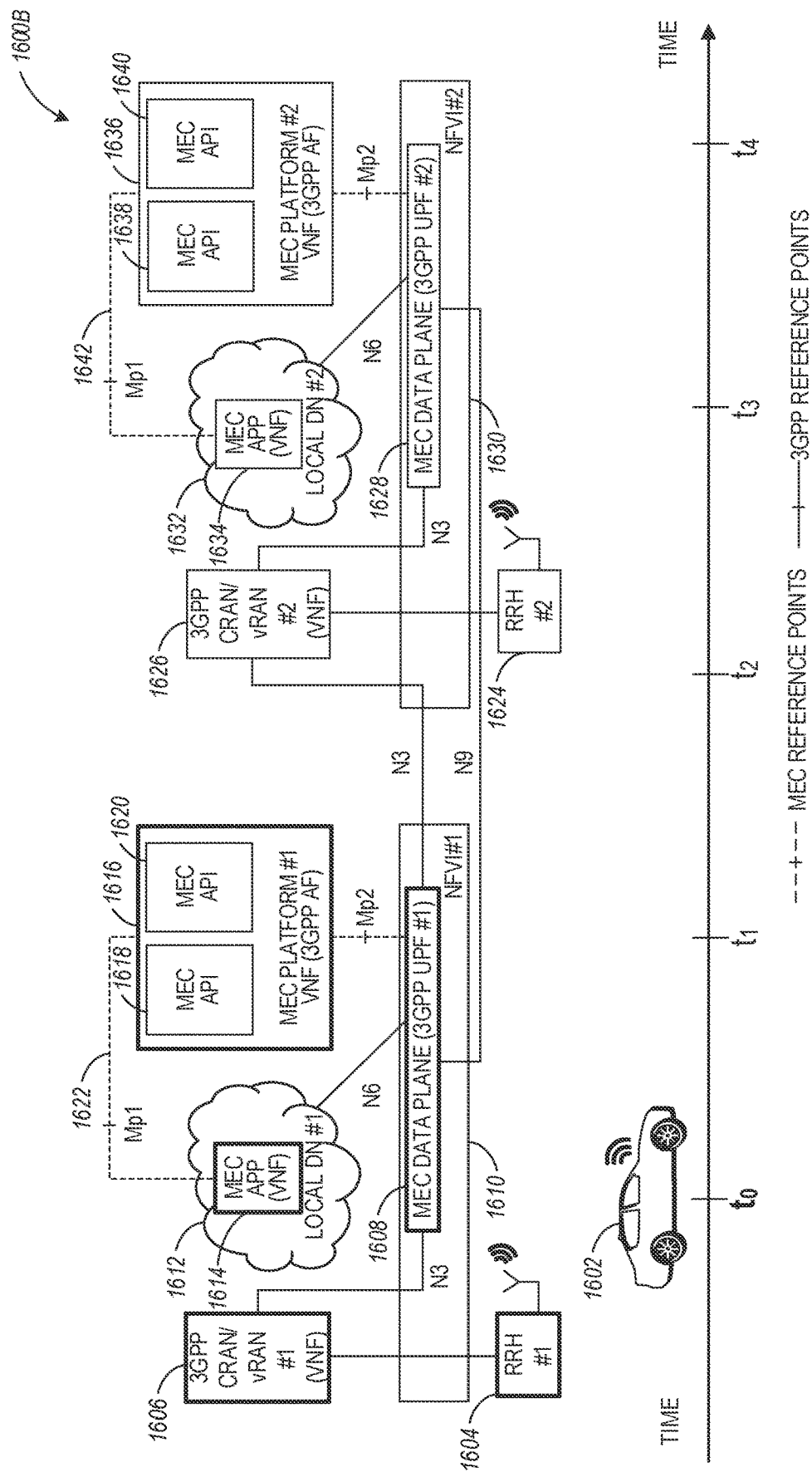
Figure 16C:
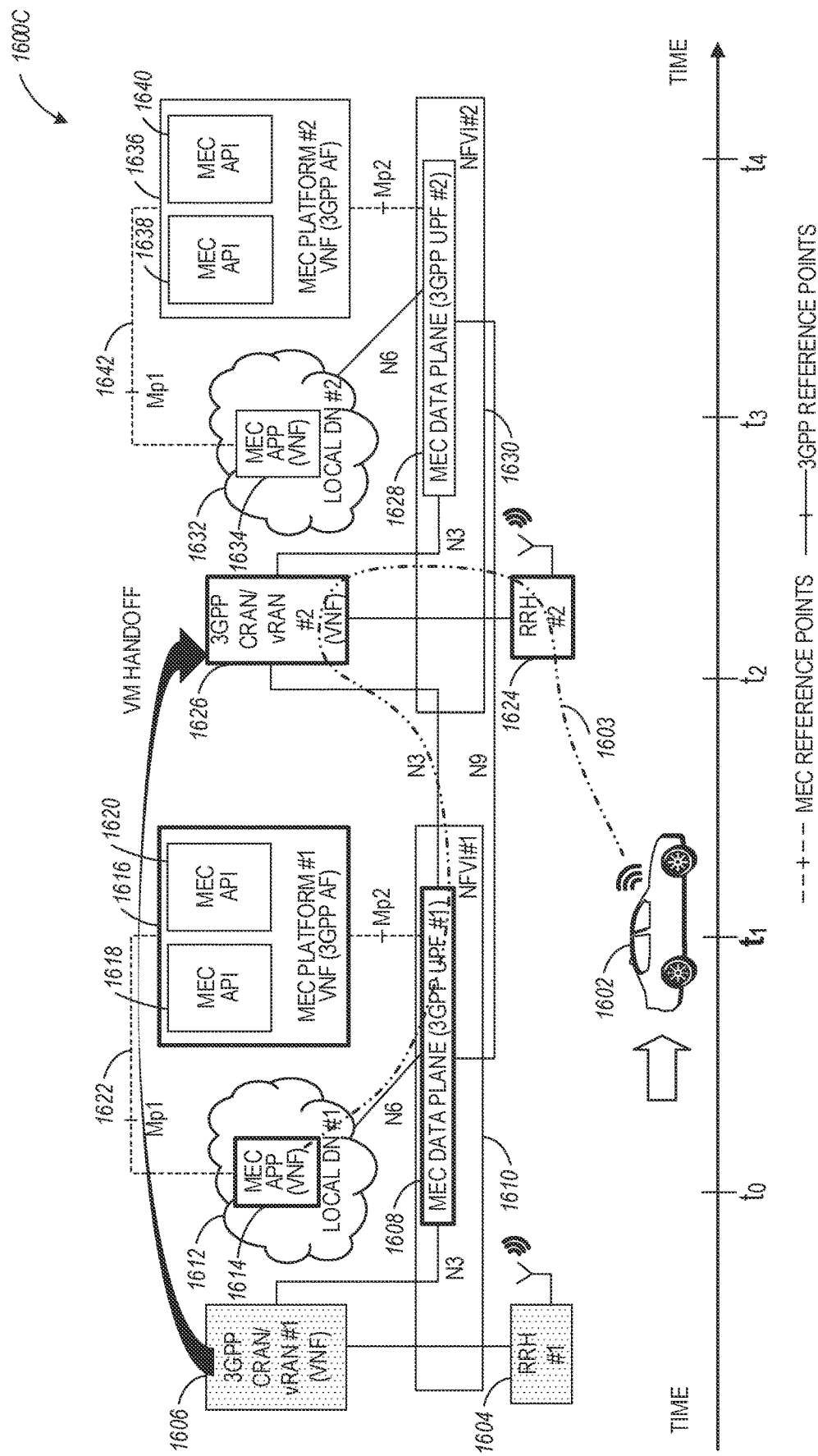
Figure 16D:
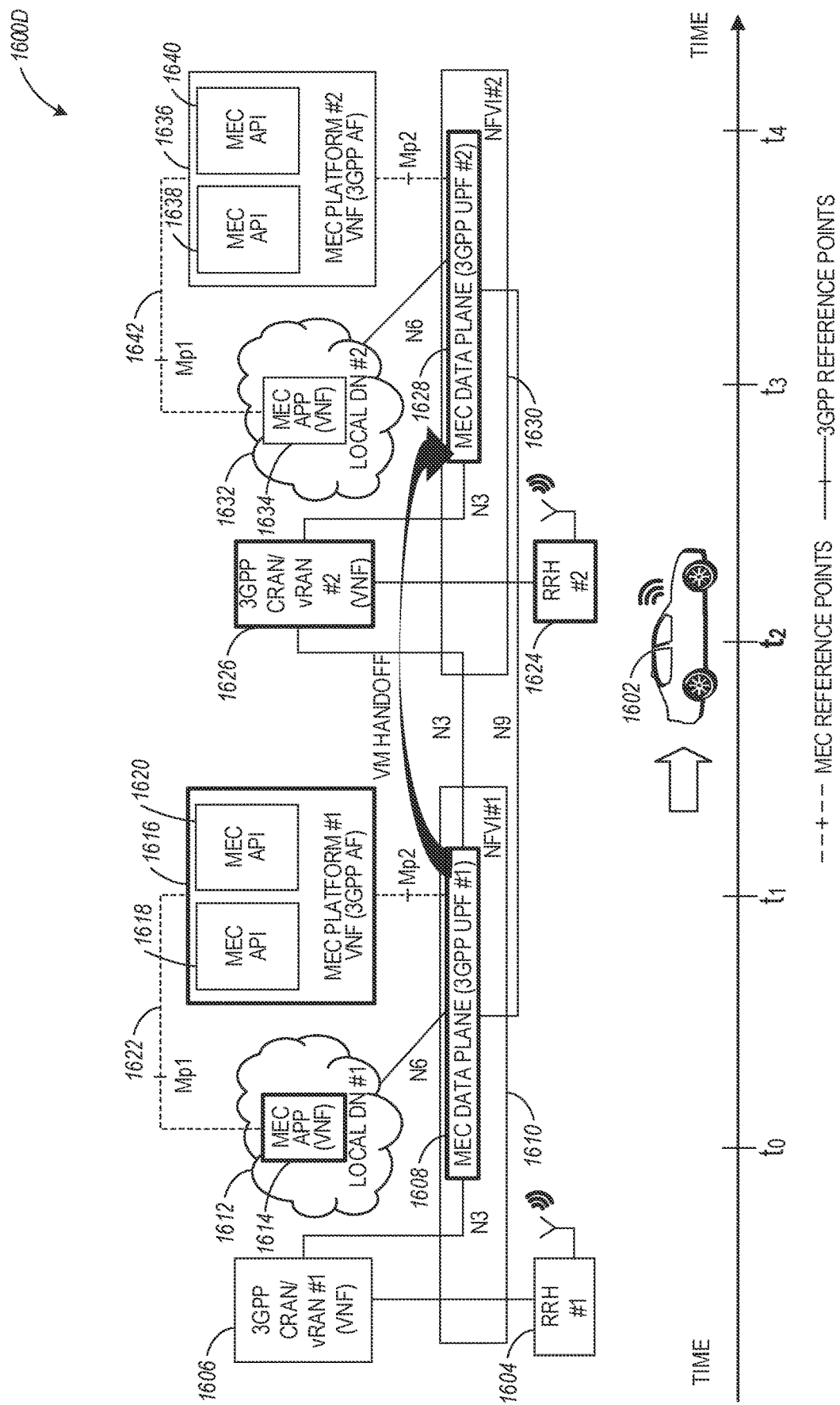

In the automotive example associated with FIG. 16A-FIG. 16 H, a vehicle may need to simultaneously connect to multiple network slice instances, belonging to different Slice/Service Types (SSTs), to support different performance requirements of multiple automotive use cases. For example, Software Update and Tele-Operated Driving use cases could be associated with an enhanced mobile broadband (eMBB) network slice instance and an ultra-reliable low latency communication (URLLC) network slice instance respectively, based on their KPI requirements.

Two examples are provided in FIGS. 16A-16H, corresponding to two use cases in MEC-enabled 5G systems (and related network slices): ultra-low latency (for an automotive slice) and massive-connectivity machine communication services (for an IoT slice).

Example Automotive Slice Processing

FIG. 16A-FIG. 16 H are associated with a mobility scenario, triggered by changing radio conditions. An overview of the system scenario is depicted in FIGS. 16A-16H. FIG. 16A illustrates the network entities which are repeated and the remaining FIG. 16B-FIG. 16 H. Referring to FIG. 16A, a first MEC-enabled 5G communication system includes RRH 1604, a virtual RAN 1606, a MEC data plane 1608 within NFVI 1610, a local data network 1612 with a MEC app 1614, and a MEC platform 1616 with MEC APIs 1618 and 1620.

The second MEC-enabled 5G communication system includes RRH 1624, a virtual RAN (vRAN) 1626, a MEC data plane 1628 within NFVI 1630, a local data network 1632 with a MEC app 1634, and a MEC platform 1636 with MEC APIs 1638 and 1630.

At time t0 (FIG. 16A and FIG. 16B), the UE is attached to RRH 1604, the vRAN 1606 is associated with MEC platform 1616, and the MEC app 1614 is instantiated at local DN 1612.

At time t1 (FIG. 16C), the UE 1602 communicates via communication path 1603 while being attached to RRH 1624, with the vRAN 1626 being associated with the MEC platform 1616 and the MEC app 1614 instantiated at the local DN 1612. In this case, the NFV-SCF 1208 and generate a slice configuration policy recommending a virtual machine handoff, which may result in a vRAN handoff (e.g., virtual resources of the vRAN 1606 are terminated and virtual resources for the vRAN 1626 are instantiated to serve communication link 1603 of the moving UE 1602).

At time t2 (FIG. 16D), the UE is attached to RRH 1624, and the vRAN 1626 is still associated with MEC platform 1616 and the MEC app instantiated at the local DN 1612. In this case, VM handoff (e.g., based on a new slice configuration policy generated by the NFV-SCF 1208) is performed from UPF (or MEC data plane) 1608 to UPF (or MEC data plane) 1628.

Figure 16E:
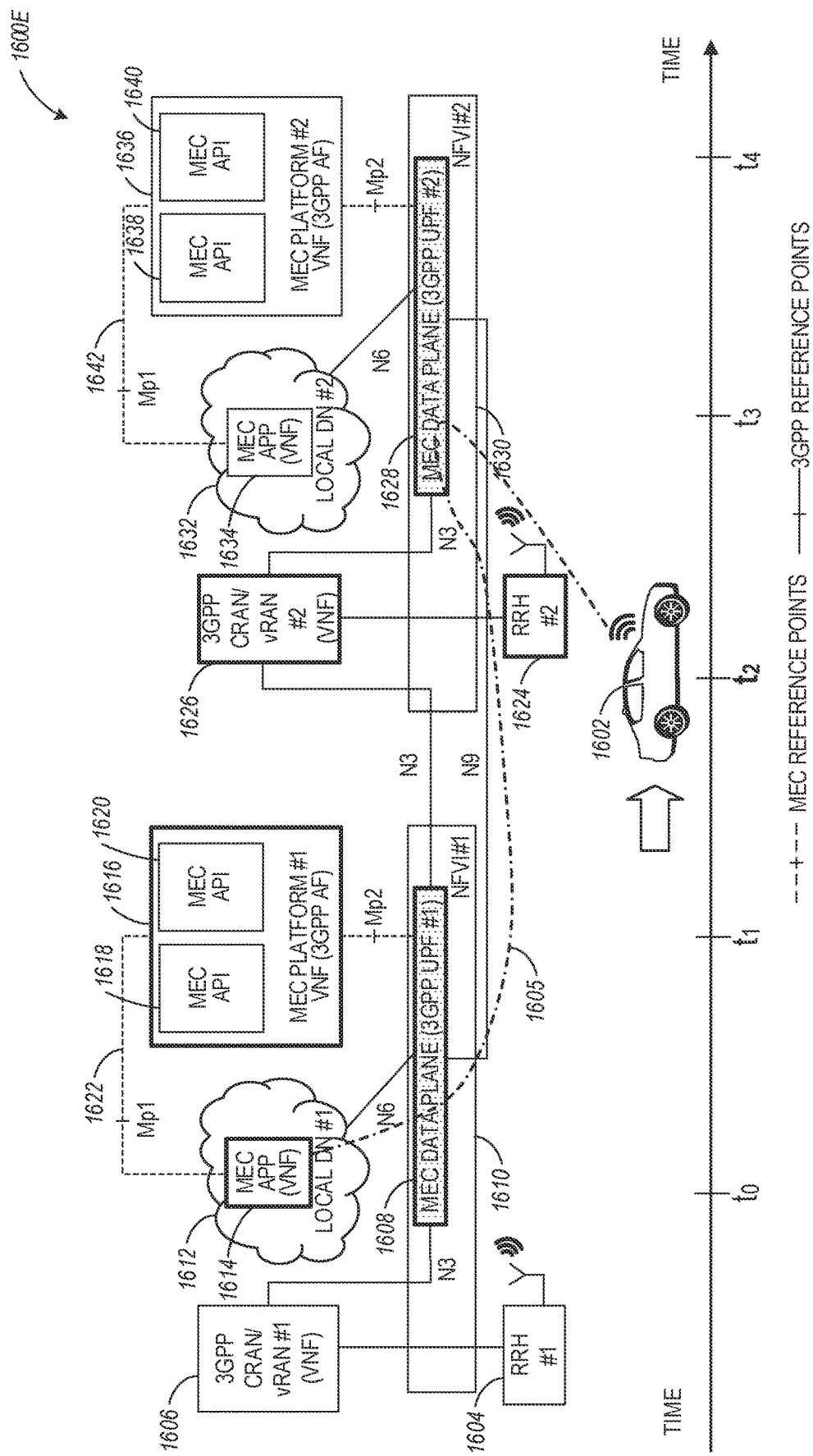
Figure 16F:
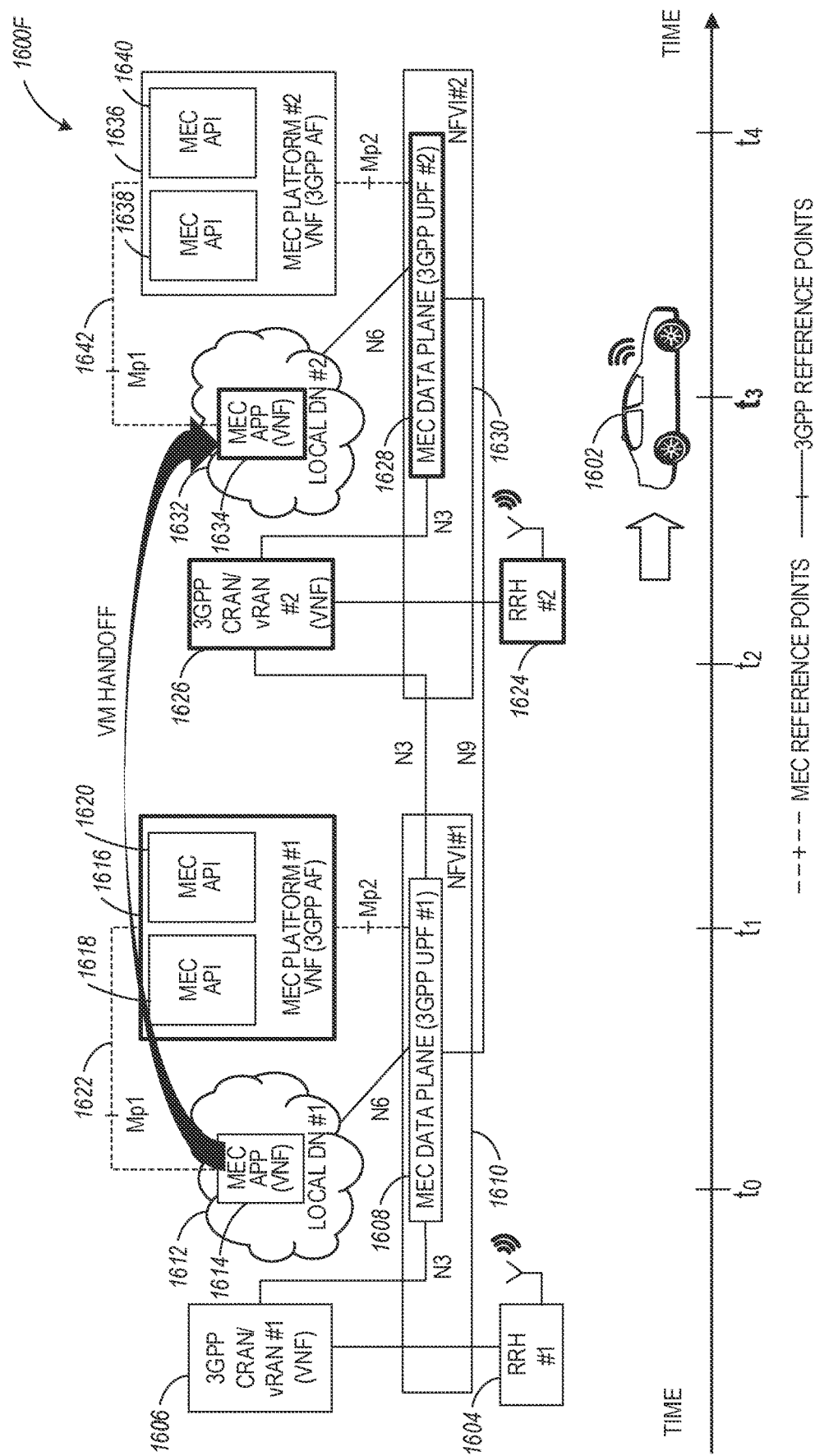

As depicted in FIG. 16E, at time instant t2, UE 1602 communicates via communication path 1605, while both UPF 1608 and UPF 1628 maintain connectivity to the local DN 1612.

At time t3 (FIG. 16F), the UE 1602 is attached to RRH 1624, and the vRAN 1626 is still associated with the MEC platform 1616. However, the UE 1602 is now associated with the MEC app 1634 instantiated at the local DN 1632 after a VM handoff associated with the MEC app (the MEC app is first affected by MEC mobility and the MEC app communicates through an Mp3 reference point).

Figure 16G:
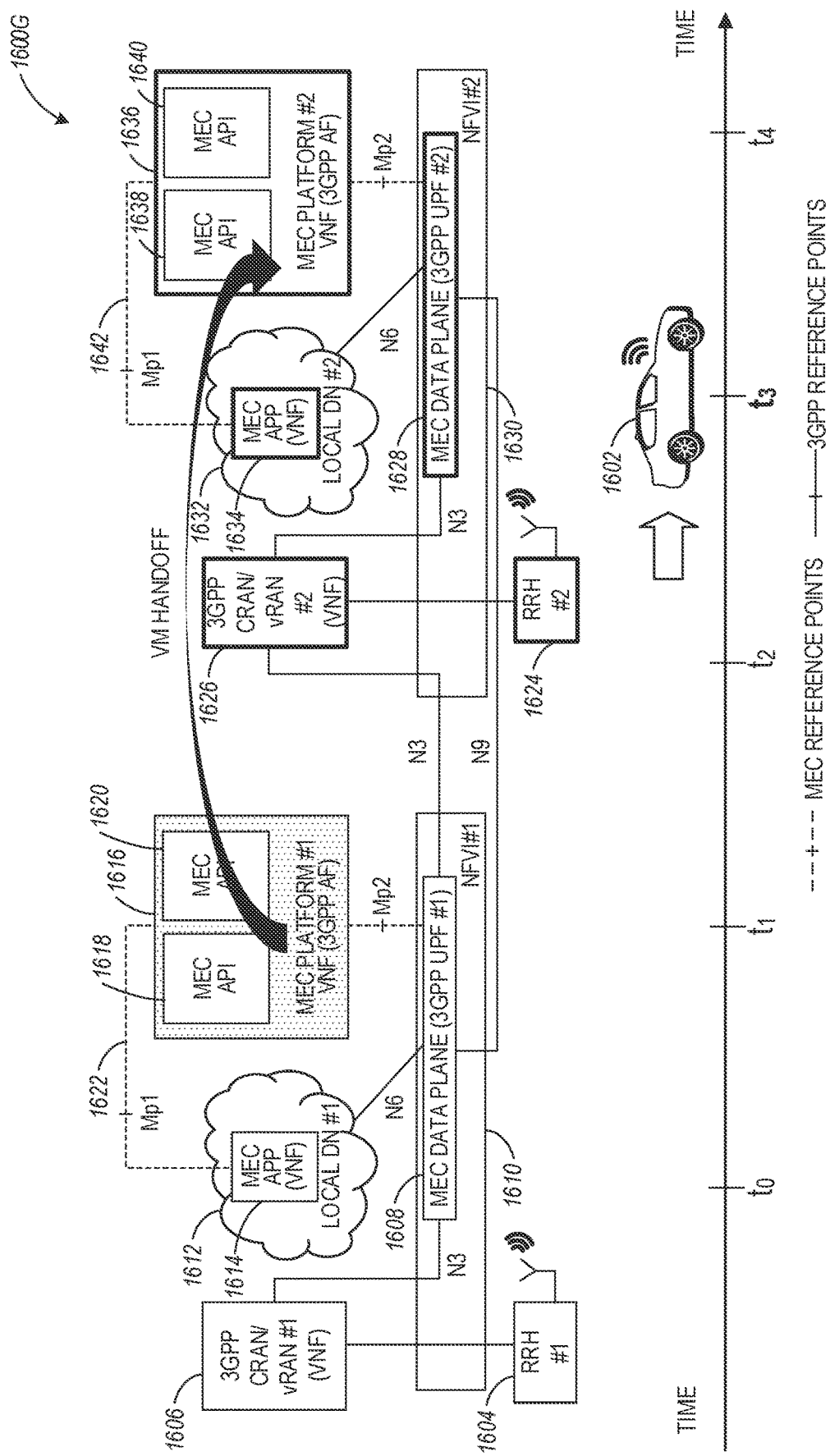

FIG. 16G illustrates the associations after the MEC app migration and after the handoff of VMs from MEC platform 1616 to the MEC platform 1636.

Figure 16H:
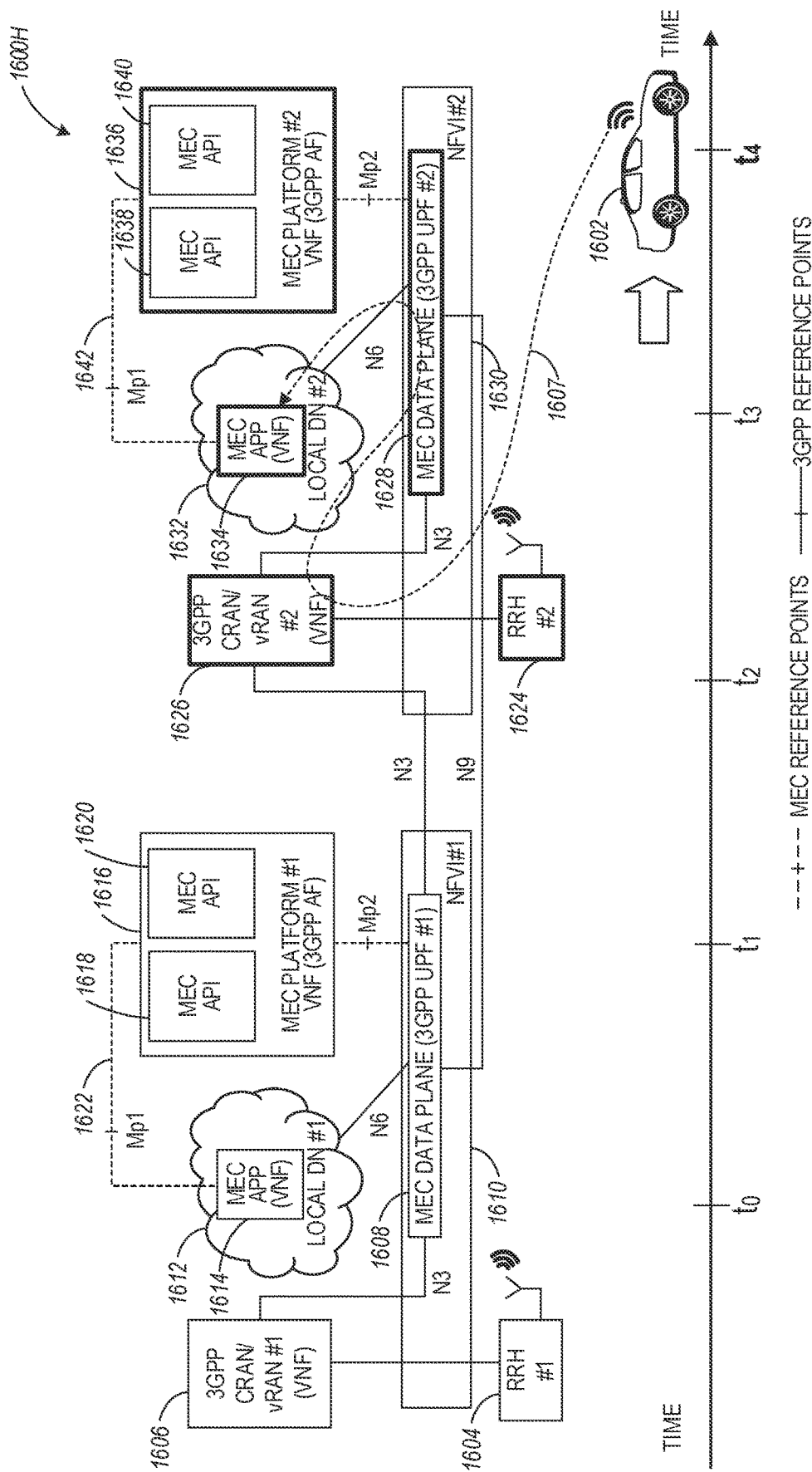

At time t4 (FIG. 16H), the UE 1602 communicates via communication path 1607, while being attached to RRH 1624 and the vRAN 1626, associated with MEC platform 1636 and the MEC app instantiated at the local DN 1632. FIG. 16H illustrates the completion of the VM migration procedure based on, e.g., a slice configuration policy generated by the NFV-SCF 1208 using the disclosed techniques.

Example Industrial IoT Slice Processing

According to this example, and focusing on private network deployment, we assume that, in the beginning (i.e., at time instant t0), an Ultra-Reliable Low Latency Communication (URLLC) slice is active. Examples involve automation process/machinery control, robotic arm operation and others. However, at a later time instant (i.e., at time instant t1), a different slice is activated (e.g., an eMBB service), which creates the need to instantiate a new MEC app for local video processing, for instance, for teleoperated troubleshooting. Hence, the target of the system design will be the efficient, full instantiation of the second (eMBB) slice for high-throughput video streaming on top of the URLLC slice for production operation (in other words, multi-slice coexistence in a virtualized environment).

In this case, the iterative procedure of FIGS. 12-13 can be implemented by modeling and evaluating two different E2E utility functions, one per network slice instance, that is: (a) a utility function focusing on the E2E latency (RTT) experienced by the URLLC UE (e.g., a robotic arm, or, an actuator); and (b) a utility function focusing on the data rate experienced by the eMBB UE (e.g., a wireless camera deployed for troubleshooting).

As a result, the overall utility function to be taken into account by the 3GPP 5G/MEC system management entities can be a synthesis of the two slice-specific utility functions, also taking into account the cost of VM migrations (as per the exemplary utility functions disclosed hereinabove).

It should be understood that the functional units or capabilities described in this specification may have been referred to or labeled as components or modules, to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field-programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center) than that in which the code is deployed (e.g., in a computer embedded in a sensor or robot). Similarly, operational data may be identified and illustrated herein within components or modules and may be embodied in any suitable form and organized within any suitable type of data structure. The operational data may be collected as a single data set or may be distributed over different locations including over different storage devices, and may exist, at least partially, merely as electronic signals on a system or network. The components or modules may be passive or active, including agents operable to perform desired functions.

Additional Notes and Examples

Additional examples of the presently described method, system, and device embodiments include the following, non-limiting configurations. Each of the following non-limiting examples may stand on its own or may be combined in any permutation or combination with any one or more of the other examples provided below or throughout the present disclosure.

Example 1 is a system configured to track network slicing operations within a Fifth Generation (5G) communication network, the system comprising: memory; and processing circuitry coupled to the memory, the processing circuitry configured to determine a network slice instance (NSI) associated with a quality of service (QoS) flow of a user equipment (UE), the NSI communicating data for a network function virtualization (NFV) instance of a Multi-Access Edge Computing (MEC) system within the 5G communication network; retrieve latency information for a plurality of communication links used by the NSI, the plurality of communication links including a first set of non-MEC communication links associated with a radio access network (RAN) of the 5G communication network and a second set of MEC communication links associated with the MEC system; generate a slice configuration policy based on the retrieved latency information and slice-specific attributes of the NSI; and reconfigure network resources of the 5G communication network used by the NSI based on the generated slice configuration policy.

In Example 2, the subject matter of Example 1 includes subject matter where the NFV instance is provided by a MEC application associated with the QoS flow, the MEC application executing on virtual resources of a network function virtualization infrastructure (NFVI) of the MEC system.

In Example 3, the subject matter of Example 2 includes subject matter where the MEC system comprises an MEC host executing the NFV instance.

In Example 4, the subject matter of Example 3 includes subject matter where the MEC host is configured to operate according to a standard from a European Telecommunications Standards Institute (ETSI) MEC standards family.

In Example 5, the subject matter of Examples 3-4 includes subject matter where the slice configuration policy comprises a virtual machine (VM) allocation and handoff policy and to reconfigure the network resources, the processing circuitry is configured to allocate additional network resources of the 5G communication network to the MEC host based on the VM allocation and handoff policy.

In Example 6, the subject matter of Example 5 includes subject matter where to reconfigure the network resources, the processing circuitry is further configured to perform a VM handoff to relocate the MEC application to execute on virtual resources of a second NFVI of the MEC system based on the VM allocation and handoff policy.

In Example 7, the subject matter of Examples 2-6 includes subject matter where the first set of non-MEC communication links comprises: a communication links between the UE and the RAN; a communication link associated with an N3 reference point between the RAN and a MEC data plane of the MEC system, the MEC data plane performing a user plane function of the communication network; and a communication link associated with an N6 reference point between the MEC data plane and a local data network including the virtual resources of the NFVI.

In Example 8, the subject matter of Example 7 includes subject matter where the second set of MEC communication links comprises at least one communication link associated with an Mp1 reference point of the MEC application.

In Example 9, the subject matter of Example 8 includes subject matter where the at least one communication link associated with the Mp1 reference point is a communication link between the MEC application and an MEC application programming interface (API) within an MEC platform of the MEC system.

In Example 10, the subject matter of Example 9 includes subject matter where the latency information includes processing delay associated with obtaining radio network information (RNI) or location information by the MEC API, based on a request from the MEC application associated with the QoS flow.

In Example 11, the subject matter of Examples 1-10 includes subject matter where the processing circuitry is configured to: retrieve a first portion of the latency information associated with the first set of communication links from a service coordinating entity of the 5G communication network.

In Example 12, the subject matter of Example 11 includes subject matter where the service coordinating entity of the 5G communication network is an Operations Support System (OSS) of the 5G communication network.

In Example 13, the subject matter of Examples 11-12 includes subject matter where the processing circuitry is configured to: retrieve a second portion of the latency information associated with the second set of communication links from a service coordinating entity of the MEC system.

In Example 14, the subject matter of Example 13 includes subject matter where the service coordinating entity of the MEC system is a Multi-Access Edge Orchestrator (MEAO) of the MEC system.

In Example 15, the subject matter of Examples 1-14 includes subject matter where the slice-specific attributes of the NSI include one or more of the following: an end-to-end (E2E) latency requirement associated with communication of data within the NSI; a minimum available bandwidth requirement for the plurality of communication links of the NSI; and a communication throughput requirement of at least one of the plurality of communication links of the NSI.

In Example 16, the subject matter of Examples 1-15 includes subject matter where the processing circuitry is configured to: select a utility function from a plurality of available utility functions based on a slice service level agreement (SLA) associated with the NSI; and generate the slice configuration policy further based on minimizing the selected utility function.

In Example 17, the subject matter of Example 16 includes subject matter where the utility function is one of the following: a 5G efficiency-centric utility function for minimizing end-to-end (E2E) delay within the 5G communication network; an MEC efficiency-centric utility function for minimizing E2E delay within the MEC system; and an overall efficiency utility function for minimizing breaches of the slice SLA.

Example 18 is a computing device in a Multi-Access Edge Computing (MEC)-enabled Fifth Generation (5G) communication network, the device comprising: a network interface card (NIC); and processing circuitry coupled to the NIC, the processing circuitry configured to perform operations to determine a network slice instance (NSI) associated with a quality of service (QoS) flow of a user equipment (UE), the NSI communicating data for a network function virtualization (NFV) instance of a Multi-Access Edge Computing (MEC) system within the 5G communication network; retrieve via the NIC, latency information for a plurality of communication links used by the NSI, the plurality of communication links including a first set of non-MEC communication links associated with a radio access network (RAN) of the 5G communication network and a second set of MEC communication links associated with the MEC system; generate a slice configuration policy based on the retrieved latency information and slice-specific attributes of the NSI, and reconfigure network resources of the 5G communication network used by the NSI based on the generated slice configuration policy.

In Example 19, the subject matter of Example 18 includes subject matter where the NFV instance is provided by a MEC application associated with the QoS flow, the MEC application executing on virtual resources of a network function virtualization infrastructure (NFVI) of the MEC system.

In Example 20, the subject matter of Example 19 includes subject matter where the MEC system comprises an MEC host executing the NFV instance, and wherein the computing device comprises a second MEC host configured as a Network Function Virtualization Orchestrator (NFVO) of the MEC system, the NFVO including an NFV slice control function (NFV-SCO) generating the slice configuration policy.

In Example 21, the subject matter of Example 20 includes subject matter where the MEC host and the second MEC host are configured to operate according to a standard from a European Telecommunications Standards Institute (ETSI) MEC standards family.

In Example 22, the subject matter of Examples 20-21 includes subject matter where the slice configuration policy comprises a virtual machine (VM) allocation and handoff policy and to reconfigure the network resources, the processing circuitry is configured to allocate additional network resources of the 5G communication network to the MEC host based on the VM allocation and handoff policy.

In Example 23, the subject matter of Example 22 includes subject matter where to reconfigure the network resources, the processing circuitry is further configured to perform a VM handoff to relocate the MEC application to execute on virtual resources of a second NFVI of the MEC system based on the VM allocation and handoff policy.

In Example 24, the subject matter of Examples 19-23 includes subject matter where the first set of non-MEC communication links comprises: a communication links between the UE and the RAN; a communication link associated with an N3 reference point between the RAN and a MEC data plane of the MEC system, the MEC data plane performing a user plane function of the communication network; and a communication link associated with an N6 reference point between the MEC data plane and a local data network including the virtual resources of the NFVI.

In Example 25, the subject matter of Example 24 includes subject matter where the second set of MEC communication links comprises at least one communication link associated with an Mp1 reference point of the MEC application.

In Example 26, the subject matter of Example 25 includes subject matter where the at least one communication link associated with the Mp1 reference point is a communication link between the MEC application and an MEC application programming interface (API) within an MEC platform of the MEC system.

In Example 27, the subject matter of Example 26 includes subject matter where the latency information includes processing delay associated with obtaining radio network information (RNI) or location information by the MEC API, based on a request from the MEC application associated with the QoS flow.

In Example 28, the subject matter of Examples 18-27 includes subject matter where the processing circuitry is configured to: retrieve a first portion of the latency information associated with the first set of communication links from a service coordinating entity of the 5G communication network.

In Example 29, the subject matter of Example 28 includes subject matter where the service coordinating entity of the 5G communication network is an Operations Support System (OSS) of the 5G communication network.

In Example 30, the subject matter of Examples 28-29 includes subject matter where the processing circuitry is configured to: retrieve a second portion of the latency information associated with the second set of communication links from a service coordinating entity of the MEC system.

In Example 31, the subject matter of Example 30 includes subject matter where the service coordinating entity of the MEC system is a Multi-Access Edge Orchestrator (MEAO) of the MEC system.

In Example 32, the subject matter of Examples 18-31 includes subject matter where the slice-specific attributes of the NSI include one or more of the following: an end-to-end (E2E) latency requirement associated with communication of data within the NSI; a minimum available bandwidth requirement for the plurality of communication links of the NSI; and a communication throughput requirement of at least one of the plurality of communication links of the NSI.

In Example 33, the subject matter of Examples 18-32 includes subject matter where the processing circuitry is configured to: select a utility function from a plurality of available utility functions based on a slice service level agreement (SLA) associated with the NSI; and generate the slice configuration policy further based on minimizing the selected utility function.

In Example 34, the subject matter of Example 33 includes subject matter where the utility function is one of the following: a 5G efficiency-centric utility function for minimizing end-to-end (E2E) delay within the 5G communication network; an MEC efficiency-centric utility function for minimizing E2E delay within the MEC system; and an overall efficiency utility function for minimizing breaches of the slice SLA.

Example 35 is at least one non-transitory machine-readable storage medium comprising instructions, wherein the instructions, when executed by a processing circuitry of a computing device operable in a Multi-Access Edge Computing (MEC)-enabled Fifth Generation (5G) communication network, cause the processing circuitry to perform operations that: determine a network slice instance (NSI) associated with a quality of service (QoS) flow of a user equipment (UE), the NSI communicating data for a network function virtualization (NFV) instance of a Multi-Access Edge Computing (MEC) system within the 5G communication network; retrieve latency information for a plurality of communication links used by the NSI, the plurality of communication links including a first set of non-MEC communication links associated with a radio access network (RAN) of the 5G communication network and a second set of MEC communication links associated with the MEC system; generate a slice configuration policy based on the retrieved latency information and slice-specific attributes of the NSI and reconfigure network resources of the 5G communication network used by the NSI based on the generated slice configuration policy.

In Example 36, the subject matter of Example 35 includes subject matter where the NFV instance is provided by a MEC application associated with the QoS flow, the MEC application executing on virtual resources of a network function virtualization infrastructure (NFVI) of the MEC system.

In Example 37, the subject matter of Example 36 includes subject matter where the MEC system comprises an MEC host executing the NFV instance, and wherein the computing device comprises a second MEC host configured as a Network Function Virtualization Orchestrator (NFVO) of the MEC system, the NFVO including an NFV slice control function (NFV-SCO) generating the slice configuration policy.

In Example 38, the subject matter of Example 37 includes subject matter where the MEC host and the second MEC host are configured to operate according to a standard from a European Telecommunications Standards Institute (ETSI) MEC standards family.

In Example 39, the subject matter of Examples 37-38 includes subject matter where the slice configuration policy comprises a virtual machine (VM) allocation and handoff policy and to reconfigure the network resources, the instructions further causing the processing circuitry to: allocate additional network resources of the 5G communication network to the MEC host based on the VM allocation and handoff policy.

In Example 40, the subject matter of Example 39 includes subject matter where to reconfigure the network resources, the instructions further causing the processing circuitry to perform a VM handoff to relocate the MEC application to execute on virtual resources of a second NFVI of the MEC system based on the VM allocation and handoff policy.

In Example 41, the subject matter of Examples 36-40 includes subject matter where the first set of non-MEC communication links comprises: a communication links between the UE and the RAN; a communication link associated with an N3 reference point between the RAN and a MEC data plane of the MEC system, the MEC data plane performing a user plane function of the communication network; and a communication link associated with an N6 reference point between the MEC data plane and a local data network including the virtual resources of the NFVI.

In Example 42, the subject matter of Example 41 includes subject matter where the second set of MEC communication links comprises at least one communication link associated with an Mp1 reference point of the MEC application.

In Example 43, the subject matter of Example 42 includes subject matter where the at least one communication link associated with the Mp1 reference point is a communication link between the MEC application and an MEC application programming interface (API) within an MEC platform of the MEC system.

In Example 44, the subject matter of Example 43 includes subject matter where the latency information includes processing delay associated with obtaining radio network information (RNI) or location information by the MEC API, based on a request from the MEC application associated with the QoS flow.

In Example 45, the subject matter of Examples 35-44 includes subject matter where the instructions further cause the processing circuitry to: retrieve a first portion of the latency information associated with the first set of communication links from a service coordinating entity of the 5G communication network.

In Example 46, the subject matter of Example 45 includes subject matter where the service coordinating entity of the 5G communication network is an Operations Support System (OSS) of the 5G communication network.

In Example 47, the subject matter of Examples 45-46 includes subject matter where the instructions further cause the processing circuitry to: retrieve a second portion of the latency information associated with the second set of communication links from a service coordinating entity of the MEC system.

In Example 48, the subject matter of Example 47 includes subject matter where the service coordinating entity of the MEC system is a Multi-Access Edge Orchestrator (MEAO) of the MEC system.

In Example 49, the subject matter of Examples 35-48 includes subject matter where the slice-specific attributes of the NSI include one or more of the following: an end-to-end (E2E) latency requirement associated with communication of data within the NSI; a minimum available bandwidth requirement for the plurality of communication links of the NSI; and a communication throughput requirement of at least one of the plurality of communication links of the NSI.

In Example 50, the subject matter of Examples 35-49 includes subject matter where the processing circuitry is configured to: select a utility function from a plurality of available utility functions based on a slice service level agreement (SLA) associated with the NSI; and generate the slice configuration policy further based on minimizing the selected utility function.

In Example 51, the subject matter of Example 50 includes subject matter where the utility function is one of the following: a 5G efficiency-centric utility function for minimizing end-to-end (E2E) delay within the 5G communication network; an MEC efficiency-centric utility function for minimizing E2E delay within the MEC system; and an overall efficiency utility function for minimizing breaches of the slice SLA.

Example 52 is at least one machine-readable medium including instructions that, when executed by processing circuitry, cause the processing circuitry to perform operations to implement of any of Examples 1-51.

Example 53 is an apparatus comprising means to implement of any of Examples 1-51.

Example 54 is a system to implement of any of Examples 1-51.

Example 55 is a method to implement of any of Examples 1-51.

Although an aspect has been described concerning specific exemplary aspects, it will be evident that various modifications and changes may be made to these aspects without departing from the broader scope of the present disclosure. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is disclosed. Thus, although specific aspects have been illustrated and described herein, it should be appreciated that any arrangement calculated to achieve the same purpose may be substituted for the specific aspects shown. This disclosure is intended to cover any adaptations or variations of various aspects. Combinations of the above aspects and other aspects not specifically described herein will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. Also, in the foregoing Detailed Description, it can be seen that various features are grouped in a single aspect to streamline the disclosure. This method of disclosure is not to be interpreted as reflecting an intention that the claimed aspects require more features than are expressly recited in each claim. Rather, as the following claims reflect, the inventive subject matter lies in less than all features of a single disclosed aspect. Thus the following claims are hereby incorporated into the Detailed Description, with each claim standing on its own as a separate aspect.

What is claimed is:

1. A system configured to evaluate end-to-end (E2E) performance of network slicing operations within a Multi-access Edge Computing-enabled (MEC-enabled) Fifth Generation (5G) communication network, the system comprising:
   memory; and
   processing circuitry coupled to the memory, the processing circuitry configured to:
      determine first latency information for a plurality of non-MEC communication links associated with data communications of a user equipment (UE) using a network slice instance (NSI) in a radio access network (RAN) of the MEC-enabled 5G communication network;
      determine second latency information for a plurality of MEC communication links associated with the data communications of the UE using the NSI in a MEC system of the MEC-enabled 5G communication network;
      determine a round-trip time (RTT) associated with the data communications of the UE based on the first latency information and the second latency information; and
      reconfigure resources of the MEC-enabled 5G communication network used by the NSI based on the determined RTT.

2. The system of claim 1, wherein the processing circuitry is further configured to:
   determine the first latency information based on a first latency associated with the data communications of the UE on a radio link between the UE and a Node-B (NB) of the MEC-enabled 5G communication network.

3. The system of claim 2, wherein the processing circuitry is further configured to:
   determine the first latency information further based on a second latency associated with the data communications of the UE on a Third Generation Partnership Project (3GPP) N3 interface between the NB and one of a MEC data plane (DP) or a 3GPP User-Plane Function (UPF) of the MEC-enabled 5G communication network.

4. The system of claim 3, wherein the processing circuitry is further configured to:
   determine the first latency information further based on a third latency associated with the data communications of the UE on a 3GPP N6 interface between the MEC DP and a MEC application instantiated at a local data network (DN) accessible by the UE.

5. The system of claim 4, wherein the processing circuitry is further configured to:
    determine the second latency information based on a fourth latency associated with the data communications of the UE on a MEC Mp1 interface between the MEC application and a MEC platform of the MEC system.

6. The system of claim 5, wherein the MEC platform is instantiated as a virtualized network function (VNF) at the local DN.

7. The system of claim 6, wherein the MEC application is configured to accesses the MEC platform via a MEC application programming interface (API) of the MEC platform.

8. The system of claim 1, wherein the processing circuitry is further configured to:
    determine the second latency information further based on delay experienced by a MEC application when gathering data from a MEC platform of the MEC system.

9. At least one non-transitory machine-readable storage medium comprising instructions, wherein the instructions, when executed by a processing circuitry of a management node operable a Multi-Access Edge Computing (MEC)-enabled Fifth Generation (5G) communication network, cause the processing circuitry to perform operations that:
    determine first latency information for a plurality of non-MEC communication links associated with data communications of a user equipment (UE) using a network slice instance (NSI) in a radio access network (RAN) of the MEC-enabled 5G communication network;
    determine second latency information for a plurality of MEC communication links associated with the data communications of the UE using the NSI in a MEC system of the MEC-enabled 5G communication network;
    determine a round-trip time (RTT) associated with the data communications of the UE based on the first latency information and the second latency information; and
    reconfigure resources of the MEC-enabled 5G communication network used by the NSI based on the determined RTT.

10. The at least one non-transitory machine-readable storage medium of claim 9, wherein the processing circuitry further performs operations to:
    determine the first latency information based on a first latency associated with the data communications of the UE on a radio link between the UE and a Node-B (NB) of the MEC-enabled 5G communication network.

11. The at least one non-transitory machine-readable storage medium of claim 10, wherein the processing circuitry further performs operations to:
    determine the first latency information further based on a second latency associated with the data communications of the UE on a Third Generation Partnership Project (3GPP) N3 interface between the NB and one of a MEC data plane (DP) or a 3GPP User-Plane Function (UPF) of the MEC-enabled 5G communication network.

12. The at least one non-transitory machine-readable storage medium of claim 11, wherein the processing circuitry further performs operations to:
    determine the first latency information further based on a third latency associated with the data communications of the UE on a 3GPP N6 interface between the MEC DP and a MEC application instantiated at a local data network (DN) accessible by the UE.

13. The at least one non-transitory machine-readable storage medium of claim 12, wherein the processing circuitry further performs operations to:
    determine the second latency information based on a fourth latency associated with the data communications of the UE on a MEC Mp1 interface between the MEC application and a MEC platform of the MEC system.

14. The at least one non-transitory machine-readable storage medium of claim 13, wherein the MEC platform is instantiated as a virtualized network function (VNF) at the local DN.

15. The at least one non-transitory machine-readable storage medium of claim 14, wherein the MEC application is configured to accesses the MEC platform via a MEC application programming interface (API) of the MEC platform.

16. The at least one non-transitory machine-readable storage medium of claim 9, wherein the processing circuitry further performs operations to:
    determine the second latency information further based on delay experienced by a MEC application when gathering data from a MEC platform of the MEC system.

17. An apparatus of a management node operable a Multi-Access Edge Computing (MEC)-enabled Fifth Generation (5G) communication network, the apparatus comprising:
    communications circuitry to communicate with one or more computing devices in the MEC-enabled 5G communication network;
    processing circuitry; and
    a memory device including instructions embodied thereon, wherein the instructions, which when executed by the processing circuitry, configure the processing circuitry to perform operations to:
        determine first latency information for a plurality of non-MEC communication links associated with data communications of a user equipment (UE) using a network slice instance (NSI) in a radio access network (RAN) of the MEC-enabled 5G communication network;
        determine second latency information for a plurality of MEC communication links associated with the data communications of the UE using the NSI in a MEC system of the MEC-enabled 5G communication network;
        determine a round-trip time (RTT) associated with the data communications of the UE based on the first latency information and the second latency information; and
        reconfigure resources of the MEC-enabled 5G communication network used by the NSI based on the determined RTT and using the communications circuitry.

18. The apparatus of claim 17, wherein the processing circuitry further performs operations to:
    determine the first latency information based on a first latency associated with the data communications of the UE on a radio link between the UE and a Node-B (NB) of the MEC-enabled 5G communication network.

19. The apparatus of claim 18, wherein the processing circuitry further performs operations to:
    determine the first latency information further based on a second latency associated with the data communications of the UE on a Third Generation Partnership Project (3GPP) N3 interface between the NB and one of a MEC data plane (DP) or a 3GPP User-Plane Function (UPF) of the MEC-enabled 5G communication network.

20. The apparatus of claim 19, wherein the processing circuitry further performs operations to:
determine the first latency information further based on a third latency associated with the data communications of the UE on a 3GPP N6 interface between the MEC DP and a MEC application instantiated at a local data network (DN) accessible by the UE.

* * * * *